United States Patent
Karikomi et al.

(10) Patent No.: US 10,298,890 B2
(45) Date of Patent: May 21, 2019

(54) VEHICLE DISPLAY DEVICE

(71) Applicant: DENSO CORPORATION, Kariya, Aichi-pref. (JP)

(72) Inventors: Kenichiro Karikomi, Kariya (JP); Keiichi Iwashima, Kariya (JP); Yoshihisa Hasegawa, Kariya (JP); Hiroshi Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 743 days.

(21) Appl. No.: 14/897,169

(22) PCT Filed: Jun. 10, 2014

(86) PCT No.: PCT/JP2014/003094
§ 371 (c)(1),
(2) Date: Dec. 9, 2015

(87) PCT Pub. No.: WO2014/199629
PCT Pub. Date: Dec. 18, 2014

(65) Prior Publication Data
US 2016/0142689 A1    May 19, 2016

(30) Foreign Application Priority Data

Jun. 14, 2013 (JP) .................. 2013-125962
Jun. 14, 2013 (JP) .................. 2013-125964
(Continued)

(51) Int. Cl.
*B60K 35/00* (2006.01)
*H04N 9/31* (2006.01)
(Continued)

(52) U.S. Cl.
CPC .......... *H04N 9/3155* (2013.01); *B60K 35/00* (2013.01); *B60K 37/02* (2013.01); *G01D 11/28* (2013.01);
(Continued)

(58) Field of Classification Search
CPC .... H04N 9/3155; H04N 9/3185; B60K 37/00; B60K 37/02; B60K 2350/1072;
(Continued)

(56) References Cited

U.S. PATENT DOCUMENTS 5,442,482 A * 8/1995 Johnson .............. G02B 3/0031
                                                                 359/619
6,226,588 B1   5/2001 Teramura et al.
(Continued)

FOREIGN PATENT DOCUMENTS

JP    H06262964 A    9/1994
JP    2000118263 A    4/2000
(Continued)

OTHER PUBLICATIONS

Office Action dated Dec. 1, 2015 in corresponding Japanese Application No. 2013-154875 with English translation.
(Continued)

*Primary Examiner* — William R Alexander
(74) *Attorney, Agent, or Firm* — Harness, Dickey & Pierce, P.L.C.

(57) ABSTRACT

A vehicle display device includes a projector which emits display light of an image indicating vehicle information, a controller that controls luminance of the display light, and a screen that displays the image when the display light is projected to the screen. The screen has a convex portion that protrudes to a near side in a direction in which the image is visually recognized, and a concave portion that is recessed to a far side. In addition, the controller controls the lumi-
(Continued)

nance of the display light so that the display light projected to the convex portion (first parts) has higher luminance than that of the display light projected to the concave portion (second parts).

12 Claims, 35 Drawing Sheets

(30) Foreign Application Priority Data

| Jul. 25, 2013 | (JP) | 2013-154875 |
|---|---|---|
| Jul. 25, 2013 | (JP) | 2013-154876 |
| Sep. 23, 2013 | (JP) | 2013-196323 |
| Sep. 23, 2013 | (JP) | 2013-196324 |
| Sep. 23, 2013 | (JP) | 2013-196325 |

(51) Int. Cl.
  *G01D 11/28* (2006.01)
  *B60K 37/02* (2006.01)
  *G03B 21/10* (2006.01)
  *G03B 21/28* (2006.01)

(52) U.S. Cl.
  CPC ... *H04N 9/3185* (2013.01); *B60K 2350/1072* (2013.01); *B60K 2350/20* (2013.01); *B60K 2350/2017* (2013.01); *B60K 2350/352* (2013.01); *G03B 21/10* (2013.01); *G03B 21/28* (2013.01)

(58) Field of Classification Search
  CPC ........ B60K 2350/20; B60K 2350/2017; B60K 2350/352; G01D 11/28; G03B 21/10; G03B 21/28
  USPC .......................................................... 359/462
  See application file for complete search history.

(56) References Cited

U.S. PATENT DOCUMENTS

| 2001/0012078 | A1* | 8/2001 | Hira | G02B 3/0031 349/95 |
|---|---|---|---|---|
| 2008/0123322 | A1 | 5/2008 | Tane et al. | |
| 2008/0161997 | A1 | 7/2008 | Wengelnik et al. | |
| 2008/0309475 | A1 | 12/2008 | Kuno et al. | |
| 2009/0219615 | A1* | 9/2009 | Kageyama | G03B 21/60 359/449 |
| 2009/0268163 | A1* | 10/2009 | Bowden | G01C 21/365 353/13 |
| 2010/0315825 | A1 | 12/2010 | Kawamura | |
| 2012/0306635 | A1 | 12/2012 | Sato | |
| 2015/0183322 | A1* | 7/2015 | Arai | G02B 5/02 701/36 |
| 2016/0091346 | A1* | 3/2016 | Otani | G01D 11/28 362/23.16 |
| 2016/0313494 | A1* | 10/2016 | Hamilton | G02B 6/0068 |
| 2016/0347246 | A1* | 12/2016 | Fujita | G02B 6/006 |
| 2017/0038891 | A1* | 2/2017 | Lee | G06F 3/0416 |

FOREIGN PATENT DOCUMENTS

| JP | 2004133181 A | 4/2004 |
|---|---|---|
| JP | 2005-283176 | 10/2005 |
| JP | 2005313722 A | 11/2005 |
| JP | 2006292485 A | 10/2006 |
| JP | 2007186017 A | 7/2007 |
| JP | 2007326419 A | 12/2007 |
| JP | 2008089481 A | 4/2008 |
| JP | 2009073431 A | 4/2009 |
| JP | 2009101860 A | 5/2009 |
| JP | 2009-150858 | 7/2009 |
| JP | 2012017100 A | 1/2012 |
| JP | 2012250609 A | 12/2012 |
| JP | 2014119719 A | 6/2014 |
| WO | WO-2009104550 A1 | 8/2009 |

OTHER PUBLICATIONS

Office Action dated Dec. 1, 2015 in corresponding Japanese Application No. 2013-196323 with English translation.
Office Action dated Dec. 1, 2015 in corresponding Japanese Application No. 2013-196324 with English translation.
International Search Report and Written Opinion (in Japanese with English Translation) for PCT/JP2014/003094, dated Aug. 26, 2014; ISA/JP.
Office Action in Corresponding JP Application No. 2013-125962 dated Oct. 13, 2015 (in Japanese with English Translation).

* cited by examiner

REFERENCE EXAMPLE

FOURTH EMBODIMENT

VEHICLE SPEED SETTING MODE

VEHICLE SPEED SETTING MODE

SHIFT DISPLAY MODE

DIAL DISPLAY OFF

FIFTH EMBODIMENT

SIXTH EMBODIMENT

SEVENTH EMBODIMENT

FIG. 24 EIGHTH EMBODIMENT

NINTH EMBODIMENT

TENTH EMBODIMENT

ELEVENTH EMBODIMENT

TWELFTH EMBODIMENT

FOURTEENTH EMBODIMENT

FIFTEENTH EMBODIMENT

VEHICLE DISPLAY DEVICE

CROSS-REFERENCE TO RELATED APPLICATIONS

This application is a U.S. National Phase Application under 35 U.S.C. 371 of International Application No. PCT/JP2014/003094 filed on Jun. 10, 2014 and published in Japanese as WO 2014/199629 A1 on Dec. 18, 2014. This application is based on and claims the benefit of priority from Japanese Patent Application Nos. 2013-125964 filed on Jun. 14, 2013, 2013-125962 filed on Jun. 14, 2013, 2013-196323 filed on Sep. 23, 2013, 2013-196324 filed on Sep. 23, 2013, 2013-196325 filed on Sep. 23, 2013, 2013-154875 filed on Jul. 25, 2013, and 2013-154876 filed on Jul. 25, 2013. The entire disclosures of all of the above applications are incorporated herein by reference.

TECHNICAL FIELD

The present disclosure relates to a vehicle display device which displays an image showing vehicle information on a screen by projecting display light emitted from a projector to the screen.

BACKGROUND ART

In Patent Literature 1, a display device which is provided with a projector that emits display light of an image showing vehicle information, such as vehicle speed, and a screen that displays the image as the emitted display light is projected is disclosed. The screen according to the display device is formed in an uneven shape in a direction in which the image is visually recognized, and accordingly, the image is visually recognized in a three-dimensional manner.

PRIOR ART LITERATURE

Patent Literature

Patent Literature 1: JP 2007-326419A

SUMMARY OF THE INVENTION

In the type of display device, it is desirable to give a user the illusion that a virtual object (for example, vehicle speed meter device) which is expressed by the image really exists. However, the display device in the related art merely expresses the three-dimensional effect depending on the uneven shape of the screen, the three-dimensional effect is restricted, and there is room for improvement.

In addition, there is a case where a part of the display light is reflected at a first uneven part, and the reflected display light is incident on a second uneven part according to a condition, such as an angle of unevenness formed on the screen, or an incident angle of the display light on the uneven part. Then, an image to be displayed at the first part is also displayed (double-display) at the second part, and there is a concern that appearance of the image is remarkably deteriorated.

Furthermore, even when the display light reflected at the first uneven part is incident on a part where unevenness is not formed on the screen, or even when the display light reflected at a part where unevenness is not formed on the screen is incident on the second uneven part, there is a possibility that the double-display is generated similarly to the description above.

In consideration of the points described above, an object of the present disclosure is to provide a vehicle display device which can express the three-dimensional effect of a virtual object expressed by an image with reality and can make the virtual object visually recognizable in a three-dimensional manner. In addition, another object of the present disclosure is to provide a vehicle display device which can suppress the deterioration of the appearance of the image due to double-display.

In a first aspect of the present disclosure, a vehicle display device includes a projector that emits display light of an image indicating vehicle information, a controller that controls luminance of the display light, and a screen that displays the image when the display light is projected onto the screen, in which the screen has a convex portion that protrudes to a near side in a direction in which the image is visually recognized, and a concave portion that is recessed toward a far side, and the controller controls the display light such that the display light projected to a first part that is defined as one of the convex portion and the concave portion has higher luminance than that of the display light projected to a second part that is defined as an other of the convex portion and the concave portion.

According to the aspect, as luminance of the display light projected to the concave portion and luminance of the display light projected to the convex portion of the screen are different from each other, a depth feeling of the concave portion and the convex portion of the screen can be emphasized. Therefore, the three-dimensional effect of the virtual object by the image displayed in the uneven portion of the screen can be expressed, and the virtual object can be visually recognized in a three-dimensional manner.

In a second aspect of the present disclosure, a vehicle display device includes a projector that emits display light of an image indicating vehicle information, a controller that controls luminance of the display light, and a screen that has a front surface on which the image is visually recognized and a rear surface opposite to the front surface, the screen displaying the image when the display light is projected onto the screen, in which the screen has a convex portion that protrudes to the front surface side and a concave portion that is positioned relatively close to the rear surface as compared to the convex portion, the convex portion having an inclined surface that widens toward the concave portion from a top of the convex portion, and the controller controls the luminance of the display light passing through the inclined surface to be lower than the luminance of the display light passing through the top.

Here, when the display light toward the inclined surface is reflected on the inclined surface, and the reflected light (hereinafter, referred to as a first reflected light) is incident on a top of the concave portion, the image formed by light (hereinafter, referred to as mixed light) in which the display light projected toward the top and the first reflected light are mixed with each other is displayed in the top. For this reason, as the luminance of the first reflected light increases, the influence of the first reflected light on the mixed light increases, and the first reflected light is remarkably visually recognized in the top. For example, when the first reflected light is white and the second display light is blue, a color which is close to white is visually recognized as the blue color is absorbed into the white color. In other words, the first reflected light (white color) is more remarkably visually recognized than the second display light (blue color) which is originally desired to be visually recognized on the top of the screen.

In consideration of the above-described points, in the second aspect, a controller controls the luminance of the display light which passes through the inclined surface to be lower compared to the luminance of the display light which passes through the top. Accordingly, the influence of the first reflected light can be reduced with respect to the mixed light in which the display light that passes through the top and the first reflected light are mixed with each other. In other words, the first reflected light can be suppressed not to be more remarkably visually recognized than the display light which is originally desired to be visually recognized. Therefore, display (double-display) of the image to be displayed on the inclined surface in the top, and deterioration of appearance of the image can be suppressed.

EMBODIMENTS FOR CARRYING OUT INVENTION

Figure 1:
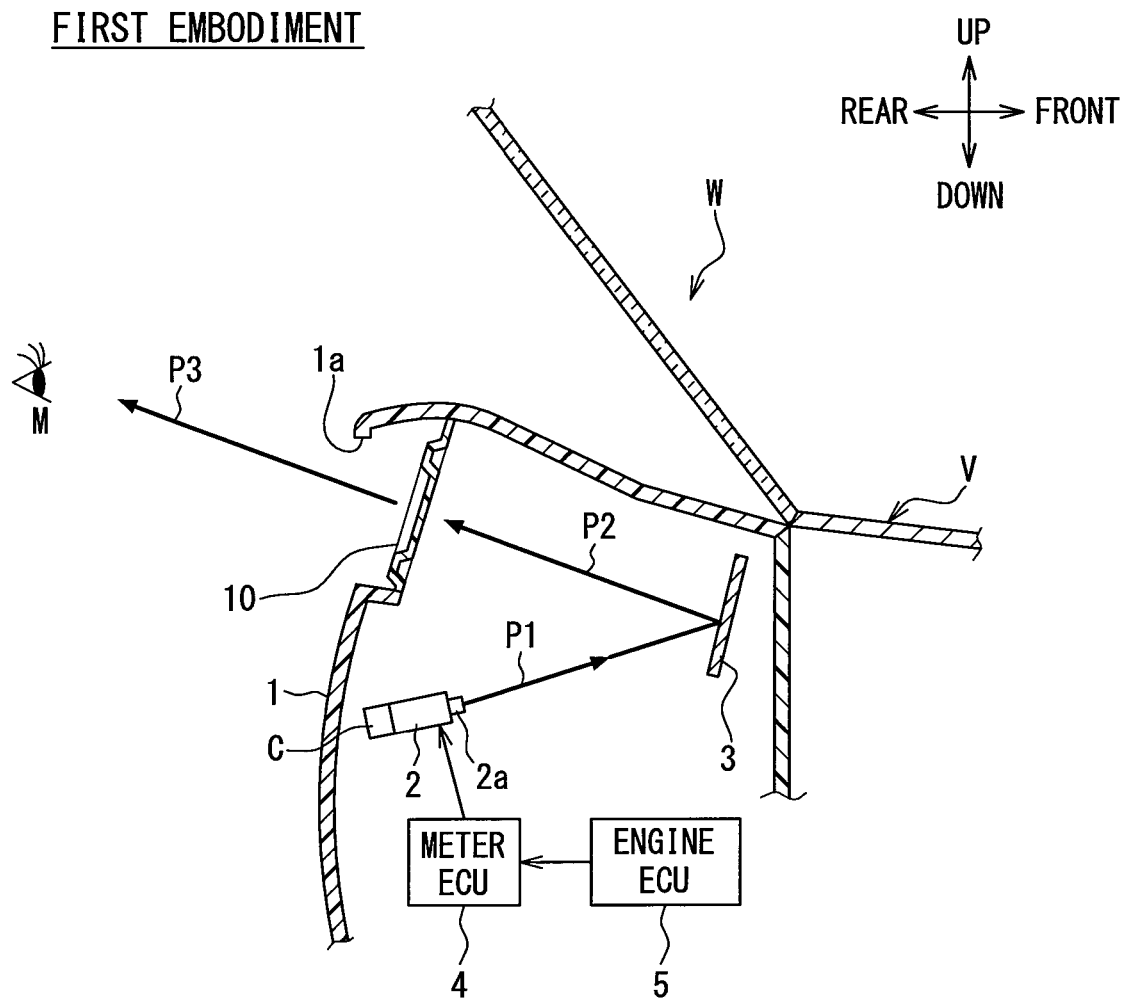
FIG. 1 is a cross-sectional view schematically illustrating the entire configuration of a vehicle display device in a first embodiment of the present disclosure.

Hereinafter, multiple embodiments for carrying out the disclosure will be described with reference to the drawings. In each embodiment, there is a case where the same reference numerals are given to the parts which correspond to the contents described in previous embodiments, and the overlapped description thereof is omitted. In each embodiment, when only a part of the configuration is described, another embodiment previously described can be employed for other parts of the configuration. In each embodiment, not only a combination of the parts of which a possibility of specific combination is clearly described, but also partial combination of this embodiments is possible without clear description if no particular trouble occurs in the combination.

First Embodiment

As illustrated in FIG. 1, on a lower side of a front windshield W inside a vehicle V, an instrument panel 1 is disposed. In the instrument panel 1, a vehicle display device which will be described in detail later is installed. In addition, an arrow illustrating vertical and horizontal directions of FIG. 1 illustrates vertical and horizontal directions of a vehicle in a state where the vehicle display device is installed in the instrument panel 1.

The vehicle display device is provided with a projector 2, a reflecting mirror 3, and a screen 10, which will be described hereinafter. The projector 2 emits display light P1 of an image which shows vehicle information. The projector 2 is provided with a magnifying lens 2a, and an angle of magnifying the display light P1 is adjusted by the magnifying lens 2a. Specific examples of the "vehicle information" shown by the above-described image include a vehicle speed, an engine rotation speed, a shift range of an automatic transmission, an amount of remaining fuel, an engine coolant temperature, and various types of warning information.

The reflecting mirror 3 reflects the display light P1 emitted from the projector 2 toward the screen 10. In the example of FIG. 1, a reflecting surface of the reflecting mirror 3 has a shape of a plane. The screen 10 is a resin-made plate having translucency, and is formed in a shape having unevenness which will be described in detail later.

Display light P2 which is reflected by the reflecting mirror 3 transmits from a far side (rear surface side) to a near side (front surface side) by considering a viewer M as a reference on the screen 10. Display light P3 which transmits the screen 10 is input towards the eyes of a user who is the viewer M. In other words, by projecting the display light P2 to the screen 10, an image is displayed on the screen 10 and is visually recognized by the user.

A video signal output from an electronic control device (meter ECU 4) is input to the projector 2, and the projector 2 generates and emits the display light P1 based on the video signal. A controller C is provided in the projector 2, and controls luminance of the display light P1 emitted from the projector 2. In other words, by controlling the display light P1, the controller C controls the luminance of the image displayed on the screen 10. The display light P1 (image) changes in accordance with vehicle information. In other words, the video signal is a moving image signal, and the image displayed on the screen 10 is a moving image.

An electronic control device (engine ECU 5) which controls an operation of an engine is mounted on the vehicle V. The engine ECU 5 calculates vehicle information, such as a vehicle speed, an amount of remaining fuel, and an engine coolant temperature, based on a detection value of various types of sensors, such as a crank angle sensor, a fuel level sensor, or a water temperature sensor. Based on the calculated vehicle information or the operation contents of a vehicle driver, the engine ECU 5 controls the operation of the engine (internal combustion engine). In addition, the engine ECU 5 determines whether or not abnormality is generated in each type of component, such as the engine, based on the vehicle information. When it is determined that the abnormality is generated, the engine ECU 5 sends a signal indicating the abnormality (abnormality signal) to the meter ECU 4.

The meter ECU 4 obtains various types of vehicle information from the engine ECU 5, and obtains the abnormality signal output from the engine ECU 5 and another electronic control device which is not illustrated. The meter ECU 4 generates the video signal for displaying the moving image in accordance with the obtained vehicle information and the abnormality signal, and outputs the video signal to the projector 2. The meter ECU 4 is provided with a storage device in which data or the like which is necessary for generating the video signal is stored, and a calculation processing device which performs various types of calculation processing, such as generation processing of the video signal or communication processing with the engine ECU 5.

Figure 2:
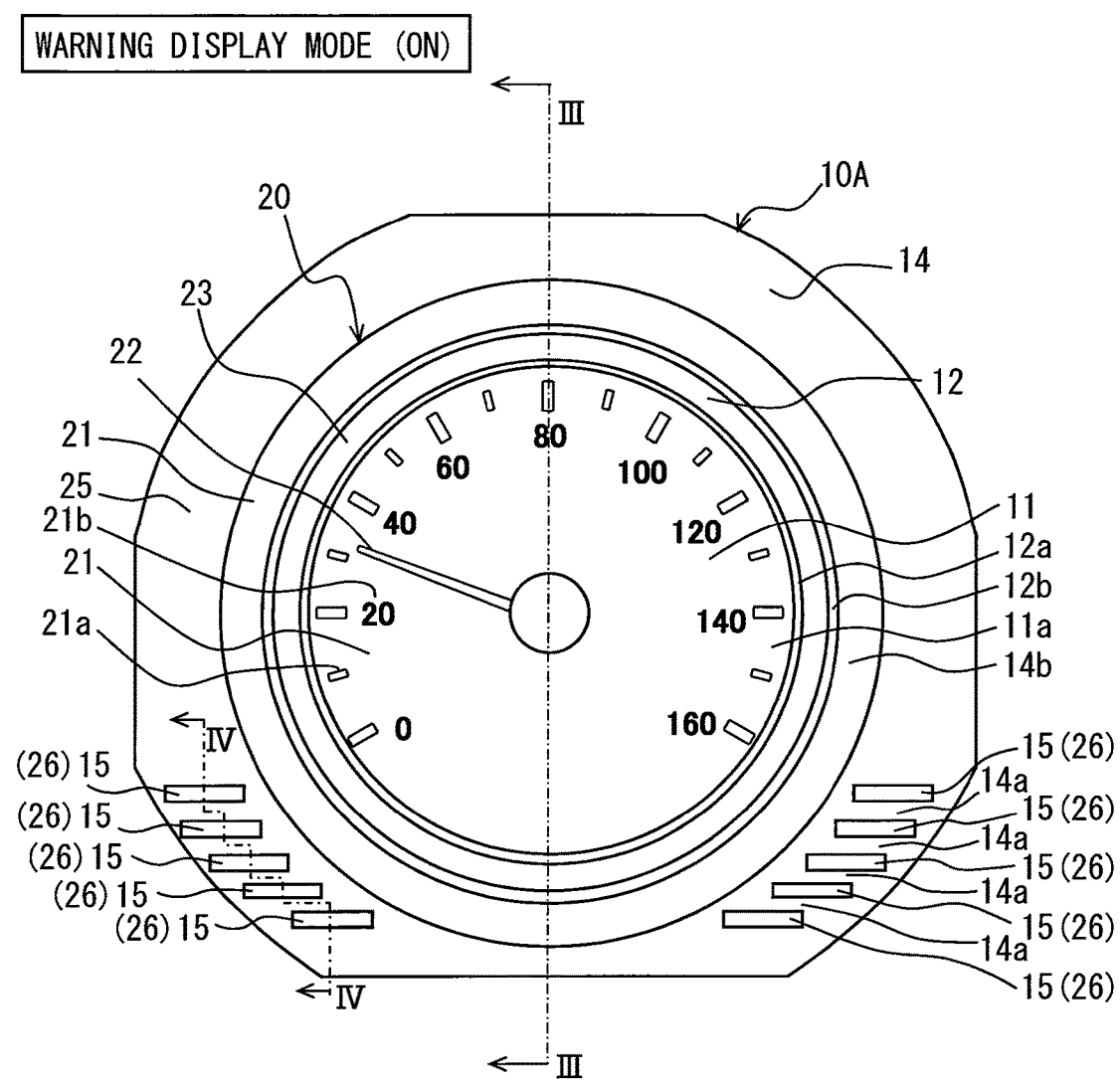
FIG. 2 is a front surface of a meter image displayed on a screen of FIG. 1.

As illustrated in FIG. 2, an image (meter image 20) which shows a meter device configured by combining multiple components is included in the image displayed on the screen 10. The above-described "multiple components" are a scale plate 21 (scale plate image), a pointer 22 (pointer image), and a dial 23 (dial image) which will be described later. In addition, the scale plate 21, the pointer 22, and the dial 23 are not real objects, but the images. In the description below, the component image will be simply described as the scale plate 21, the pointer 22, and the dial 23.

The scale plate 21 has multiple scales 21a (scale images) and numbers 21b (number images). The scales 21a and the numbers 21b are also not real objects, but the images, and in the description below, the component images will be simply described as the scales 21a and numbers 21b. In addition, the pointer 22 rotates and indicates the scale 21a.

A background image 25 is included in the image displayed on the screen 10. The background image 25 is positioned in the periphery of the meter image 20. Multiple ambient images 26 are included in the background image 25. The ambient images 26 are disposed on both left and right sides of the meter image 20. In addition, the multiple ambient images 26 are disposed to be arranged at an equivalent interval along an arc of the scale plate 21. While the dial 23 has a circular shape, each of the ambient images 26 has a shape of a bar which extends in a predetermined direction (horizontal direction of FIG. 2) when viewed from the viewer M side. In addition, there is a case where each of the ambient images 26 is switched to a high luminance image 27 and a low luminance image 28 illustrated in FIG. 6, and this point will be described in detail later by using FIG. 6.

Figure 3:
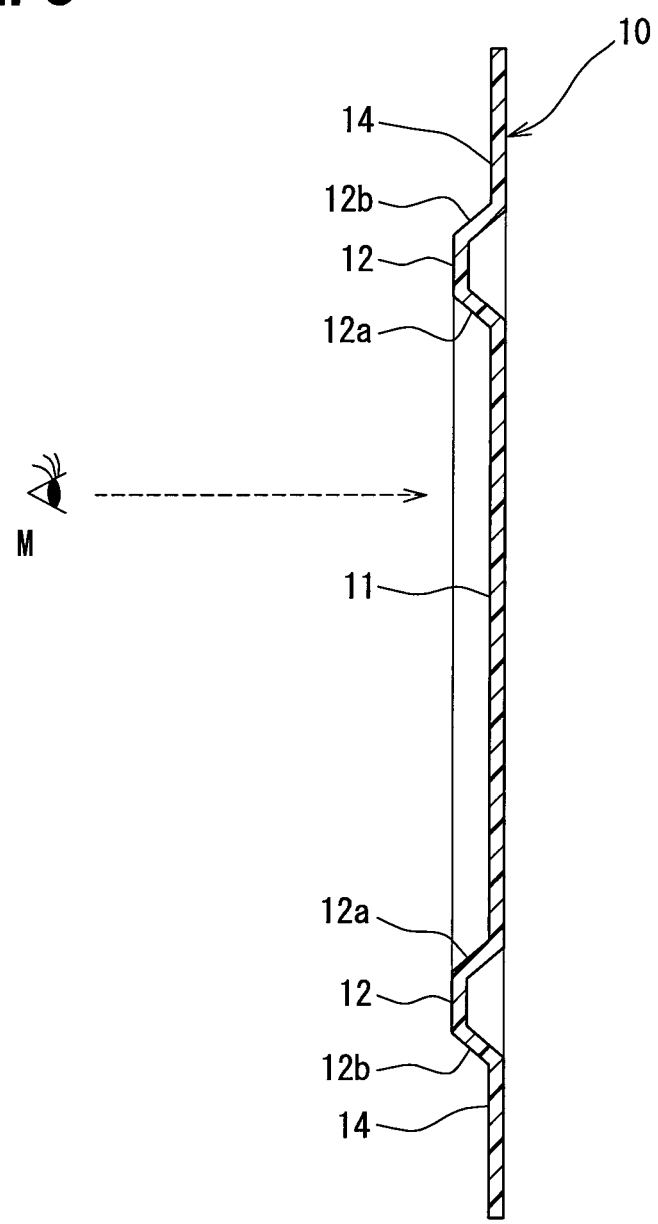
FIG. 3 is a cross-sectional view along line III-III of FIG. 2.
Figure 4:
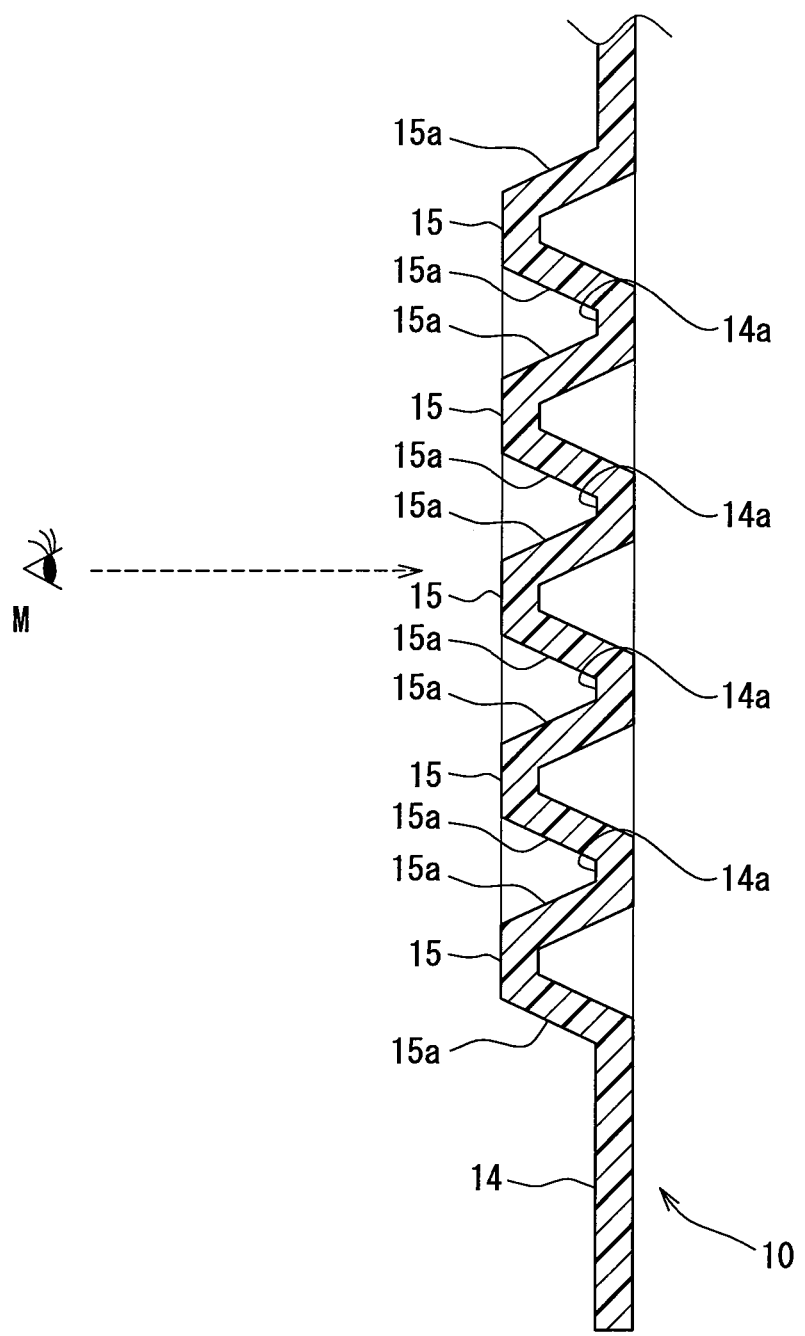
FIG. 4 is a cross-sectional view along line IV-IV of FIG. 2.

As illustrated in FIGS. 3 and 4, the screen 10 has a shape of a plate having a constant thickness in which a circular convex portion 12, an inner inclined portion 12a and an outer inclined portion 12b, a bar-shaped convex portion 15, and an inclined portion 15a are formed. Further, the screen 10 includes a center portion 11 and an outer circumferential portion 14 which will be described later. The center portion 11 configures the center part of the screen 10, and is positioned on an inner circumferential side of the circular convex portion 12. The outer circumferential portion 14 is positioned on an outer circumferential side of the circular convex portion 12. The center portion 11 and the outer circumferential portion 14 have a flat shape which widens in a direction that intersects with a visual-recognition direction. Since the center portion 11 and the outer circumferential portion 14 are positioned being separated from the viewer M more than the circular convex portion 12, the center portion 11 and the outer circumferential portion 14 can be considered as a concave portion. In addition, in this embodiment, a direction which is perpendicular to the screen 10 (that is, the center portion 11 and the outer circumferential portion 14) is defined as the visual-recognition direction of the viewer M.

The circular convex portion 12, the inner inclined portion 12a, and the outer inclined portion 12b protrude to the viewer M side (near side), and have a circular shape when viewed from the viewer M side. The inner inclined portion 12a has a gradually inclined shape in an outer radial direction toward the viewer M side from an outer circumferential end of the center portion 11. The circular convex portion 12 has a flat shape which widens in a radial direction from an outer circumferential end of the inner inclined portion 12a. The outer inclined portion 12b has a gradually inclined shape in an inner radial direction toward the viewer M side from an inner circumferential end of the outer circumferential portion 14.

The bar-shaped convex portion 15 and the inclined portion 15a protrude to the near side, have a shape of a bar which extends in the horizontal direction when viewed from the viewer M side, and are positioned on the outer side of the outer inclined portion 12b in the radial direction. The inclined portion 15a has a gradually inclined shape in the outer radial direction toward the viewer M side from a predetermined part of the outer circumferential portion 14. The bar-shaped convex portion 15 has a flat shape which widens in parallel with the outer circumferential portion 14 from an upper end of the inclined portion 15a.

In addition, the circular convex portion 12 and the bar-shaped convex portion 15 are one aspect of a "convex portion" described within the range of the appended claims. A part (refer to reference numerals 11a and 14b in FIGS. 2 and 3) which is adjacent to the inner inclined portion 12a and the outer inclined portion 12b in the center portion 11 and the outer circumferential portion 14 is one aspect of a "concave portion" described within the range of the appended claims, and corresponds to the circular convex portion 12. In addition, a part (refer to a reference numeral 14a in FIGS. 2 and 4) which is positioned between the multiple bar-shaped convex portions 15 in the outer circumferential portion 14 is one aspect of a "concave portion" described within the range of the appended claims, and corresponds to the bar-shaped convex portion 15. The inner inclined portion 12a and the outer inclined portion 12b are one aspect of a "linking portion" described within the range of the appended claims, and correspond to the circular convex portion 12. In addition, the inclined portion 15a is one aspect of the "linking portion" described within the range of the appended claims, and corresponds to the bar-shaped convex portion 15.

Returning to the description of FIG. 2, the dial 23 has a circular shape which surrounds the multiple scales 21a. The scale plate 21 is displayed in the center portion 11 and the outer circumferential portion 14 of the screen 10. The pointer 22 is displayed in the center portion 11, and the dial 23 is displayed in the circular convex portion 12, the inner inclined portion 12a, and the outer inclined portion 12b. Therefore, the dial 23 is visually recognized to be present on a side nearer than the scale plate 21.

A boundary line between the outer inclined portion 12b and the outer circumferential portion 14 is positioned on an outline of the outer circumferential side of the dial 23, and a boundary line between the inner inclined portion 12a and the center portion 11 is positioned on an outline of the inner circumferential side of the dial 23. In short, the boundary lines between the inner inclined portions 12a and 12b, and the center portion 11 and the outer circumferential portion 14 match a boundary line between the component images.

The center portion 11 and the outer circumferential portion 14 of the screen 10 are displayed in the same color, and the circular convex portion 12 and the inclined portions 12a and 12b are displayed in a color different from the color of the center portion 11 and the outer circumferential portion 14. Accordingly, visual recognition of the scale plate 21 that is present and straddles the dial 23 in the radial direction, and visual recognition of the dial 23 that is present on the near side of the scale plate 21, can be accelerated. In addition, as approaching the circular convex portion 12, the inner inclined portion 12a and the outer inclined portion 12b are displayed in gradation so that the color of the center portion 11 and the outer circumferential portion 14 gradually changes to the color of the circular convex portion 12.

The controller C controls the luminance of the display light so that the display light projected to the circular convex portion 12 has higher luminance than that of the display light projected to the concave portions 11a and 14b. In other words, the dial 23 is an image having higher luminance than that of the scale plate 21. In addition, the controller C controls the luminance of the display light to gradually change the luminance thereof so that the display light projected to the inner inclined portion 12a and the outer inclined portion 12b has higher luminance as it approaches the circular convex portion 12. In other words, the images of the inner inclined portion 12a and the outer inclined portion 12b are displayed in gradation. Here, in the description (including other embodiments) above, the "luminance" is a value which is made by dividing luminous intensity by a light source area. In addition, the "luminous intensity" is a value which is obtained by integrating a value which is obtained by multiplying radiant intensity for every wavelength by a relative luminous efficiency for every wavelength. Examples of the relative luminous efficiency include a standard relative luminous efficiency which is determined by the General Conference of Weights and Measures.

The ambient image 26 is displayed in the bar-shaped convex portion 15 and the inclined portion 15a. A boundary line between the inclined portion 15a and the outer circumferential portion 14 (concave portion 14a) is positioned on an outline of the outer circumferential side of the ambient image 26. In addition, the bar-shaped convex portion 15 and the inclined portion 15a are displayed in a color different from the color of the concave portion 14a. Accordingly, the visual recognition of the ambient image 26 that is present on the near side of the background image 25 is accelerated. In addition, as approaching the bar-shaped convex portion 15, the inclined portion 15a is displayed in gradation so that the color of the concave portion 14a gradually changes to the color of the bar-shaped convex portion 15.

The controller C controls the luminance of the display light so that the display light projected to the bar-shaped convex portion 15 has higher luminance than that of the display light projected to the concave portion 14a. In other words, the ambient image 26 becomes an image having higher luminance than that of the background image 25. In addition, the controller C controls the luminance of the display light so that the luminance of the display light projected to the inclined portion 15a gradually changes to be higher luminance as approaching the bar-shaped convex portion 15. In other words, the image of the inclined portion 15a is displayed in gradation. In addition, in FIGS. 2 and 6, the image displayed in the inclined portion 15a is omitted in the drawing.

The meter ECU 4 generates the video signal in accordance with the obtained vehicle information. Specifically, the meter ECU 4 generates the video signal so that the pointer 22 rotates to a position which indicates the scale 21a in accordance with a traveling speed (hereinafter, simply called a vehicle speed) of the vehicle. In addition, as the amount of remaining fuel and the engine coolant temperature which will be described in detail later are illustrated (refer to FIG. 6), the meter ECU 4 generates the video signal. Furthermore, the meter ECU 4 generates the video signal in accordance with the presence or the absence of the abnormality signal.

Figure 5:
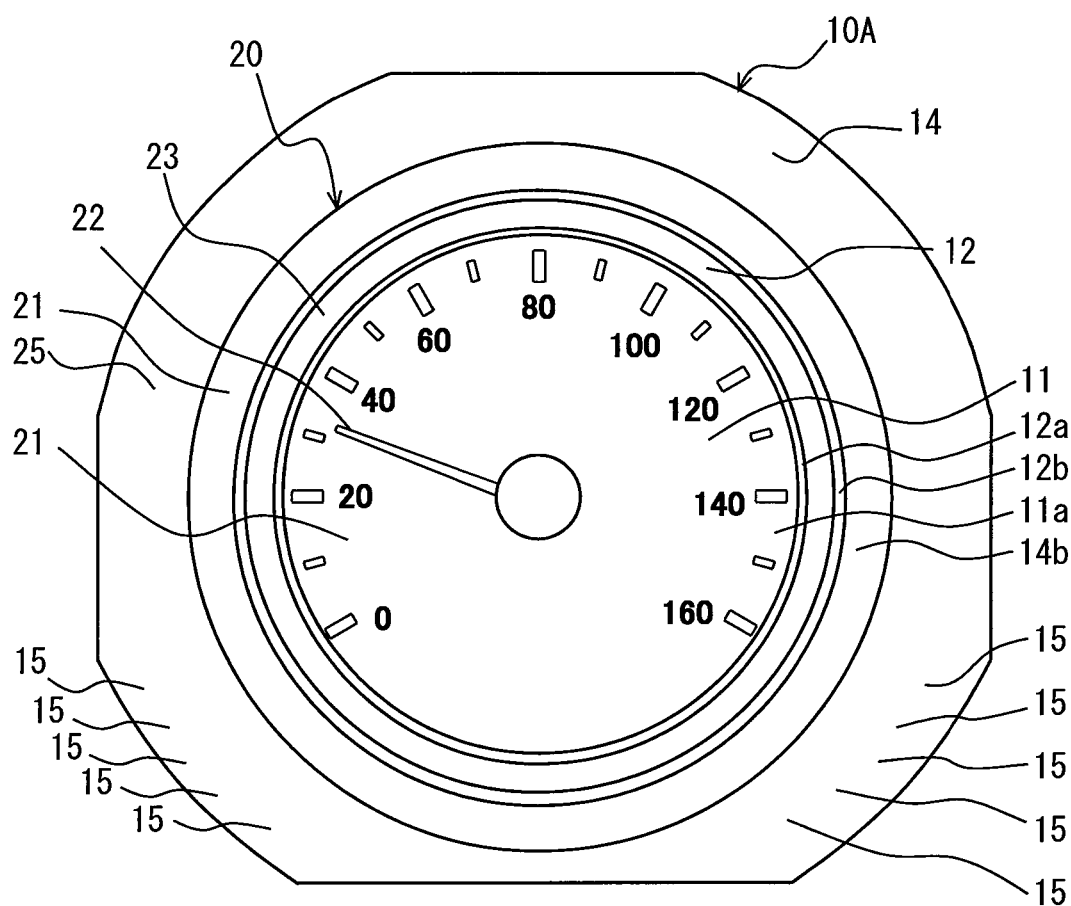
FIG. 5 is a front view of the meter image illustrating a state where a bar image is turned off in the first embodiment.

Hereinafter, by using FIGS. 2, 5, and 6, a change in the video signal in accordance with the presence and the absence of the vehicle information and the abnormality signal, that is, a change in the meter image 20 and the background image 25, will be described.

Figure 6:
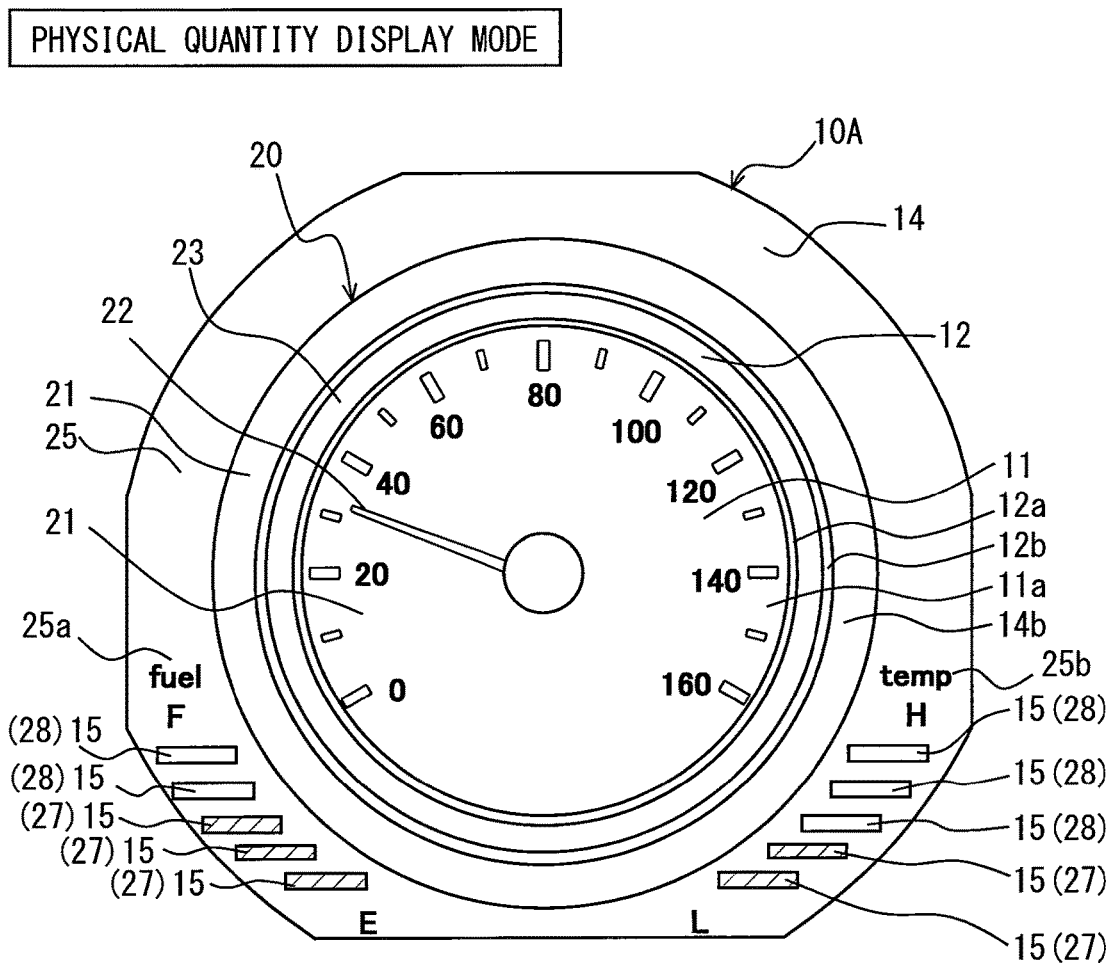
FIG. 6 is a front view of the meter image illustrating a display state by a physical quantity display mode in the first embodiment.

The images 20 and 25 are displayed by switching a warning display mode illustrated in FIGS. 2 to 5, and a physical quantity display mode illustrated in FIG. 6. Any of the display modes has the meter image 20 as common display content, and the pointer 22 rotates to display a vehicle speed.

When the abnormality signal is generated, the display mode is switched to the warning display mode, and the ambient image 26 is displayed in the multiple bar-shaped convex portions 15. Specifically, the multiple ambient images 26 is repeatedly turned on (refer to FIG. 2) and off (refer to FIG. 5). In this manner, when the abnormality signal is generated, by changing the display mode of the bar-shaped convex portion 15, a warning of an indication of generation of abnormality is notified to a vehicle occupant. In addition, when the ambient image 26 is turned off, an image which has the same color as that of the outer circumferential portion 14 is displayed in the bar-shaped convex portion 15.

Meanwhile, when the abnormality signal is not generated, the display mode is switched to the physical quantity display mode illustrated in FIG. 6. Then, the high luminance image 27 and the low luminance image 28 which notify the engine coolant temperature and the amount of remaining fuel are displayed in the multiple bar-shaped convex portions 15. The high luminance image 27 is displayed in a color different from that of the background image 25 displayed in the concave portion 14a, and is displayed with higher luminance than that of the background image 25. The low luminance image 28 is displayed in a color different from that of the background image 25 and the high luminance image 27, and is displayed with lower luminance than that of the high luminance image 27.

Among the multiple bar-shaped convex portions 15 which are positioned on a left side of the meter image 20, the high luminance image 27 is displayed in the bar-shaped convex portion 15 (refer to diagonal lines in FIG. 6) showing a numerical value in accordance with the amount of remaining fuel, and the low luminance image 28 is displayed in other bar-shaped convex portions 15. In addition, at an approximate part where the images 27 and 28 are displayed in the background image 25, letters 25a indicating the notification of the amount of remaining fuel are displayed. Therefore, since the numerical values that are the high luminance images 27 which are positioned on the left side of the meter image 20 are visually recognized, the user can visually recognize the amount of remaining fuel.

Among the multiple bar-shaped convex portions 15 which are positioned on a right side of the meter image 20, the high luminance image 27 is displayed in the bar-shaped convex portion 15 (refer to diagonal lines in FIG. 6) showing a numerical value in accordance with the engine coolant temperature, and the low luminance image 28 is displayed in other bar-shaped convex portions 15. In addition, at an approximate part where the images 27 and 28 are displayed in the background image 25, letters 25b indicating the notification of the engine coolant temperature are displayed. Therefore, since the number of high luminance images 27 which are positioned on the right side of the meter image 20 is visually recognized, the user can visually recognize the engine coolant temperature.

In short, the vehicle display device of this embodiment described above has characteristics which will be described below. In addition, by each of the characteristics, operation effects which will be described below are achieved.

<Characteristic 1>

In this embodiment, the circular convex portion 12 and the bar-shaped convex portion 15 may be one aspect of a "first part that is defined as one of the convex portion and the concave portion" described within the range of the appended claims, and the concave portions 11a, 14b, and 14a which are positioned around the first part is one aspect of a "second part that is defined as an other one of the convex portion and the concave portion". In addition, the controller C controls the luminance of the display light so that the display light projected to the first part has higher luminance than that of the display light projected to the second part. Therefore, on the screen 10, the parts which are at the same position in the visual-recognition direction are displayed with the same luminance as each other, and the parts which are at different positions are displayed with different luminance from each other.

For this reason, the user can reliably visually recognize the depth of unevenness formed on the screen 10, that is, a projecting height of the convex portions 12 and 15 in the visual-recognition direction. Accordingly, acceleration of three-dimensional vision can be achieved, and as a result, the illusion that the virtual object really exists by the meter image 20 or the background image 25 that is given to the user is accelerated.

<Characteristic 2>

In this embodiment, the display mode of the image displayed in the first part 15 is changeable. According to this, since the change in the display mode of the image is performed at the first part (bar-shaped convex portion 15) in which the three-dimensional effect of the virtual object is expressed with reality, the change is likely to be visually recognized, and outstanding display may become possible.

Furthermore, in this embodiment, a warning is notified to the vehicle occupant by the change in the display mode. Specifically, as the display mode of the ambient image 26 displayed in the bar-shaped convex portion 15 (first part) is changed, the warning is notified to the vehicle occupant. According to this, since the warning is notified at a three-dimensional part in which the unevenness is formed on the screen 10, the user's notice of the indication of warning notification to the point of being immediate can be accelerated.

<Characteristic 3>

In this embodiment, multiple first parts (bar-shaped convex portions 15) are arranged. In addition, the display mode of the image for a respective one of the multiple first parts is changeable in accordance with the change in the physical quantity of a vehicle state.

Specifically, the image (high luminance image 27) which is displayed in the bar-shaped convex portion 15 showing a numerical value according to the amount of remaining fuel and the temperature (a predetermined physical quantity value) among the multiple bar-shaped convex portions 15 (first parts) is displayed in a mode which is different from that of other bar-shaped convex portions 15 (low luminance image 28). Accordingly, the amount of remaining fuel and the temperature (a predetermined physical quantity value) are notified to the vehicle occupant. In other words, the number of high luminance images 27 which are displayed with higher luminance than that of the low luminance image 28 increases and decreases according to the predetermined physical quantity value.

Therefore, according to this embodiment of such a configuration, since the physical quantity is notified at the three-dimensional part in which the unevenness is formed on the screen 10, the user easily recognizes the change in the physical quantity.

<Characteristic 4>

In this embodiment, multiple first parts (bar-shaped convex portions 15) are arranged. In addition, changing the display mode of the image for a respective one of the multiple first parts 15 according to the change in the physical quantity of the vehicle state, and changing the display mode of the image for the first parts, are set to be switched from and to each other.

Specifically, the physical quantity display mode and the warning display mode are switched from and to each other. In the physical quantity mode, the image displayed in the bar-shaped convex portion 15 of which the number corresponds to the predetermined physical quantity among the multiple the bar-shaped convex portions 15 (first parts) is displayed in a mode which is different from that of other bar-shaped convex portions 15. In the warning display mode, by changing the display mode of the ambient image 26 displayed in the multiple bar-shaped convex portions 15 (first parts), the warning indicating generation of the abnormality in some part of the vehicle is notified to the occupant.

According to this, both the physical quantity display mode and the warning display mode can be displayed by using the same uneven part on the screen 10. For this reason, it is not necessary to separately form the uneven shape dedicated for the physical quantity display, and the uneven shape dedicated for the warning display.

<Characteristic 5>

In this embodiment, the screen 10 includes linking sections 11a, 14b, and 15a which link the convex portions 12 and 15 to the concave portions 11a, 14b, and 14a. In addition, the controller C controls the display light projected to the linking portions 11a, 14b, and 15a so that the luminance changes between the luminance of the display light projected to the convex portions 12 and 15 (first part) and the luminance of the display light projected to the concave portions 11a, 14b, and 14a (second part).

For this reason, the user's reliable visual recognition of the depth of the unevenness formed on the screen 10, that is, visual recognition of the projecting height of the convex portions 12 and 15 in the visual-recognition direction, can be accelerated.

Second Embodiment

Figure 7:
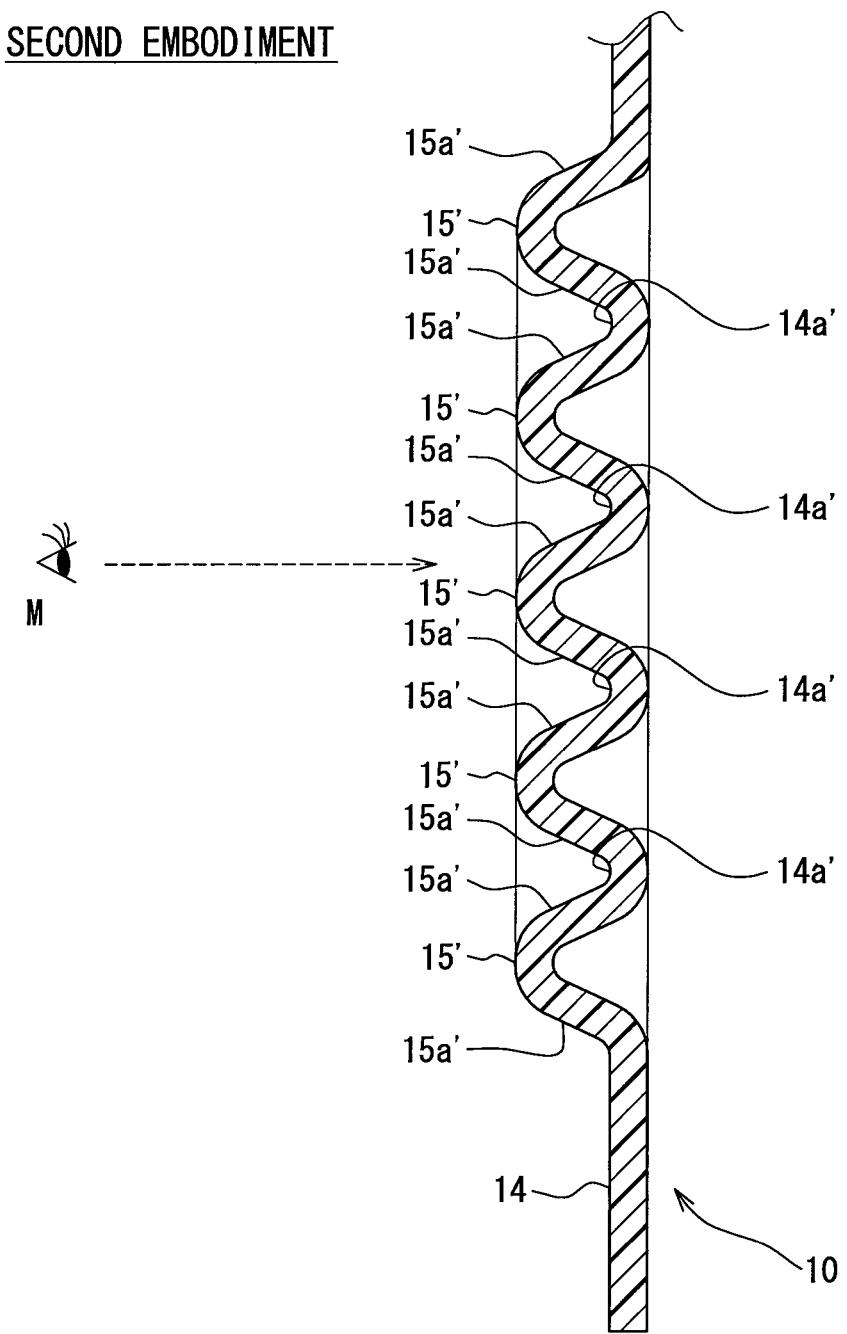
FIG. 7 is a view illustrating a sectional shape of a bar concave portion in a second embodiment of the present disclosure.

In the above-described first embodiment, the bar-shaped convex portion 15 and the concave portion 14a which is positioned around the bar-shaped convex portion 15, are formed in a flat shape, and have a shape of a cross-sectional view which linearly extends as illustrated in FIG. 4. In contrast to this, in this embodiment illustrated in FIG. 7, a bar-shaped convex portion 15' and a concave portion 14a' are formed in a shape of a curved cross-sectional view. In addition, the controller C performs control so that the image at a top part of the bar-shaped convex portion 15' is displayed with the highest luminance, and the luminance is gradually changed similarly to an inclined portion 15a' regarding the image at other parts in the bar-shaped convex portions 15'.

According to this embodiment, similar to above-described first embodiment, the controller C also controls the luminance of the display light so that the display light projected to the bar-shaped convex portion 15' (first part) has higher luminance than that of the display light projected to the concave portion 14a' (second part). For this reason, the user can reliably visually recognize the depth of unevenness formed on the screen 10, that is, a projecting height of the convex portions 12 and 15 in the visual-recognition direction.

Other Embodiments

The present disclosure is not limited to the description of the above-described embodiments, and modifications may be carried out as follows. In addition, characteristic configurations of each embodiment may be respectively arbitrarily combined.

In each of the above-described embodiments, the convex portions 12 and 15 are employed as the first part, and the controller C controls the luminance of the display light so that the display light projected to the convex portions 12 and 15 has higher luminance than that of the display light projected to the concave portions 11a, 14b, and 14a. In contrast to this, the concave portions 11a, 14b, and 14a may be employed as the first part, and the controller C may control the luminance of the display light so that the display light projected to the concave portions 11a, 14b, and 14a has higher luminance than that of the display light projected to the convex portions 12 and 15. According to this, compared to a case where the concave portions 11a, 14b, and 14a and the convex portions 12 and 15 have the same luminance as each other, the user can reliably visually recognize the projecting height of the convex portions 12 and 15 in the visual-recognition direction.

In each of the above-described embodiments, the bar-shaped convex portion 15 is disposed inside the circular convex portion 12. In other words, the ambient image 26, the high luminance image 27, and the low luminance image 28 are displayed outside a display region of the meter image 20. In contrast to this, the ambient image 26, the high luminance image 27, and the low luminance image 28 may be displayed in the display region of the meter image 20.

In the above-described first embodiment, in the warning display mode, the ambient image 26 is displayed being repeatedly turned on and off. In contrast to this, without turning off the ambient image 26, the ambient image 26 may be displayed by repeatedly changing the luminance or the color at a predetermined cycle.

In the above-described first embodiment, in the physical quantity display mode, the high luminance image 27 is displayed in the bar-shaped convex portion 15 showing a numerical value in accordance with the physical quantity, and the low luminance image 28 is displayed in other bar-shaped convex portions 15. In contrast to this, the low luminance image 28 may not be displayed in other bar-shaped convex portions 15, and the image may be turned off without projecting the display light to other bar-shaped convex portions 15.

In the above-described first embodiment, in any of the warning display mode and the physical quantity display mode, the display of the dial 23 does not change. In contrast to this, for example, during the warning display mode, the dial 23 may be displayed in a mode different from the physical quantity display mode. For example, during the warning display mode, compared to the physical quantity display mode, the dial 23 is displayed with high luminance. Otherwise, the display color of the dial 23 may be changed in accordance with the mode, for example, the dial 23 may be displayed in blue in the physical quantity display mode, and the dial 23 may be displayed in red in the warning display mode. Otherwise, the dial 23 may be displayed being turned on in the physical quantity amount, and the dial 23 may be displayed blinking in the warning display mode.

In the above-described first embodiment, in any of the warning display mode and the physical quantity display mode, the image of the bar-shaped convex portion 15 is displayed in the same color. In contrast to this, the ambient image 26 in the warning display mode, the high luminance image 27 or the low luminance image 28 in the physical quantity display mode, may be displayed in different colors or with different luminance.

In the above-described first embodiment, the display light P1 emitted from the projector 2 is reflected by the reflecting mirror 3, and is incident on the screen 10. In contrast to this, without providing the reflecting mirror 3, the display light P1 emitted from the projector 2 may be directly incident on the screen 10.

In each of the above-described embodiments, the image displayed by the vehicle display device is described as the meter image 20. In contrast to this, the image according to the present disclosure is not limited to the meter image 20, and for example, may be an image of a map by a navigation device. In this case, for example, the position of the vehicle on the map corresponds to the vehicle information.

In the above-described first embodiment, a part at which the dial 23 is displayed on the screen 10 protrudes to the viewer M side, but this part may be configured to be recessed to a side opposite to the viewer M. In other words, the unevenness of the screen 10 may be reversed.

In the example illustrated in FIG. 1, a reflecting surface of the reflecting mirror 3 has a shape of a plane, but the reflecting mirror 3 may be a magnifying mirror which magnifies and reflects the display light P1.

In the above-described first embodiment, the meter ECU 4 is provided with the storage device in which the data which is necessary for generating the video signal is stored, and the calculation processing device which generates the video signal. In contrast to this, the projector 2 may be provided with the storage device and the calculation processing device. In addition, the controller C may have the functions of the meter ECU 4. In this case, similarly to the meter ECU 4 described in the first embodiment, the controller C changes the display mode of the image displayed at the first part.

In the above-described first embodiment, a case where the controller C which controls the luminance of the display light is provided in the projector 2 is illustrated. However, the controller C and the projector 2 may be separately provided, and the meter ECU 4 may have the functions of the controller C. In other words, the meter ECU 4 may also control the luminance of the display light.

In the above-described first embodiment, the warning is notified to the vehicle occupant by changing the display mode of the image with respect to the first part 15. In contrast to this, the contents other than the warning may be notified by changing the above-described display mode.

In the above-described first embodiment, the number of first parts 15 which change the display mode may be changed in accordance with the predetermined physical quantity. In contrast to this, by changing the display mode of the first part 15 without changing the number of first parts 15, the predetermined physical quantity value may be expressed.

Third Embodiment

Next, a vehicle display device according to a third embodiment will be described with reference to FIGS. 8 to 11. In the third embodiment, when the unevenness is formed on the screen to make the image viewable in a three-dimensional manner, based on knowledge that a problem of double-display is likely to be generated due to the uneven shape, the vehicle display device which can respond to the double-display is specified.

Figure 8:
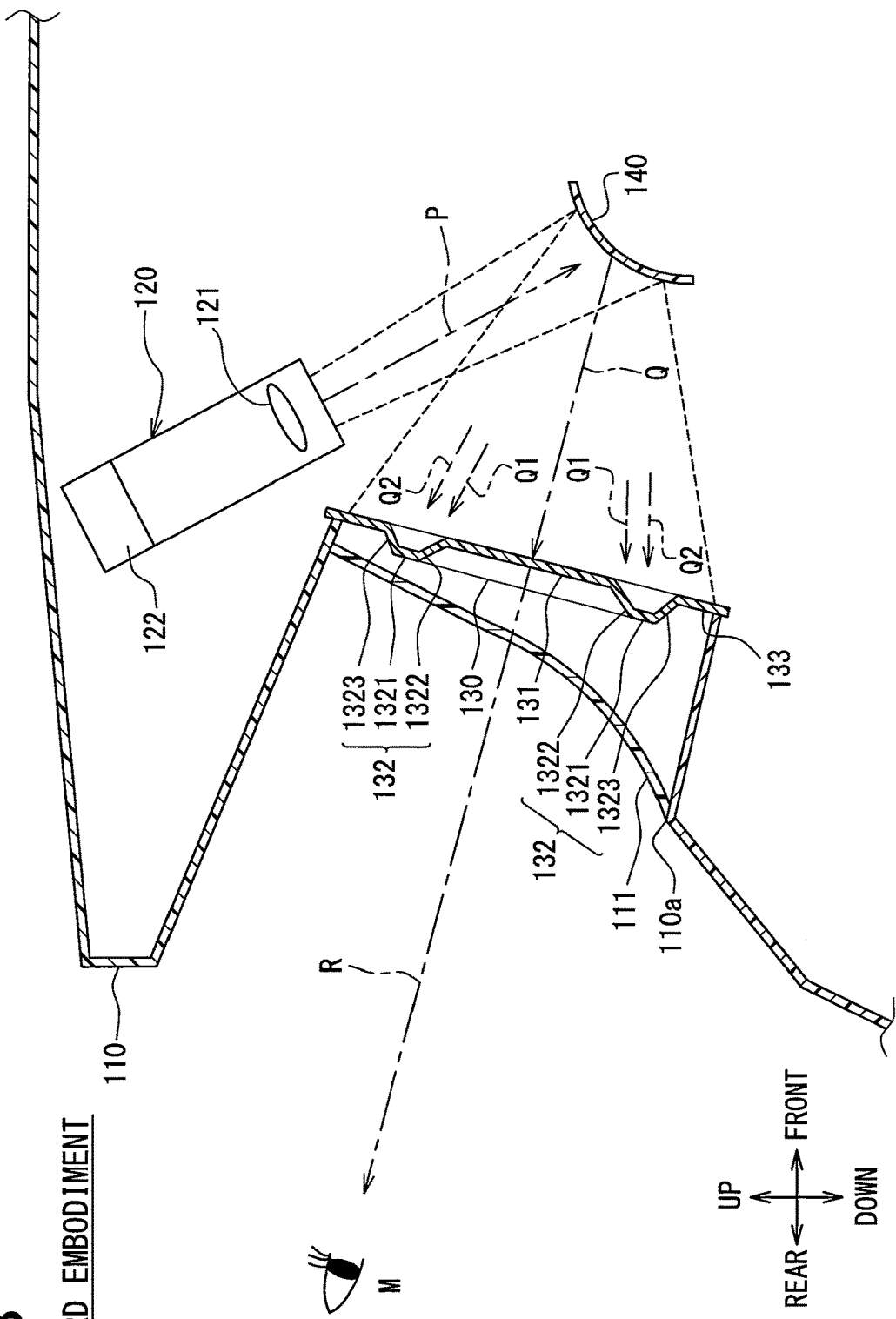
FIG. 8 is a cross-sectional view schematically illustrating the entire configuration of a vehicle display device according to a third embodiment of the present disclosure.

An instrument panel 110 illustrated in FIG. 8 is disposed below the front windshield inside the vehicle. The vehicle display device which will be described in detail later is installed in the instrument panel 110. In addition, an arrow illustrating the vertical and horizontal directions in FIG. 8 illustrates the vertical and horizontal directions of the vehicle in a state where the vehicle display device is installed in the instrument panel 110.

The vehicle display device is provided with a projector 120, a screen 130, and a reflecting mirror 140 which will be described below. The projector 120 emits display light P of the image which shows the vehicle information. Specific examples of the "vehicle information" shown by the above-described image include a vehicle speed, an engine rotation speed, a shift range of an automatic transmission, an amount of remaining fuel, an engine coolant temperature, and various types of warning information.

The projector 120 is provided with an optical distortion lens 121 and a light source which is not illustrated, which will be described later. In addition, a display light generation device 122 (controller) is provided in the projector 120. The display light generation device 122 allows light of the light source to transmit a liquid crystal panel, and generates the display light which shows a desired image. Otherwise, the display light generation device 122 allows the light of the light source to transmit a color filter which rotates at high speed, and generates the display light which shows the desired image. Furthermore, the display light generation device 122 controls the luminance of the display light. In other words, the display light generation device 122 controls the luminance of the image displayed on the screen 130 by controlling the luminance of the display light, as will be described later.

Distortion is not generated on the image generated by the display light generation device 122. The optical distortion lens 121 causes generation of such distortion of the image. By distorting the image by the optical distortion lens 121, distortion cannot be included in the image of display light R which transmits a convex portion 132 of the screen 130 which will be described later.

The reflecting mirror 140 reflects the display light P which is emitted from the projector 120 toward the screen 130. In the example of FIG. 8, a reflecting surface of the reflecting mirror 140 has a convex shape, and magnifies and reflects the display light P. Display light Q reflected by the reflecting mirror 140 transmits from the far side (rear surface side) to the near side (front surface side) with respect to the viewer M on the screen 130. The display light R which transmits the screen 130 is input towards the eyes of the user who is the viewer M. In other words, by projecting the display light Q to the screen 130, an image which is displayed on the screen 130 is visually recognized by the user.

The screen 130 is a resin-made plate having translucency, and is formed in a shape of a plate having a constant thickness on which the convex portion 132 is formed. The convex portion 132 protrudes to the viewer M side, and has a circular shape when viewed from the viewer M side (refer to FIG. 9). The screen 130 has a shape having a center portion 131 and an outer circumferential portion 133 which will be described later, in addition to the convex portion 132.

The center portion 131 configures the center part of the screen 130, and is positioned on the inner circumferential side of the circular convex portion 132. The outer circumferential portion 133 is positioned on the outer circumferential side of the circular convex portion 132. The center portion 131 and the outer circumferential portion 133 have a flat shape which widens perpendicularly to the visual-recognition direction. The center portion 131 and the outer circumferential portion 133 are concave portions which are positioned being separated from the viewer M more than the convex portion 132. In addition, the convex portion 132 is in a ring-shaped state on the screen 130. In addition, the center portion 131 which serves as the concave portion is in a state of being surrounded by the ring-shaped convex portion 132. In addition, even in this embodiment, similarly to the first embodiment, the direction which is perpendicular to the screen 130 is defined as the "visual-recognition direction" of the viewer M.

The convex portion 132 has a top 1321, an inner inclined portion 1322 (inclined surface), and an outer inclined portion 1323 (inclined surface), which will be described later. The inner inclined portion 1322 has an inclined shape of gradually swelling in the outer radial direction toward the viewer M side from an outer circumferential end of the center portion 131. The top 1321 has a flat shape which widens in the radial direction from an outer circumferential end of the inner inclined portion 1322. The outer inclined portion 1323 has an inclined shape of gradually swelling in the inner radial direction toward the viewer M side from an inner circumferential end of the outer circumferential portion 133. In other words, the inner inclined portion 1322 and the outer inclined portion 1323 are inclined widening toward the concave portion (the center portion 131 and the outer circumferential portion 133) from the top 1321.

Figure 9:
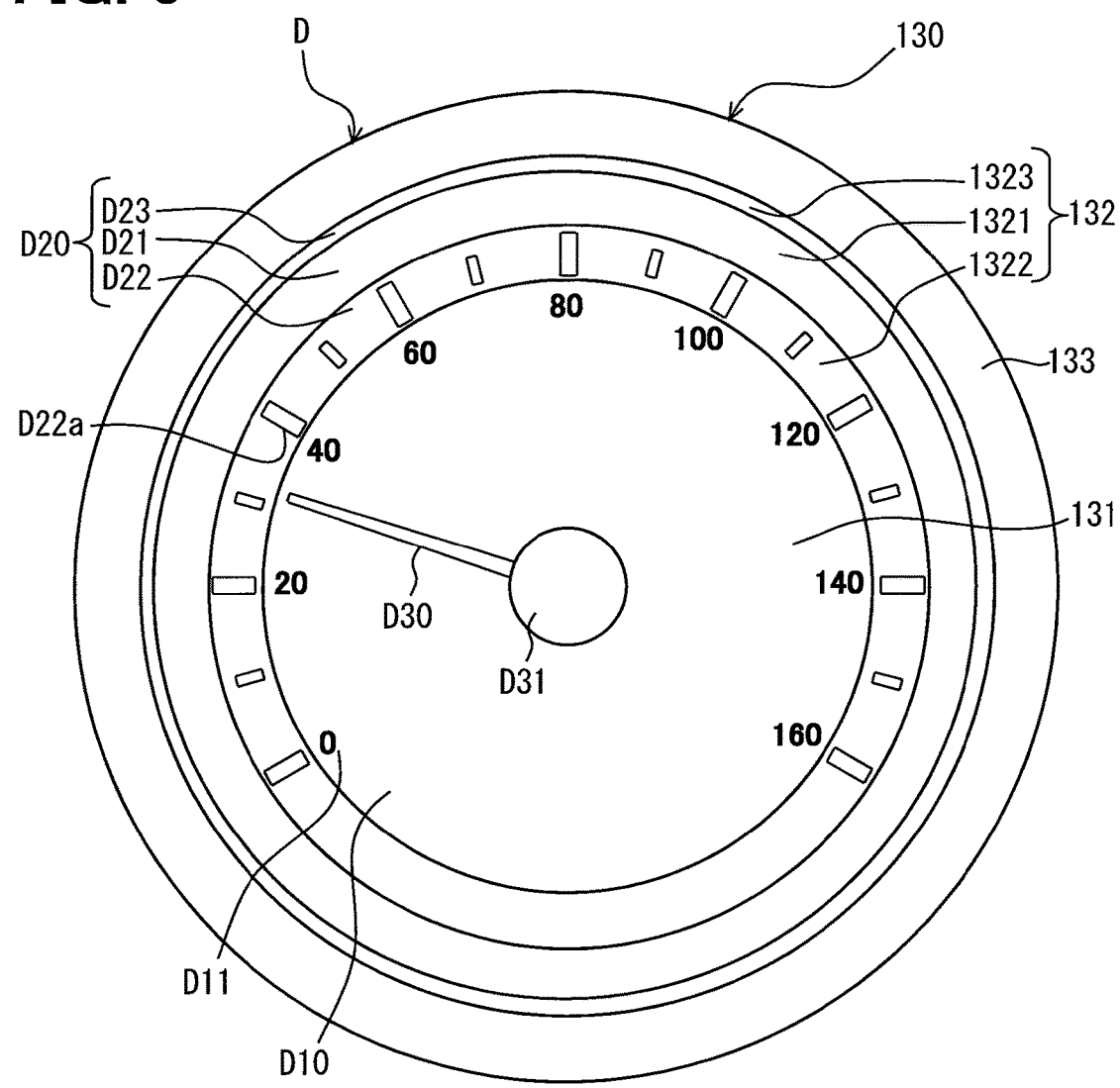
FIG. 9 is a front view illustrating one aspect of the meter image displayed on the screen illustrated in FIG. 8.

As illustrated in FIG. 9, the image displayed on the screen 130 is an image (meter image D) which shows the meter device configured by combining multiple components. The above-described "multiple components" are a scale plate D10, a decoration ring D20, a pointer D30, and a boss D31 which will be described later. The scale plate D10, the decoration ring D20, the pointer D30, and the boss D31 are not real components, but images (component images).

The scale plate D10 has a round shape, and the round boss D31 is displayed at the center of the scale plate D10. The pointer D30 has a shape of extending in the radial direction of the scale plate D10 from the boss D31, and is displayed as a moving image so as to rotate on the scale plate D10 around the boss D31.

The decoration ring D20 is an annular shape which surrounds the pointer D30, and is displayed in the convex portion 132. The scale plate D10 is displayed in the center portion 131 and the outer circumferential portion 133 of the screen 130. Therefore, the decoration ring D20 is visually recognized to be present being closer to the front side than the scale plate D10. A boundary line between the outer inclined portion 1323 and the outer circumferential portion 133 is positioned on an outline on an outer circumferential side of the decoration ring D20, and a boundary line between the inner inclined portion 1322 and the center portion 131 is positioned on an outline of an inner circumferential side of the decoration ring D20. In other words, a boundary between the center portion 131 and the outer circumferential portion 133, and the convex portion 132, matches a boundary between the component images.

In addition, the center portion 131 and the outer circumferential portion 133 of the screen 130 are displayed in the same color, and the top 1321 and inclined portions 132*b* and 132*c* are displayed in a color different from the color of the center portion 131 and the outer circumferential portion 133. Accordingly, the visual recognition of the scale plate D10 that is present and straddles the decoration ring D20 in the radial direction, and visual recognition of the decoration ring D20 that is present on the front side of the scale plate D10, are accelerated.

A multiple numbers D11 are displayed being aligned in a circumferential direction on the scale plate D10. A multiple scales D22*a* are displayed being aligned in the circumferential direction on the inner inclined portion 1322. The numbers D11 and the scales D22*a* are also not real printed objects, but images, and in the following description, the images are simply described as the numbers D11 and scales D22*a*. In addition, the pointer D30 which is rotated and displayed, rotates and indicates the scale D22*a*. Accordingly, the meter image D shows the vehicle speed which is the vehicle information.

Among the images displayed on the decoration ring D20, that is, the convex portion 132, an image (top image D21) displayed in the top 1321, an image (inner image D22) displayed in the inner inclined portion 1322, and an image (outer image D23) displayed in the outer inclined portion 1323, are respectively displayed in states different from each other.

The inner image D22 and the outer image D23 are displayed in gradation to gradually change from the color of the center portion 131 and the outer circumferential portion 133 to the color of the top 1321. In addition, the display light generation device 122 controls the luminance of the display light which passes through the inner inclined portion 1322 to be lower than the luminance of the display light which passes through the top 1321. In other words, the inner image D22 is set so that the luminance thereof is lower than that of the top image D21.

Next, technical significance of the above-described setting of the luminance of the inner image D22 to be low will be described by using FIGS. 10 and 11.

Figure 10:
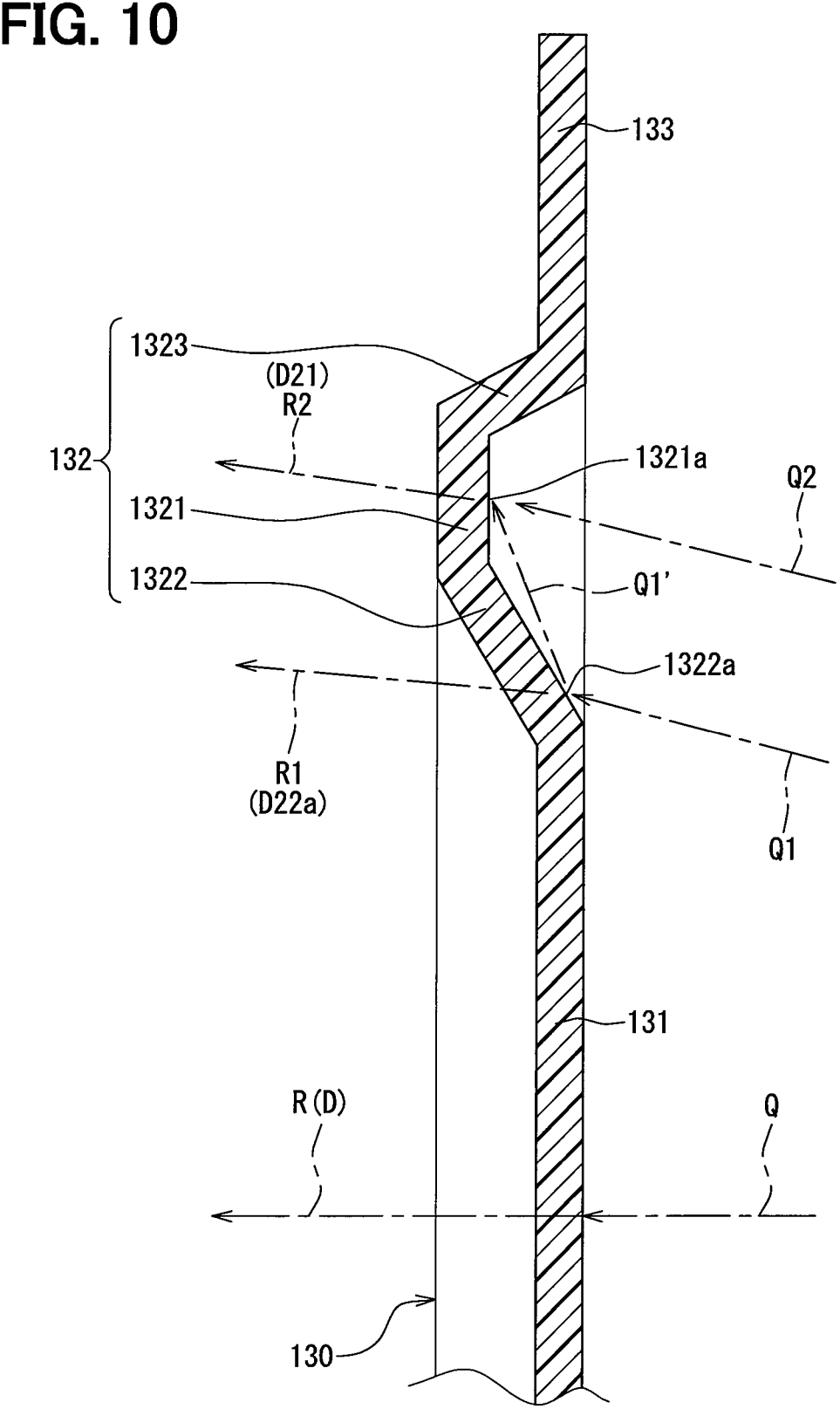
FIG. 10 is an enlarged view of the screen illustrated in FIG. 8.

As illustrated in FIG. 10, among rays of the display light Q projected to the screen 130, display light projected to the inner inclined portion 1322 is called first display light Q1, and display light projected to the top 1321 is called second display light Q2. Among rays of the first display light Q1, display light R1 which transmits a predetermined part (first part 322a) of the inner inclined portion 1322 to the viewer M side is visually recognized as an image of the scale D22a. In addition, among rays of the second display light Q2, display light R2 which transmits a predetermined part (second part 1321a) of the top 1321 to the viewer M side is visually recognized as the top image D21.

In the example illustrated in FIG. 10, a part of the first display light Q1 to transmit a first part 1322a is reflected by the first part 1322a and incident on the second part 1321a. In this manner, the light reflected by the first part 1322a corresponds to first reflected light Q1'. The first reflected light Q1' transmits from the second part 1321a to the viewer M side. Therefore, the display light R2 which transmits the second part 1321a is mixed light in which the second display light Q2 and the first reflected light Q1' are mixed with each other. For this reason, as the luminance of the first reflected light Q1' increases, the influence of the first reflected light Q1' on the mixed light increases, and the first reflected light Q1' is remarkably visually recognized at the second part 1321a.

Figure 11:
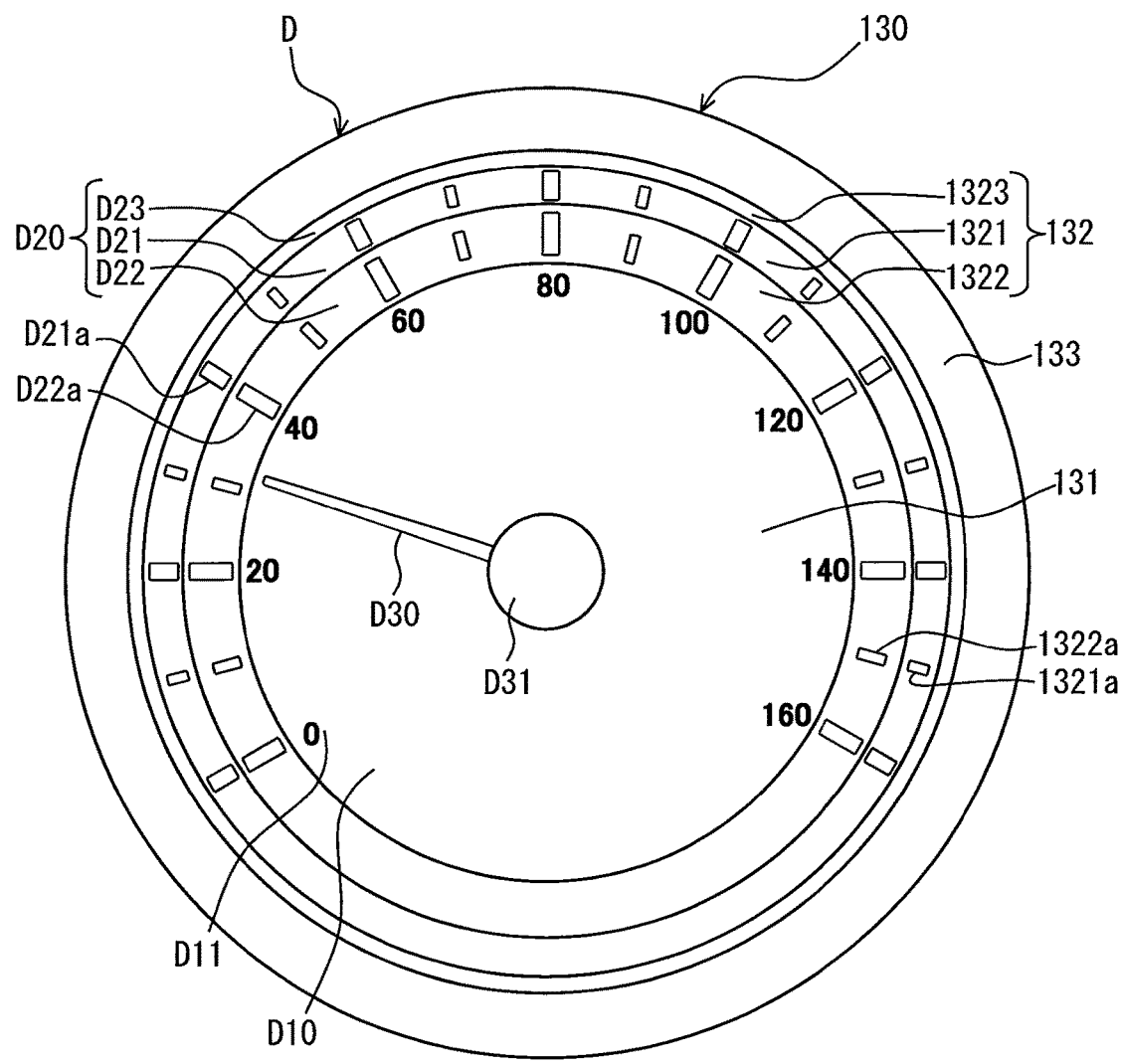
FIG. 11 is a front view illustrating a meter image according to a reference example.

FIG. 11 illustrates the meter image D according to a reference example when the luminance of the inner image D22 is set to be high in contrast to this embodiment. Specifically, FIG. 11 illustrates the meter image D when the color of the scale D22a included in the inner image D22 is set to be white (high luminance), and the color of the top image D21 is set to be blue (low luminance). In this case, a part of the first display light Q1 for the scale D22a transmits from the top 1321 as the first reflected light Q1'. As a result, in the blue top image D21 by the second display light Q2, white scale D21a glares by the first reflected light Q1'. In short, because the convex portion 132 is formed on the screen 130, the scale D22a displayed in the inner inclined portion 1322 is also double-displayed in the top 1321.

In this embodiment in consideration of the points, the display light generation device 122 controls the luminance of the first display light Q1 to be lower than that of the second display light Q2. For this reason, compared to the display light Q2 which displays the image of the second part 1321a, a part (reflected light Q1') of the display light Q1 which displays the image of the first part 1322a can be suppressed not to be remarkably visually recognized. Therefore, even when the double-display is generated, regarding an angle at which the display light Q is projected to the screen 130 and a shape of the convex portion 132, the double-display is not remarkable.

In addition, in this embodiment, the display light generation device 122 controls the image (inner background image) of a part except the scale D22a in the inner image D22 to have luminance which gradually increases toward the top 1321. In addition, the display light generation device 122 controls the luminance of the top image D21 to be constant. In addition, the display light generation device 122 controls the luminance of the top image D21 to be higher than that of the part (that is, a part which is adjacent to the top 1321) having the highest luminance in the inner background image. Furthermore, the display light generation device 122 controls the luminance of the scales D22a to be lower than that of the top image D21, and to be higher than that of the inner background image.

In addition, the display light generation device 122 controls the luminance of the inner background image to be the lowest in the meter image D. In other words, the display light generation device 122 controls the luminance of the display light which passes through the inner inclined portion 1322 to be the lowest among the rays of the display light projected to the screen 130. For this reason, a decrease in the influence of the reflected light Q1' according to the inner background image on the mixed light can be accelerated. Accordingly, an effect that the double-display of the inner background image is not visually recognized in the top image D21 can be accelerated.

In addition, the display light generation device 122 controls the luminance of the top image D21 to be the highest in the meter image D. In other words, the display light generation device 122 controls the luminance of the display light which passes through the top 1321 to be the highest among the rays of the display light projected to the screen 130. For this reason, the second display light Q2 according to the top image D21 can be accelerated to make the first reflected light Q1' absorbed. Accordingly, an effect that the double-display of the inner background image and the scale D21a is not visually recognized in the top image D21 can be accelerated.

For example, the top image D21 is white, the inner background image is black, and the scale D22a is yellow. In addition, the white color of the top image D21 is set to be the highest luminance, the black color of the inner background image is set to be the lowest luminance, and the yellow color of the scale D22a is set to be an intermediate luminance in the meter image D. However, the scale D22a may be set to have the lowest luminance, and the inner background image may be set to have the intermediate luminance.

In addition, according to this embodiment, since the screen 130 has an uneven shape in the visual-recognition direction, the meter image D displayed on the screen 130 can be visually recognized in a three-dimensional manner. In other words, the illusion that a virtual meter device which is displayed by the meter image D really exists that is given to the user can be accelerated. Specifically, the decoration ring D20 is displayed in the convex portion 132 of the screen 130, and the scale plate D10 is displayed in the center portion 131 and the outer circumferential portion 133. For this reason, the illusion that the decoration ring D20 is a three-dimensional component which protrudes to the side nearer than the scale plate D10 that is given to the user can be accelerated.

Modified Example of Third Embodiment

The present disclosure is not limited to the description of the third embodiment, and changes and modifications may be carried out as follows. In addition, characteristic configurations of each embodiment may be respectively arbitrarily combined.

In a case of the example illustrated in FIG. 10, the display light Q1 is not reflected to the top 1321 even at any part of the inner inclined portion 1322. For this reason, it is not necessary to set the display light projected to the part where the first reflected light Q1' is not generated in the inner inclined portion 1322 to have low luminance. In other words, it is sufficient if the display light generation device 122 controls the luminance of the part (first part 1322a) at which the display light Q1 is reflected to the top 1321 in the inner inclined portion 1322 to be lower than that of the display light Q2 of the second part 1321a which is a reflection point.

In addition, in the third embodiment, the display light generation device 122 controls the luminance of the display light which passes through the inner inclined portion 1322 to be lower than the luminance of the display light which passes through the top 1321. However, when the display light reflected by the outer inclined portion 1323 influences the display mode in the top 1321, the display light generation device 122 may control the luminance of the display light which passes through the outer inclined portion 1323. In other words, the display light generation device 122 may control the luminance of the display light which passes through the outer inclined portion 1323 to be lower than the luminance of the display light which passes through the top 1321.

In the example of FIG. 9, the convex portion 132 has a circular shape, and regarding the first display light Q1 and the second display light Q2 according to the decoration ring D20 displayed in the convex portion 132, the first display light Q1 is set to have the luminance lower than that of the second display light Q2. In contrast, when the double-display of the display light projected to the convex portion other than the circular part is generated, the first display light of a reflection source may be set to have the luminance lower than that of the second display light of the reflection point.

In the example of FIG. 10, the first part 1322a of the screen 130 is positioned in the inner inclined portion 1322, and the second part 1321a of the screen 130 is positioned in the top 1321, but the positional relationship is not limited thereto. For example, the first part 1322a (reflection source) may be positioned in the outer inclined portion 1323 or the top 1321, the center portion 131, and the outer circumferential portion 133. In addition, the second part 1321a (reflection point) may be positioned in the outer inclined portion 1323 or the inner inclined portion 1322, the center portion 131, and the outer circumferential portion 133.

When the display light generation device 122 controls the first display light Q1 to have lower luminance compared to that of the second display light Q2, any of brightness, saturation, and hue may be adjusted, and the adjustment thereof may be set to be combined with each other. In addition, the luminance of the light source included in the projector 120 may be partially adjusted and set.

In this embodiment, the display light generation device 122 controls the first display light Q1 to have the lowest luminance and the second display light Q2 to have the highest luminance among the rays of the display light projected to the screen 130, but this embodiment is not limited thereto. For example, if the first display light Q1 has the luminance lower than that of the second display light Q2, the first display light Q1 may not have the lowest luminance, and the second display light Q2 may not have the highest luminance.

In each of the above-described embodiments, the vehicle display device is configured so that the display light Q is incident from the opposite side (rear side) of the viewer M with respect to the screen 130, and the display light Q transmits the screen 130 and is input towards the eyes of the viewer M. In contrast to this, the display light may be incident from the viewer M side with respect to the screen 130, and the display light may be reflected by the screen 130 and input towards the eyes of the viewer M. In this configuration, there is also a case where the double-display is generated due to the unevenness of the screen 130, but the double-display is not remarkable as the display light generation device 122 controls the first display light to have the luminance lower than that of the second display light.

In the third embodiment, the display light generation device 122 which can control the luminance is configured to be provided in the projector 120. However, the display light generation device 122 may be provided separately from the projector 120. For example, the meter ECU 4 described in the first embodiment may have a function of controlling the luminance. In addition, in the third embodiment, the display light generation device 122 which generates the display light has a function as a controller which controls the luminance, but the controller may be provided separately from the display light generation device 122.

Fourth Embodiment

Next, a vehicle display device according to a fourth embodiment will be described with reference to FIGS. 12 to 18. In the fourth embodiment, the vehicle display device which accelerates the three-dimensional vision is provided.

Figure 12:
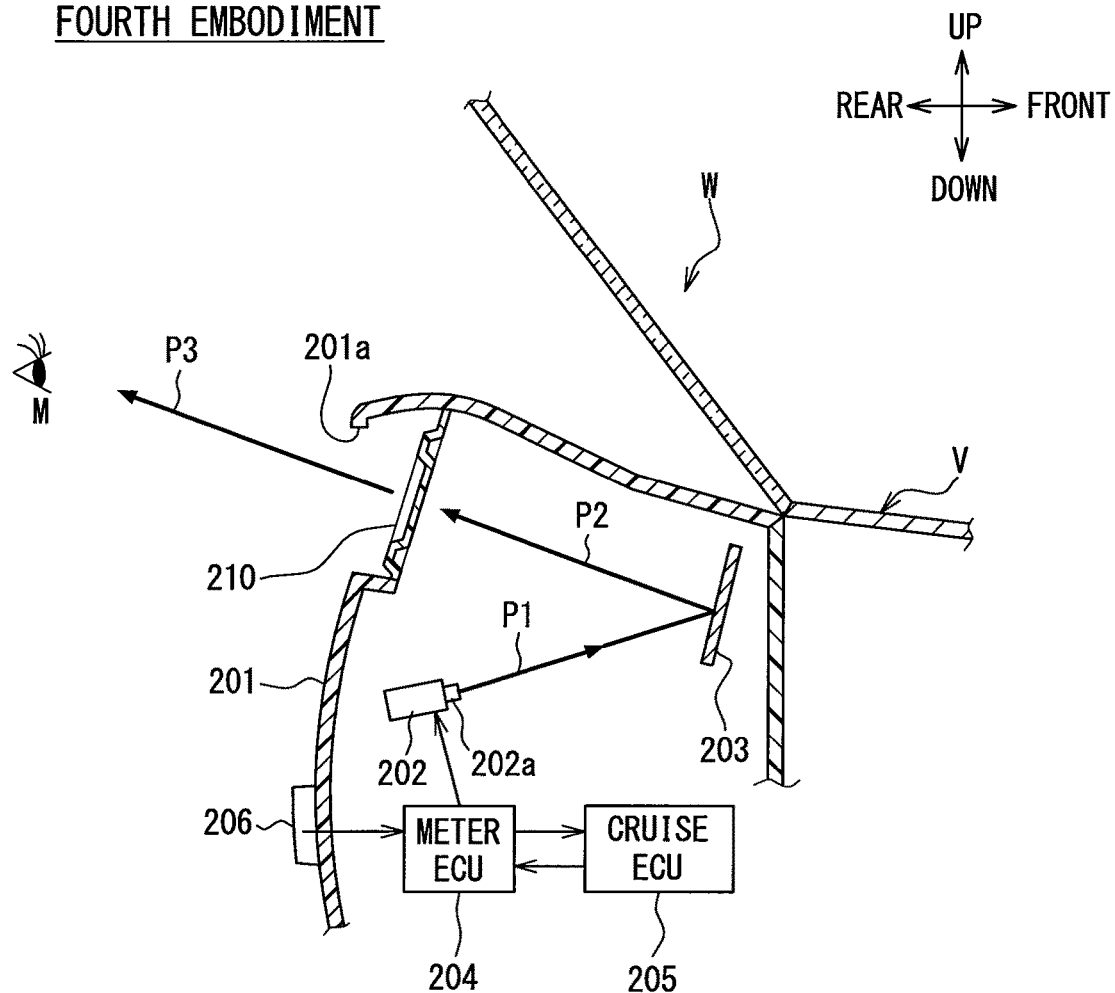
FIG. 12 is a cross-sectional view schematically illustrating the entire configuration of a vehicle display device in a fourth embodiment of the present disclosure.

As illustrated in FIG. 12, an instrument panel 201 is disposed below the front windshield W inside the vehicle V. On the instrument panel 201, the vehicle display device which will be described in detail later is installed, and an audio device or a navigation device which is not illustrated is installed. Furthermore, an operation member 206 which is manually operated by the vehicular occupant (user) is installed on the instrument panel 201. In addition, an arrow illustrating the vertical and horizontal directions in FIG. 12 illustrates the vertical and horizontal directions of the vehicle in a state where the vehicle display device is installed in the instrument panel 201.

Figure 14:
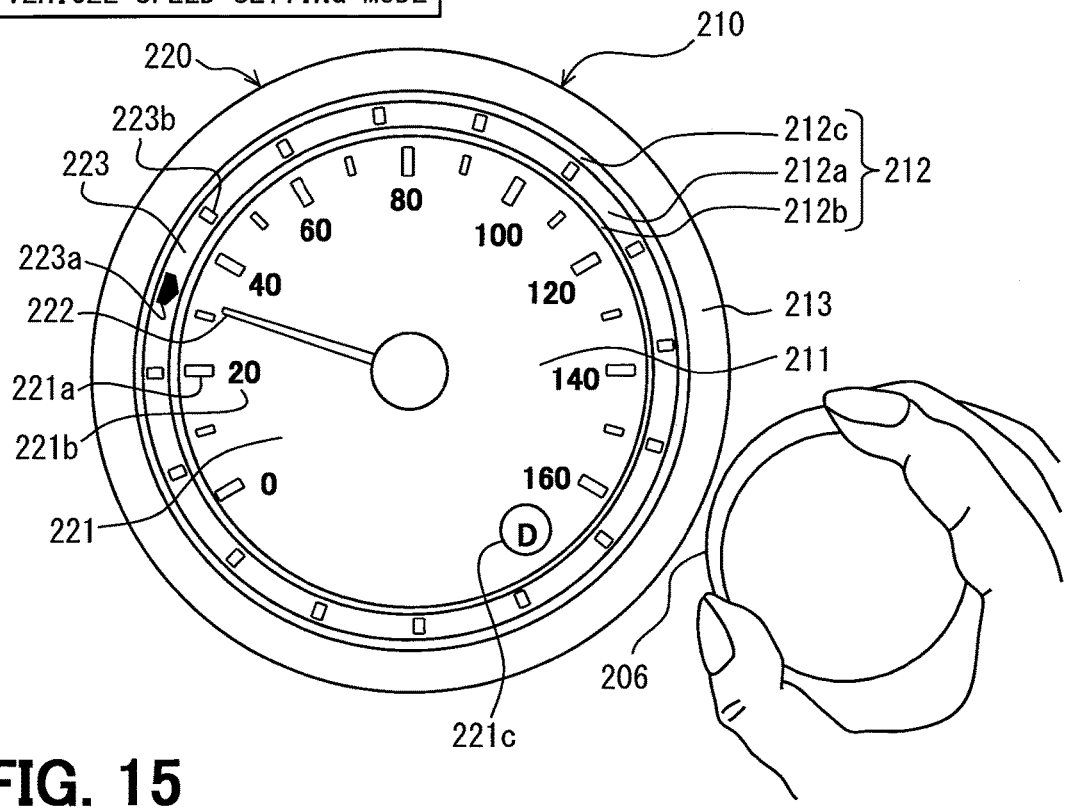
FIG. 14 is a front view illustrating one aspect of the meter image in the fourth embodiment.

The operation member 206 is a member for setting the operation contents of various types of devices. For example, in a vehicle speed maintaining control device which automatically controls the output of a traveling driving source so that the traveling speed of the vehicle is automatically maintained at a set speed, the set speed is set by the operation member 206. As also illustrated in FIG. 14, the operation member 206 is configured to be operated to be rotated. In addition, based on an amount of rotating operation (rotation angle) of the operation member 206 by the user, the set speed according to the vehicle speed maintaining control device is set.

The vehicle display device is provided with a projector 202, a reflecting mirror 203, and a screen 210, which will be described later. The projector 202 emits the display light P1 of the image showing the vehicle information and the operation information input by the operation member 206. The projector 202 is provided with a magnifying lens 202a, and the angle at which the display light P1 which widens is adjusted by the magnifying lens 202a.

Specific examples of the "vehicle information" shown by the above-described image include a vehicle speed, an engine rotation speed, a shift range of an automatic transmission, an amount of remaining fuel, an engine coolant temperature, and various types of warning information. Specific examples of the "operation information" shown by the image include a set speed according to the above-described vehicle speed maintaining control device, a volume of the audio device, destination of the navigation device, and a set temperature of an air conditioner.

The reflecting mirror 203 reflects the display light P1 emitted from the projector 2 toward the screen 210. In the example of FIG. 12, the reflecting surface of the reflecting mirror 203 has a shape of a plane. The screen 210 is a resin-made plate having translucency, and is formed in an uneven shape in the visual-recognition direction (direction illustrated with a dotted line in FIG. 13). Specifically, the screen 210 has a plate shape having a constant thickness on which a convex portion 212 is formed. The convex portion 212 has a shape swollen to the viewer M side (near side), and has a circular shape when viewed from the viewer M side.

Figure 13:
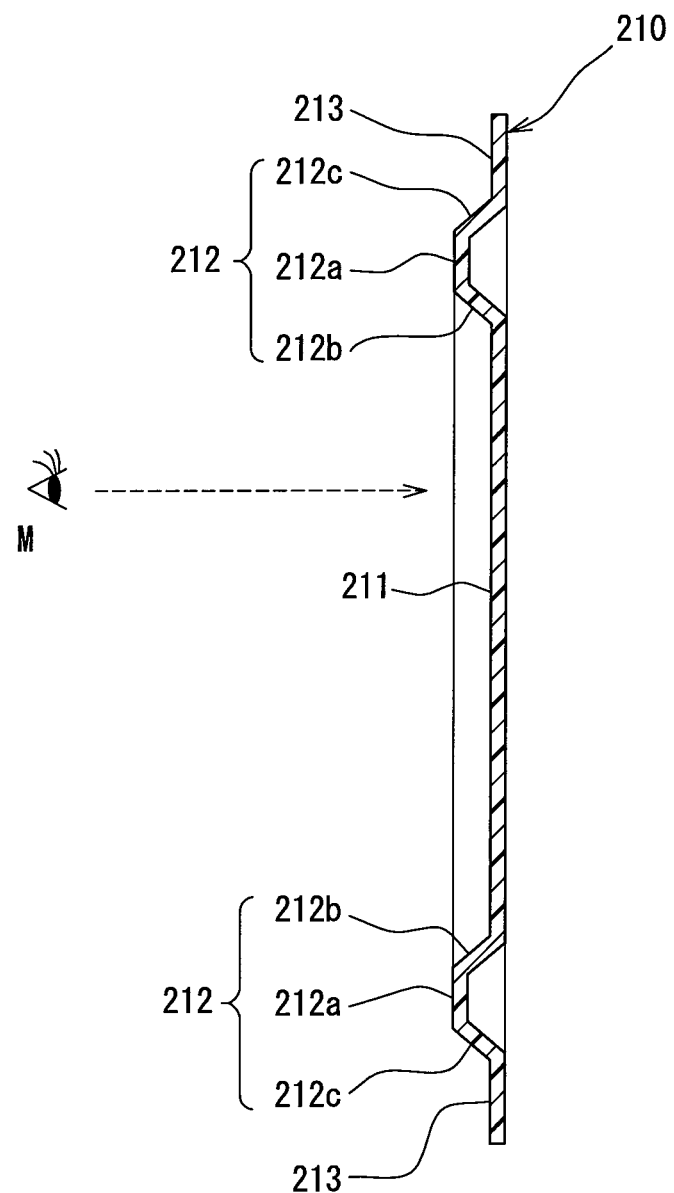
FIG. 13 is a cross-sectional view of the screen illustrated in FIG. 12.

As illustrated in FIG. 13, the screen 210 has a shape having a center portion 211 and an outer circumferential portion 213, which will be described later, in addition to the convex portion 212. The center portion 211 configures a central part of the screen 210, and is positioned on the inner circumferential side of the circular convex portion 212. The outer circumferential portion 213 is positioned on the outer circumferential side of the circular convex portion 212. The center portion 211 and the outer circumferential portion 213 have a flat shape which widens perpendicularly to the visual-recognition direction. Since the center portion 211 and the outer circumferential portion 213 are positioned being separated from the viewer M more than the convex portion 212, it can be said that the center portion 211 and the outer circumferential portion 213 are also concave portions. In addition, in this embodiment, the direction which is perpendicular to the screen 210 is the visual-recognition direction.

The convex portion 212 includes a top 212a, an inner inclined portion 212b, and an outer inclined portion 212c, which will be described later. The inner inclined portion 212b has an inclined shape of gradually swelling toward the viewer M side from an outer circumferential end of the center portion 211. The top 212a has a flat shape which widens in the radial direction from an outer circumferential end of the inner inclined portion 212b. The outer inclined portion 212c has an inclined shape of gradually swelling toward the viewer M side from an inner circumferential end of the outer circumferential portion 213. In addition, the convex portion 212 is called a "circular portion".

Returning to the description of FIG. 12, the display light P2 reflected by the reflecting mirror 203 transmits from the opposite side (far side) to the near side with respect to the viewer M on the screen 210. The display light P3 which transmits the screen 210 is input towards the eyes of the user who is the viewer M. In other words, by projecting the display light P2 to the screen 210, the image displayed on the screen 210 is visually recognized by the user.

The video signal output from the electronic control device (meter ECU 204) is input to the projector 202, and the projector 202 emits the display light P1 based on the video signal. The display light P1 (image) changes in accordance with the vehicle information or the operation information. In other words, the above-described video signal is the moving image signal, and the image displayed on the screen 210 is the moving image. The meter ECU 204 obtains the operation information input by the operation member 206, and the vehicle information detected by various types of sensors mounted on the vehicle. The meter ECU 204 generates the video signal for displaying the moving image in accordance with the obtained vehicle information and the operation information, and outputs the video signal to the projector 202.

The above-described vehicle speed maintaining control device (cruise ECU 205) is mounted on the vehicle V, and the meter ECU 204 obtains the vehicle information from the cruise ECU 205. The cruise ECU 520 obtains the set speed (operation information) input by the operation member 206 from the meter ECU 204. The meter ECU 204 is provided with a storage device in which data or the like which is necessary for generating the video signal is stored, and a calculation processing device which performs various types of calculation processing, such as generation processing of the video signal or communication processing with the cruise ECU 205.

As illustrated in FIG. 14, the image displayed on the screen 210 is the image (meter image 220) showing the meter device which is configured by combining multiple components. The above-described "multiple components" are a scale plate 221 (scale plate image), a pointer 222 (pointer image), and a dial 223 (dial image), which will be described hereinafter. In addition, the scale plate 221, the pointer 222, and the dial 223 are not real objects, but images, and are referred to as "component images". In the description below, the component image will be simply described as the scale plate 221, the pointer 222, and the dial 223.

The scale plate 221 has multiple scales 221a (scale images), numbers 221b (number images), and a shift indicator 221c (shift indicator image). The scales 221a, the numbers 221b, and the shift indicator 221c are also not real printed objects, but images, and in the description below, the component images will be simply described as the scales 221a, the number 221b, and the shift indicator 221c. In addition, the pointer 222 rotates and indicates the scale 221a. The dial 223 has an annular shape which surrounds the multiple scales 221a. The scale plate 221 is displayed in the center portion 211 and the outer circumferential portion 213 of the screen 210. The pointer 222 is displayed in the center portion 211, and the dial 223 is displayed in the convex portion 212. Therefore, it is visually recognized that the dial 223 exists closer to the near side than the scale plate 221.

A boundary line between the outer inclined portion 212c and the outer circumferential portion 213 is positioned on an outline of an outer circumferential side of the dial 223, and a boundary line between the inner inclined portion 212b and the center portion 211 is positioned on an outline of an inner circumferential side of the dial 223. In short, the boundary lines between the center portion 211 and the outer circumferential portion 213, and the convex portion 212 matches the boundary between the component images.

In addition, the center portion 211 and the outer circumferential portion 213 of the screen 210 are displayed in the same color, and the top 212a and the inclined portions 212b and 212c are displayed in a color different from the color of the center portion 211 and the outer circumferential portion 213. Accordingly, the visual recognition of the scale plate 221 that is present and straddles the dial 223 in the radial direction, and the visual recognition of the dial 223 that is present on the near side of the scale plate 221, are accelerated. In addition, the inner inclined portion 212b and the outer inclined portion 212c are displayed in gradation so that the color of the center portion 211 and the outer circumferential portion 213 gradually changes to the color of the top 212a.

The images of a pointer 223a and a decoration portion 223b are displayed in the top 212a. Accordingly, it is visually recognized that the pointer 223a and the decoration portion 223b are performed by the dial 223. A multiple decoration portions 223b are displayed being aligned at an equivalent interval in the circumferential direction of the dial 223, and the pointer 223a is displayed in one location of the dial 223. The dial 223 is displayed to relatively rotate with respect to the scale plate 221. Specifically, as display positions of the pointer 223a and the decoration portion 223b are gradually moved in a rotating direction, rotation of the dial 223 is visually recognized. The pointer 223a rotates together with the dial 223 and indicates the scale 221a.

The meter ECU 204 generates the video signal in accordance with the operation information input by the operation member 206. Specifically, when the operation member 206 is operated to be rotated by the user, the meter ECU 204 generates the video signal so that the dial 223 rotates by the amount of rotation in accordance with the amount of the rotation operation.

Furthermore, the meter ECU 204 generates the video signal in accordance with the obtained vehicle information. Specifically, the meter ECU 204 generates the video signal so that the pointer 222 rotates at a position which indicates the scale 221a in accordance with a traveling speed (hereinafter, simply refer to a vehicle speed) of the vehicle. In addition, the meter ECU 204 generates the video signal so that the letters, the numbers, or the symbols which show the shift range of the automatic transmission is displayed in the shift indicator 221c.

Hereinafter, by using FIGS. 14 to 16, a change in the video signal, that is, a change of the meter image 220 in accordance with the vehicle information and the operation information will be described.

Figure 15:
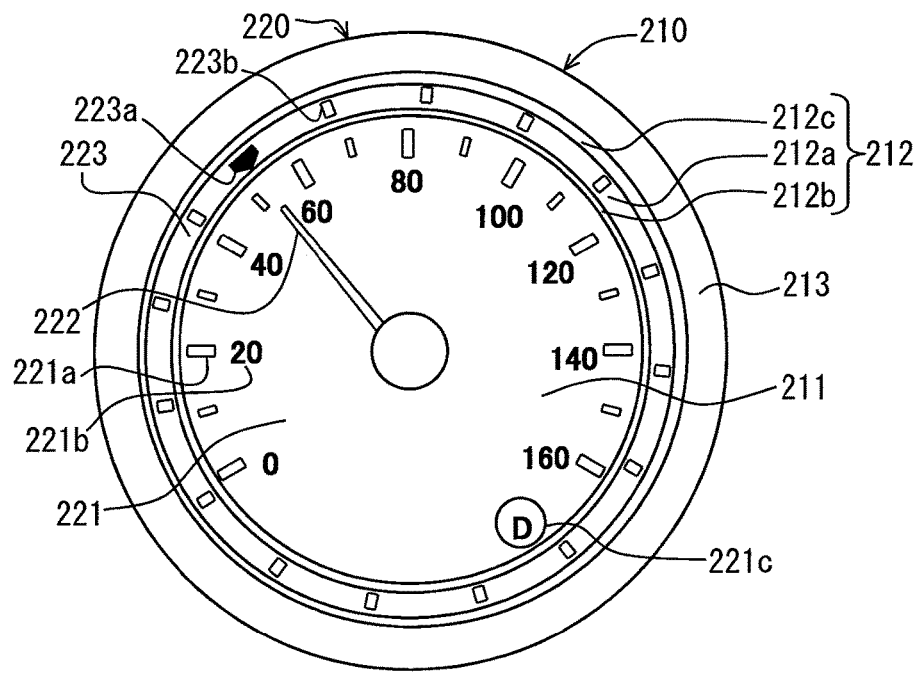
FIG. 15 is a view illustrating a change in the meter image in accordance with a change in vehicle speed setting in the fourth embodiment.

FIGS. 14 and 15 illustrate one aspect of the meter image 220 in a vehicle speed setting mode which displays the set speed according to the vehicle speed maintaining control device at the rotation position of the dial 223. In the vehicle speed setting mode, the dial 223 rotates according to the rotation operation of the operation member 206, and the pointer 223a indicates the scale 221a. In addition, the set speed according to the vehicle speed maintaining control device is set at a vehicle speed which is indicated by the pointer 223a.

For example, in the meter image 220 illustrated in FIG. 14, the set speed is set to be 31 km/h indicated by the pointer 223a. In addition, the vehicle speed maintaining control device functions to maintain the traveling speed to be the set speed, and as a result, the real vehicle speed becomes 31 km/h, and the pointer 222 indicates 31 km/h.

In this state, when the operation member 206 is operated to be rotated clockwise, the dial 223 gradually rotates clockwise, and the meter image changes to the meter image illustrated in FIG. 15. The rotation speed of the dial 223 is the same as the rotation speed of the operation member 206. In short, the rotation speed of the dial 223 also changes in accordance with the rotation speed of the operation member 206. In addition, an orientation in which the dial 223 rotates is the same as an orientation in which the operation member 206 is operated to be rotated.

In the meter image 220 illustrated in FIG. 15, the set speed is set to 52 km/h indicated by the pointer 223a. In addition, the vehicle speed maintaining control device functions to maintain the traveling speed to be the set speed, and as a result, the real vehicle speed also becomes 52 km/h, and the pointer 222 indicates 52 km/h.

Figure 16:
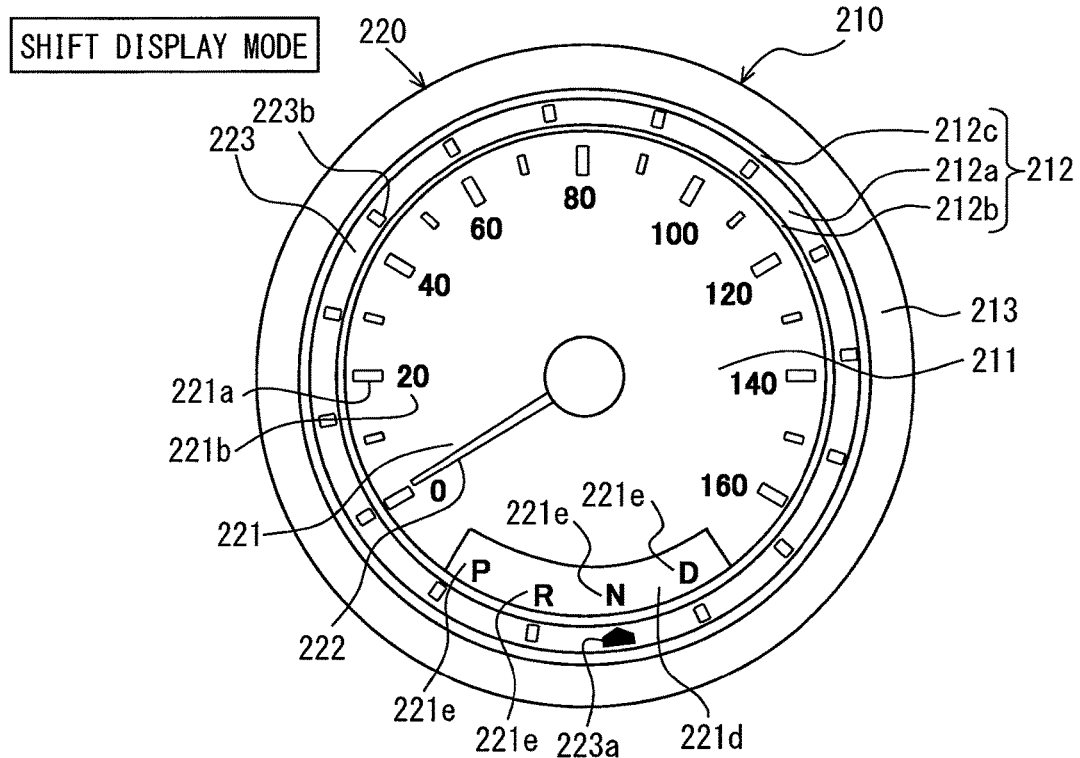
FIG. 16 is a view illustrating a change in the meter image in accordance with switching of a display mode in the fourth embodiment.

FIG. 16 illustrates one aspect of the meter image 220 in a shift display mode which displays a set state of the shift range of the automatic transmission at the rotation position of the dial 223. In the shift display mode, the shift indicator 221c (refer to FIG. 15) displayed during the vehicle speed setting mode is switched to a shift selection indicator 221d (refer to FIG. 16). A range display portion 221e which illustrates each shift range is displayed in the shift selection indicator 221d. In addition, when the user operates to change the shift range, the range display portion 221e which corresponds to the shift range operated to be changed in the multiple range display portions 221e is indicated by the pointer 223a.

Figure 18:
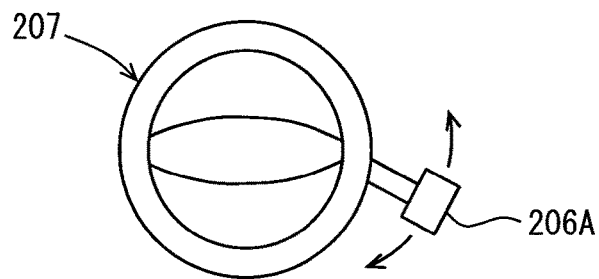
FIG. 18 is a front view schematically illustrating a shift lever which functions as an operation member in the fourth embodiment.

In addition, FIG. 18 illustrates a shift lever 206A which is attached to a steering device 207, and the automatic transmission operates so that the shift lever changes as the user operates the shift lever 206A. The shift lever 206A is also referred to as an "operation member".

For example, when the user touches the shift lever 206A in a state of vehicle speed setting mode, the meter image 220 is switched to the shift display mode. In addition, for example, when the shift range is operated from a drive (D) state to a neutral (N) state, the meter image 220 is made as illustrated in FIG. 16. Specifically, the dial 223 rotates in accordance with the operation contents of the shift lever 206A, and the pointer 223a indicates the shift range (neutral (N)) after the operation. In addition, the pointer 222 in the shift display mode rotates in accordance with the vehicle speed similarly to a case of the vehicle speed setting mode.

Figure 17:
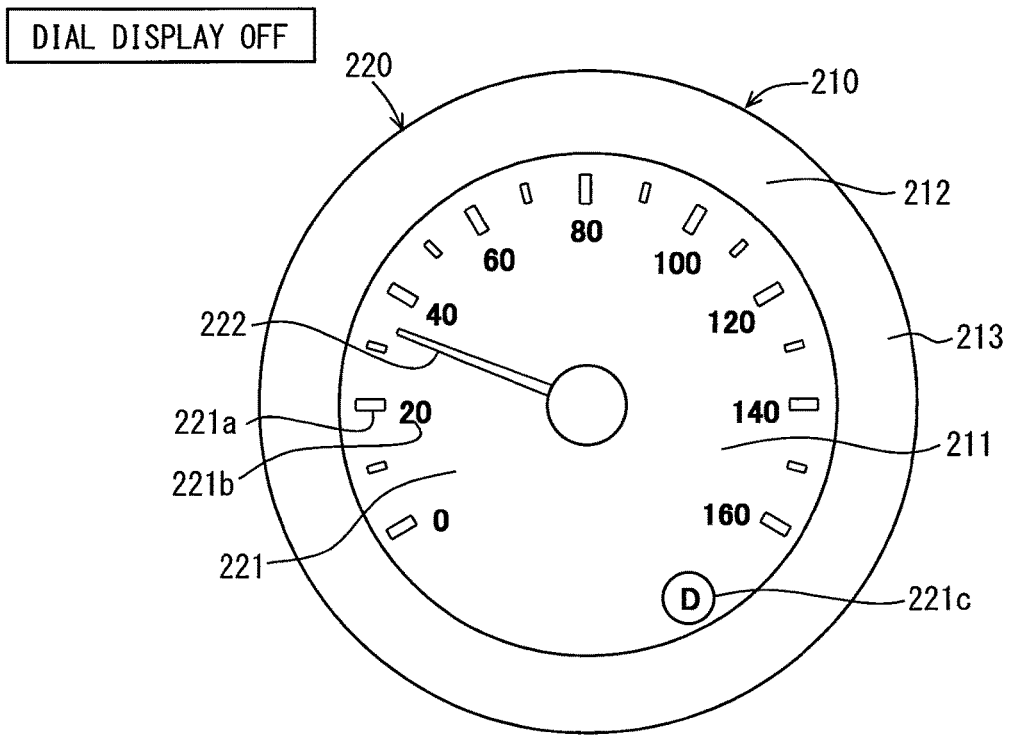
FIG. 17 is a front view of the meter image illustrating a state where a dial image is turned off in the fourth embodiment.

In addition, the meter image 220 which turns off the dial 223 as illustrated in FIG. 17 is also possible. For example, when a vehicle speed control function is stopped by the vehicle speed maintaining control device, or when the operation of changing the shift range is not performed for equal to or greater than a predetermined time, the meter ECU 204 turns off the dial 223. When the dial 223 is turned off, by displaying the convex portion 212 in the same color as the color of the center portion 211 or the outer circumferential portion 213, it is visually recognized that the scale plate 221 is present in the entire center portion 211, the outer circumferential portion 213, and the convex portion 212, on the screen 210. In addition, in the example of FIG. 17, the convex portion 212 is displayed in the same color as that of the outer circumferential portion 213 when the dial 223 is turned off, and the outer circumferential portion 213 is displayed in a color different from that of the center portion 211.

In addition, when the user touches the shift lever 206A or the operation member 206 when the dial 223 is turned off, the meter ECU 204 changes the meter image 220 to turn on the turned-off dial 223.

In addition, each of the vehicle setting mode and the shift display mode is referred to as a "first display mode" and a "second display mode". In addition, respectively, the set speed displayed in the vehicle setting mode is referred to as "first operation information", and a shift range displayed in the shift display mode is referred to as "second operation information".

In short, the vehicle display device of this embodiment described above has characteristics which will be described below. In addition, by each of the characteristics, operation effects which will be described below are achieved.

<Characteristic 1>

According to this embodiment, since the screen 210 has the uneven shape in the visual-recognition direction, visual recognition of the meter image 220 displayed on the screen 210 in a three-dimensional manner can be accelerated. In other words, the illusion that the virtual meter device expressed by the meter image 220 really exists that is given to the user can be accelerated. Specifically, since the dial 223 is displayed in the convex portion 212, and the scale plate 221 is displayed in the center portion 211 and the outer circumferential portion 213, the illusion that the dial 223 is a three-dimensional component which protrudes to the near side more than the scale plate 221 that is given can be accelerated.

In addition to this, further, in this embodiment, the image of the predetermined part 223 of the meter image 220 is displayed interlocking with the operation members 206 and 206A. In other words, as the dial 223 rotates in accordance with the input by the operation members 206 and 206A, the meter image is changed. Therefore, the dial 223 is visually recognized to rotate in accordance with the operation contents of the user, and as a result, the illusion that the dial 223 and the scale plate 221 really exist that is given to the user can be accelerated.

<Characteristic 2>

The image displayed by the vehicle display device according to this embodiment is the meter image 220 showing the meter device which illustrates the vehicle information. The meter image 220 combines and displays the multiple component images, that is, images of the scale plate 221, the pointer 222, and the dial 223. In addition, in the meter image 220, the predetermined part interlocked and displayed is at least one of the multiple component images. Specifically, the dial 223 which is one component that configures the meter device changes in accordance with the input of the operation members 206 and 206A.

According to this, when the meter device is displayed in a three-dimensional manner as the multiple components 221, 222, and 223 appear to be combined with each other, the components (dial 223) interlocked with the operation of the user are displayed in a three-dimensional manner appearing to move. For this reason, the illusion that the configuration components of the meter, that is, the scale plate 221, the pointer 222, and the dial 23 are really exist that is given to the user can be accelerated.

<Characteristic 3>

In this embodiment, the meter image 220 displayed by the vehicle display device is an image showing the vehicle information as the pointer 222 rotates and indicates the scale image 221a. In addition, the interlock-displayed predetermined part (dial 223) shows operation information as the part rotates and indicates the scale 221a. Specifically, the scale 221a which is used in displaying the vehicle information is used even in displaying the operation information.

According to this, the user easily recognizes a relationship between the vehicle information (vehicle speed) and the operation information (set speed). Specifically, the user can instantly grasp whether the value of the set speed is high or low with respect to a real vehicle speed, and a difference between the real vehicle speed and the set speed.

<Characteristic 4>

A round portion (convex portion 212) which protrudes in a circular shape is formed on the screen 210 according to this embodiment. In addition, the interlock-displayed predetermined part (dial 223) is displayed in the convex portion 212, and is displayed being rotated around the circle of the convex portion 212 in accordance with the input by the operation members 206 and 206A.

According to this, as the predetermined part is displayed in the convex portion 212, the three-dimensional display of the predetermined part can be accelerated, and an image of moving predetermined part can be made while a state of the three-dimensional display is maintained. For example, while the dial 223 is maintained to be displayed in the entire convex portion 212, the dial 223 can be rotated and displayed. Accordingly, the illusion that the predetermined part (dial 223) really exists that is given to the user can be accelerated.

<Characteristic 5>

The operation member 206 according to this embodiment is configured to be operated to be rotated. In addition, the interlock-displayed predetermined part (dial 223) is rotated and displayed by an amount of rotation in accordance with an amount of rotation operation input by the operation member 206.

According to this, since the movement of the predetermined part is rotation, and the operation of the operation member 206 is also rotation, the illusion that the real predetermined component rotates by the rotation operation of the user that is given can be accelerated. In addition, while looking at the movement of the predetermined part, when adjusting the amount of rotation operation of the operation member 206, operability of adjustment can be improved.

<Characteristic 6>

In this embodiment, the image displayed on the screen 210 is displayed being switchable between the first display mode which shows the first operation information, and the second display mode which shows the second operation information. Specifically, the meter image 220 is displayed being switchable between the vehicle speed setting mode which shows the set speed, and the shift display mode which shows a shift range. In addition, the interlock-displayed predetermined part (dial 223) is displayed at a part (convex portion 212) which is common on the screen 210 in any of the first display mode and the second display mode.

According to this, the predetermined part which is three-dimensionally displayed by the unevenness of the screen 210 is common in the first display mode and the second display mode. Accordingly, when forming the unevenness to the display location of the interlocked predetermined part 223, the number of locations where the unevenness is formed can be reduced.

Fifth Embodiment

In the fourth embodiment, the interlock-displayed predetermined part (dial 223) is displayed to rotate. In contrast to this, in this embodiment, the interlock-displayed predetermined part is a bar display portion 224 illustrated in FIG. 19. In addition, the dial 223 illustrated in FIG. 19 does not rotate in this embodiment.

The bar display portion 224 is configured by aligning multiple bars 224a, interlocked with the operation members 206 and 206A, and switched from on and off. Otherwise, switching is performed to change the luminance being interlocked with the operation members 206 and 206A. For example, in accordance with the amount of operation of the operation members 206 and 206A, the number of bars 224a which is turned on among the multiple bars 224a is changed. Otherwise, when it is desired to notify warning to the vehicle occupant, the bar display portion 224 is turned on.

Figure 19:
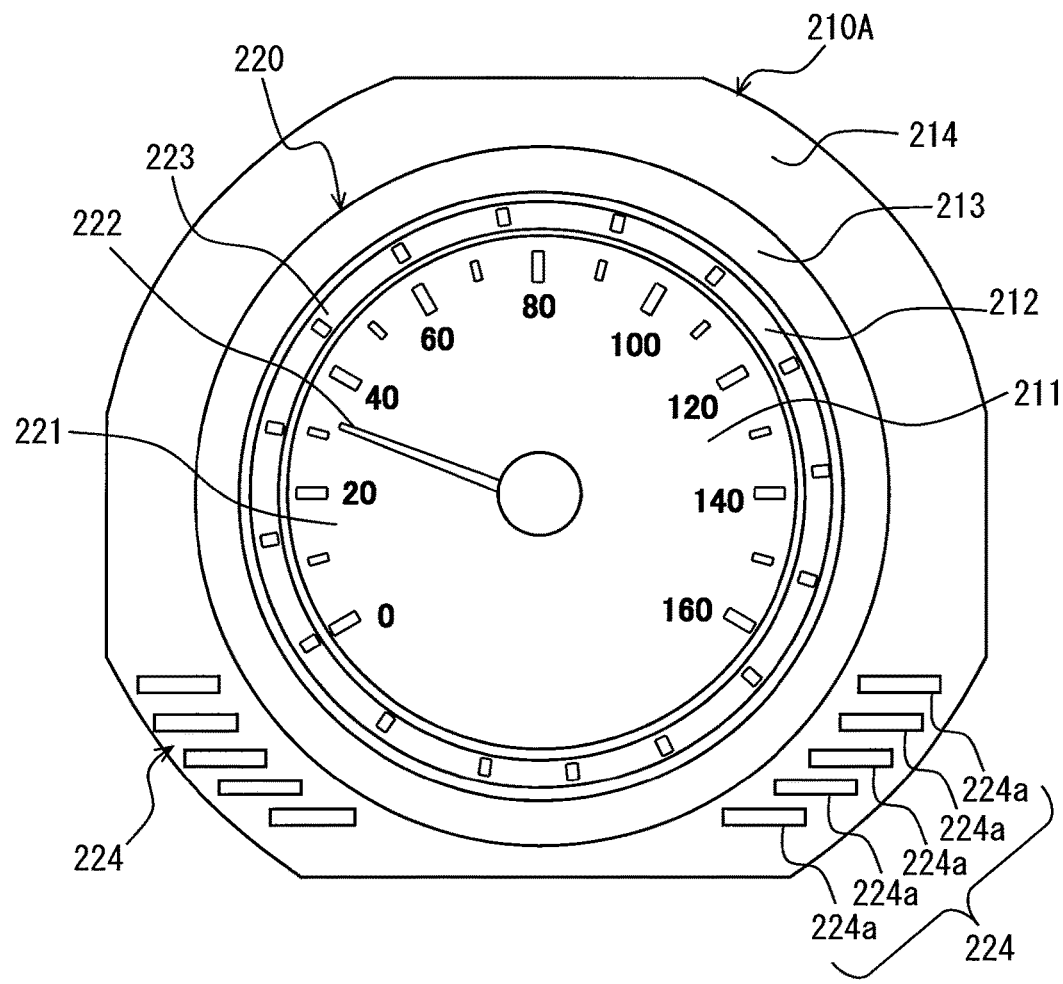
FIG. 19 is a front view of a meter image according to a fifth embodiment of the present disclosure.

A part in which the bar 224a is displayed on a screen 210A protrudes to the near side compared to other parts. Accordingly, the bar 224a is visually recognized in a three-dimensional manner. In the example of FIG. 19, the meter image 220 and the background image 214 are displayed on the screen 210A. The bar display portion 224 is on the outside of the meter image 220, and is positioned in the background image 214.

Above, according to this embodiment, when the display mode of the predetermined part 24 is changed in accordance with the input by the operation members 206 and 206A, the bar display portion 224 is displayed in the convex portion of the screen 210A. For this reason, the illusion that the bar display portion 224 is a three-dimensional component which protrudes to the near side more than the scale plate 221 that is given can be accelerated.

In addition to this, further, in this embodiment, the bar display portion 224 is interlocked with the operation members 206 and 206A, and changes the display. Accordingly, the bar display portion 224 is visually recognized to be changed in accordance with the operation contents of the user, and as a result, the illusion that the bar display portion 224 and the scale plate 21 really exist that is given to the user is accelerated.

Modification Example of Fourth and Fifth Embodiments

The present disclosure is not limited to the description of the above-described fourth and fifth embodiments, and modifications may be carried out as follows. In addition, characteristic configurations of each embodiment may be respectively arbitrarily combined.

In the above-described fourth embodiment, as the "round section" which displays the image that changes in accordance with the input by the operation member 206, the convex portion 212 which protrudes in a circular shape is employed. In contrast to this, a convex portion which protrudes in a columnar shape may be employed as the "round section".

In the above-described fourth embodiment, the amount of rotation operation of the operation member 206 and the amount of rotation of the dial 223 match each other, but may not match each other. For example, when the operation member 206 rotates by 90 degrees, the dial 223 may be interlocked and displayed to be rotated by 45 degrees.

In the fourth embodiment, the interlock-displayed predetermined part (dial 223) is displayed to rotate. In contrast to this, when the display mode of the predetermined part changes in accordance with the input by the operation member, the predetermined part may be interlocked and displayed to slidably move.

In the above-described fourth embodiment, the display light P1 emitted from the projector 2 is reflected by the reflecting mirror 203 and incident on the screen 210. In contrast to this, the reflecting mirror 203 may be disused, and the display light P1 emitted from the projector 202 may be directly incident on the screen 210.

In the above-described fourth and fifth embodiments, the image displayed by the vehicle display device is the meter image 220. In contrast to this, the image according to the present disclosure is not limited to the meter image 220, and for example, may be an image of a map by the navigation device. In this case, for example, the position of the vehicle on the map corresponds to the vehicle information, and the position of destination on the map corresponds to the operation information.

In the above-described fourth embodiment, a part where the dial 223 is displayed on the screen 210 protrudes to the viewer M side, but this part may be configured to be recessed to the side opposite to the viewer M. In other words, the unevenness of the screen 210 is reversed, and the "predetermined part" may be the concave portion.

In the above-described fourth embodiment, the set speed according to the vehicle speed maintaining control device is set by the operation member 206 which is rotation-operated. In contrast to this, the set speed may be configured to be set by the lever attached to the steering device 207. In addition, a push-type button may be employed as the operation member.

The meter image 220 according to the above-described fourth embodiment displays the vehicle speed by the pointer 222, but the meter image 220 may be configured to display the vehicle information, such as an engine rotation speed, a traveling distance, and an amount of remaining fuel.

In the example illustrated in FIG. 15, a reflecting surface of the reflecting mirror 203 has a shape of a plane, but the reflecting mirror 203 may be a magnifying mirror which magnifies and reflects the display light P1.

In the above-described fourth embodiment, the meter ECU 204 includes the storage device in which the data which is necessary for generating the video signal is stored, and the calculation processing device which generates the video signal. In contrast to this, the projector 202 may be provided with the storage device and the calculation processing device.

The vehicle display device described in the fourth and fifth embodiments can be limited as follows.

(1) The vehicle display device including the projector (202) which emits the display light of the image that shows the vehicle information and the operation information input by the operation members (206, 206A), and the screens (210, 210A) which display the image as the display light is projected, in which the screen is formed in an uneven shape in a direction in which the image is visually recognized, and the display mode of the predetermined parts (223, 224) which are projected to the part having an uneven shape of the screen in the image changes in accordance with the input by the operation member.

According to the vehicle display device of the above-described (1), since the screen has an uneven shape in the visual-recognition direction, visual recognition of the image displayed on the screen in a three-dimensional manner can be accelerated. In other words, the illusion that the virtual object (for example, the vehicle speed meter device) which is expressed by the image really exists that is given to the user can be accelerated.

In addition to this, a configuration in which "the display mode of the predetermined part which is projected to the part having an uneven shape of the screen in the image changes in accordance with the input by the operation member" is provided. Accordingly, a part of the virtual object is visually recognized to change in accordance with the operation contents of the user, and as a result, the illusion that the virtual object really exists that is given to the user can be accelerated.

(2) The vehicle display device described in the above-described (1), in which the image includes the meter image (220) which shows the meter device illustrating the vehicle information, the meter image is displayed by combining the multiple component images (221, 222, 223), and the predetermined part is at least one among the multiple component images.

(3) The vehicle display device described in the above-described (2), in which the meter image is the image which displays the vehicle information as the pointer (222) rotates and indicates the scale (221a), and the predetermined part shows the operation information as being rotated and indicating the scale image.

(4) The vehicle display device described in any one of the above-described (1) to (3), in which, on the screen, the round portion (212) which protrudes or is recessed in a circular shape or a columnar shape is formed, and the predetermined part is displayed in the round portion, and displayed being rotated around the round portion in accordance with the input by the operation member.

(5) The vehicle display device described in the above-described (4), in which the operation member is configured to be operated to be rotated, and the predetermined part is displayed to be rotated by the amount of rotation in accordance with the amount of rotation operation input by the operation member.

(6) The vehicle display device described in any one of the above-described (1) to (5), in which the image displayed on the screen is displayed being switchable between the first display mode which shows the first operation information, and the second display mode which shows the second operating information, and the predetermined part is displayed at a common part on the screen even in any of the first display mode and the second display mode.

Sixth Embodiment

Figure 20:
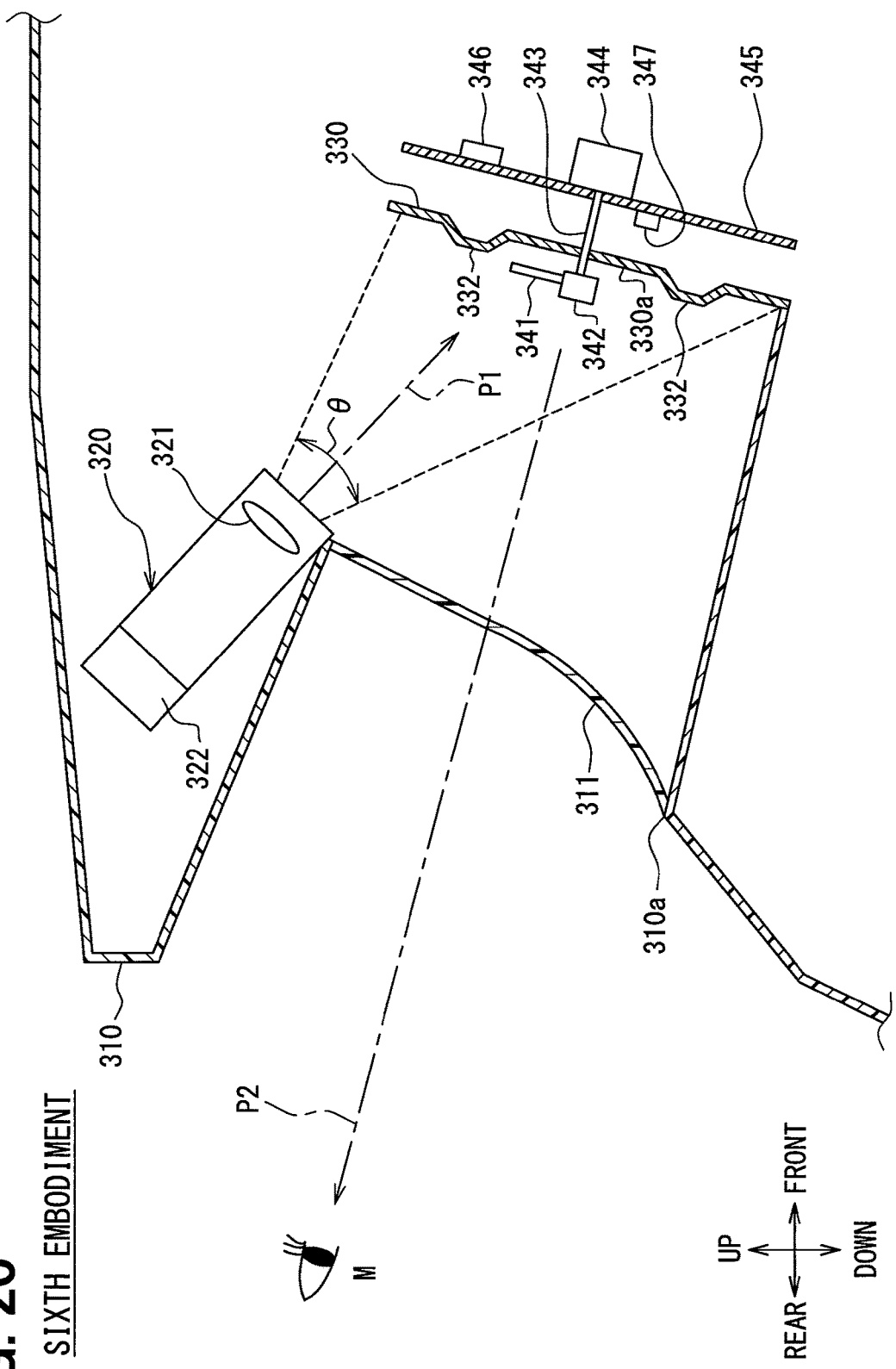
FIG. 20 is a cross-sectional view schematically illustrating the entire configuration of a vehicle display device in a sixth embodiment of the present disclosure.

Next, a vehicle display device according to a sixth embodiment will be described with reference to FIGS. 20 to 22. An object of the vehicle display device of the sixth embodiment is to easily realize disposition of a structure on a rear side of the screen. An instrument panel 310 illustrated in FIG. 20 is disposed below the front windshield inside the vehicle. The vehicle display device which will be described in detail later is disposed in the instrument panel 310. In addition, an arrow illustrating the vertical and horizontal directions in FIG. 20 illustrates the vertical and horizontal directions of the vehicle in a state where the vehicle display device is installed in the instrument panel 310.

The vehicle display device is provided with a projector 320, a screen 330, and a pointer 341, which will be described hereinafter. The projector 320 emits the display light P1 of the image which shows the vehicle information. Specific examples of the "vehicle information" shown by the above-described image include a vehicle speed, an engine rotation speed, a shift range of an automatic transmission, an amount of remaining fuel, an engine coolant temperature, and various types of warning information.

The screen 330 is a resin-made plate having a reflecting surface 330a of the light, and is formed in an uneven shape in the visual-recognition direction (direction illustrated with an arrow P2 in the drawing). In addition, the reflecting surface 330a is the entire surface of the side (viewer M side) on which the screen 330 is visually recognized. The screen 330 has a shape of a plate having a constant thickness on which a convex portion 332 is visually recognized. The convex portion 332 has a shape which is swollen to the viewer M side, and has a circular shape when viewed from the viewer M side (refer to FIG. 22).

Figure 21:
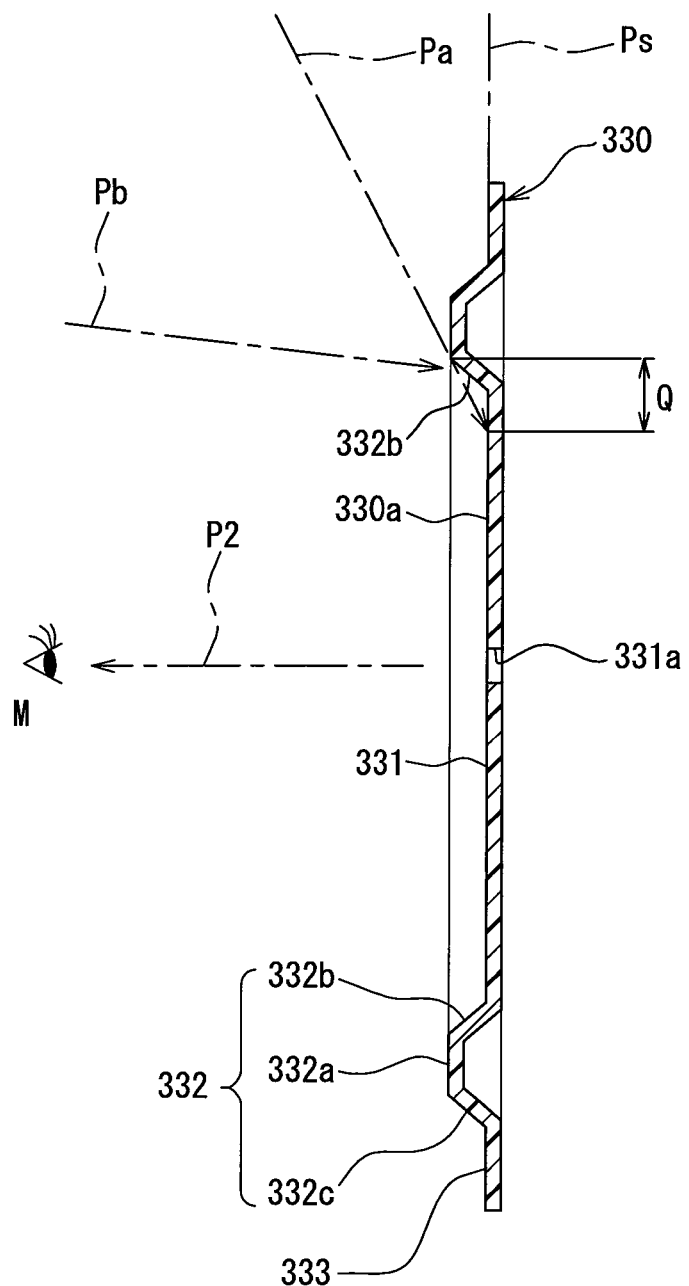
FIG. 21 is a cross-sectional view of the screen illustrated in FIG. 20.

As illustrated in FIG. 21, the screen 330 has a shape including a center portion 331 and an outer circumferential portion 333, which will be described hereinafter, in addition to the convex portion 332. The center portion 331 configures the center part of the screen 330, and is positioned on the inner circumferential side of the circular convex portion 332. The outer circumferential portion 333 is positioned on the outer circumferential side of the circular convex portion 332. The center portion 331 and the outer circumferential portion 333 have a flat shape which widens perpendicularly to the visual-recognition direction. Since the center portion 331 and the outer circumferential portion 333 are positioned being separated from the viewer M more than the convex portion 332, it can be said that the center portion 331 and the outer circumferential portion 333 are recessed portions. In addition, in this embodiment, a direction which is perpendicular to the screen 330 is the above-described "visual-recognition direction".

The convex portion 332 has a top 332a, an inner inclined portion 332b, and an outer inclined portion 332c, which will be described hereinafter. The inner inclined portion 332b has an inclined shape to be gradually swollen toward the viewer M side from an outer circumferential end of the center portion 331. The top 332a has a flat shape which widens in the radial direction from an outer circumferential end of the inner inclined portion 332b. The outer inclined portion 332c has an inclined shape to be gradually swollen toward the viewer M side from an inner circumferential end of the outer circumferential portion 333.

Returning to the description of FIG. 20, the display light P1 emitted from the projector 320 is incident on the reflecting surface 330a from the viewer M side of the screen 330, and is reflected to the viewer M side by the reflecting surface 330a. The display light P2 reflected by the reflecting surface 330a is input towards the eyes of the user who is the viewer M. In other words, as the display light P1 is projected to the screen 330, the image displayed on the screen 330 is visually recognized by the user. In addition, a cover 311 having translucency is attached to an opening 310a of the instrument panel 310, and the display light P2 which transmits the cover 311 is input towards the eyes of the viewer M.

The projector 320 is provided with an optical distortion lens 321, a display light generation device 322, and a light source which is not illustrated, which will be described hereinafter. The display light generation device 322 allows the light of the light source to transmit a liquid crystal panel, and generates the display light which shows a desired image. Otherwise, the display light generation device 322 allows the light of the light source to transmit a color filter which rotates at high speed, and generates the display light which shows the desired image.

Distortion is not generated on the image generated by the display light generation device 322. The optical distortion lens 321 causes generation of such distortion of the image. Here, the display light P1 projected to the screen 330 is not parallel to the visual-recognition direction. Accordingly, when the display light without distortion of the image is projected to the screen 330, the distorted image is visually recognized. In contrast to this, in this embodiment, since the image is distorted by the optical distortion lens 321, distortion is not included in the image of the display light P2 which is reflected by the screen 330.

In addition, a projection angle of the display light P1 and the uneven shape of the screen 330 are set so that a shadow of the convex portion 332 by the display light P1 is not generated on the screen 330 by the unevenness formed on the screen 330. For example, when the display light P1 is projected to the convex portion 332 by an angle illustrated with a reference numeral Pa in FIG. 21, a shadow of the convex portion 332 is generated at a part illustrated with a reference numeral Q on the screen 330. Meanwhile, if the display light P1 is projected to the convex portion 332 at an angle illustrated with the reference numeral Pb, a shadow is not generated on the screen 330. In this manner, a projection angle to the convex portion 332 and a shape of the convex portion 332 are set so that the shadow is not generated.

In addition, the projection angle of the display light P1 to the convex portion 332 with respect to a direction perpendicular to the visual-recognition direction on the screen 330, that is, a direction Ps along the reflecting surface 330a of the center portion 331 and the outer circumferential portion 333 in the example of FIG. 21, is referred to as the "projection angle". In addition, an emission angle θ of the display light P1 is set so that the display light P1 is projected to the screen 330 within a range illustrated with a dotted line in FIG. 20.

The pointer 341 is disposed on the viewer M side (front side) of the screen 330. An end section on the center side of rotation of the pointer 341 is attached to the boss 342. The pointer 341 and the boss 342 are not images, but real objects molded by resin. A rotation shaft 343 is attached to the boss 342. The rotation shaft 343 is inserted to a through hole 331a formed in the center portion 331 of the screen 330, and is disposed from the front side to the rear side (the side opposite to the viewer M side) of the screen 330. The rotation shaft 343 rotates by an electric motor 344.

A circuit board 345 is disposed on the rear side of the screen 330. The screen 330 and the circuit board 345 are disposed to be aligned in parallel at a predetermined interval. The above-described motor 344, a light source 347, such as a light-emitting diode, and a microcomputer 346 are mounted on the circuit board 345. Multiple light sources 347 are mounted, and are disposed at a position opposing the predetermined part (a part illustrated with reference numeral 331b in FIG. 22) of the screen 330. Therefore, each of the light sources 347 can transmit and illuminate the predetermined part set on the screen 330. The motor 344 and the light source 347 are controlled to be driven by the microcomputer 346. In addition, the motor 344 is referred to as a "driving device", and the light source 347 is referred to as an "illumination device".

Figure 22:
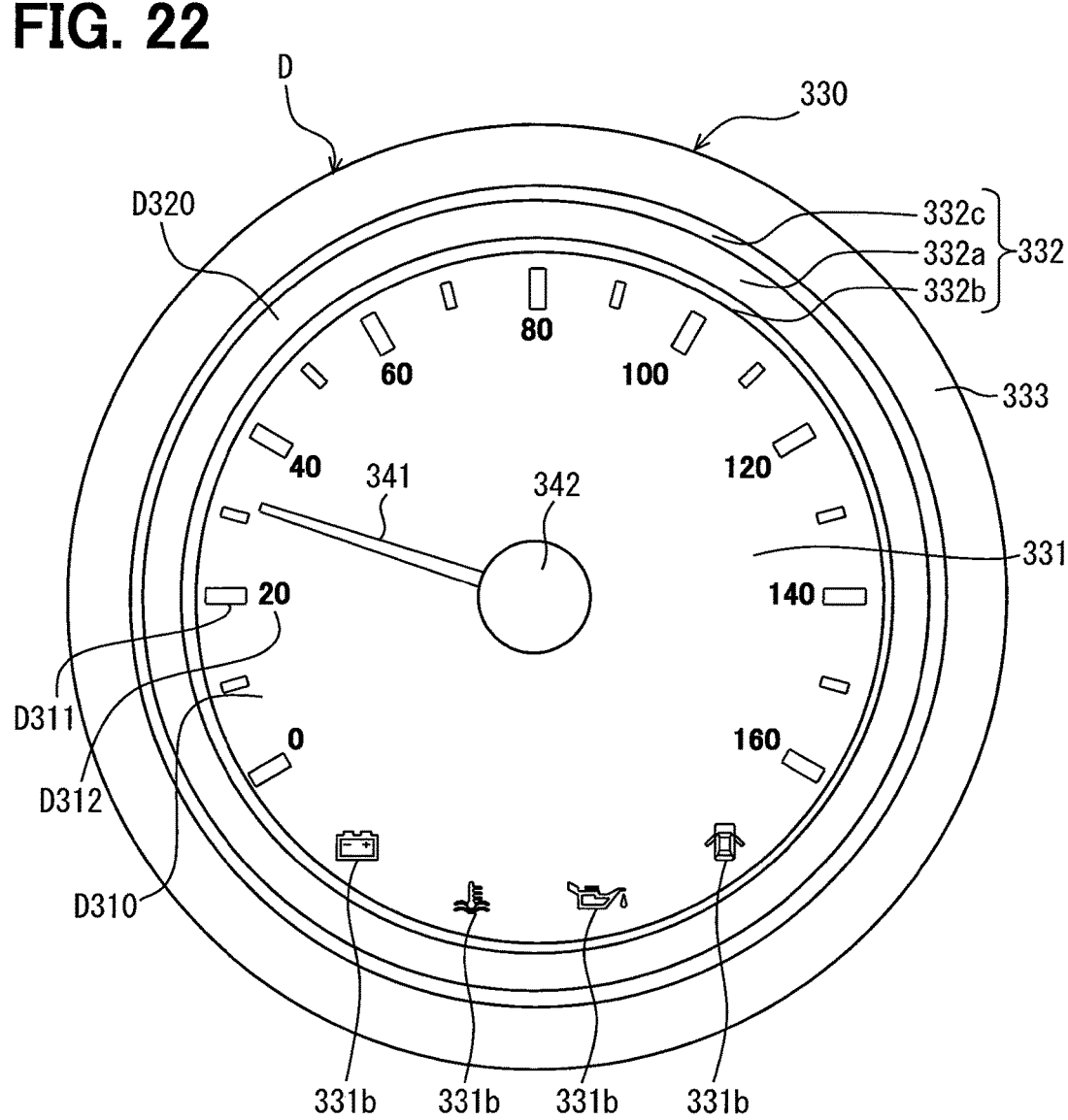
FIG. 22 is a front view illustrating one aspect of the meter image in the sixth embodiment.

As illustrated in FIG. 22, the image displayed on the screen 330 is an image (meter image D) which shows the meter device configured by combining multiple components. The above-described "multiple components" are a scale plate D310 (scale plate image) and a dial D320 (dial image), which will be described hereinafter. The scale plate D310 and the dial D320 are not real components, but images (component images).

In a display region of the scale plate D310, multiple scales D311 (scale images) and numbers D312 (number images) are displayed. The scales D311 and the numbers D312 are also not real printed objects, but images, and in the description below, will be described as the scale D311 and the number D312. In addition, the pointer 341 rotates and indicates the scale D311.

The dial D320 has an annular shape which surrounds the multiple scales D311 and the pointer 341. The scale plate D310 is displayed in the center portion 331 and the outer circumferential portion 333 of the screen 330. Therefore, the dial D320 is visually recognized to be present on the front side more than the scale plate D310. A boundary line between the outer inclined portion 332c and the outer circumferential portion 333 is positioned on an outline on an outer circumferential side of the dial D320, and a boundary line between the inner inclined portion 332b and the center portion 331 is positioned on the outline on an inner circumferential side of the dial D320. In short, the boundary lines between the center portion 331 and the outer circumferential portion 333, and the convex portion 332 match the boundary line between the component images.

In addition, the center portion 331 and the outer circumferential portion 333 of the screen 330 is displayed in the same color, and the top 332a and the inclined portions 332b and 332c are displayed in a color different from that of the center portion 331 and the outer circumferential portion 333 of the screen 330. Accordingly, visual recognition of the scale plate D310 that is present and straddles the dial D320 in the radial direction, and visual recognition of the dial D320 that is present on the front side of the scale plate D310 can be accelerated. In addition, the inner inclined portion 332b and the outer inclined portion 332c are displayed in gradation so that the color of the center portion 331 and the outer circumferential portion 333 gradually changes to the color of the top 332a.

In the display region of the scale plate D310, that is, the center portion 331 of the screen 330, symbols or letters showing the content of the warning are shown by printing. Specifically, the screen 330 is formed of a translucent material, and a light-shielding coating material is printed on a surface on the rear side of the screen 330. The printing is performed at a part other than the warning display portion 331b. Therefore, when the light source 347 is turned on, the warning display portion 331b is transmitted and illuminated. As a result, in the display region of the instrument panel 310, a shape of the warning display portion 331b which is not printed is visually recognized.

However, when the light source 347 is turned off, luminance, brightness, hue, and saturation of the display light projected to the warning display portion 331b are set so that the warning display portion 331b is not visually recognized. In addition, FIG. 21 illustrates a display mode when all of the light sources 347 are turned on while emitting the display light P1 from the projector 320.

In addition to the microcomputer 346, an electronic control device (not illustrated), such as an electronic control device which controls an operation of an internal-combustion engine mounted on the vehicle, calculates the vehicle information based on the detection value of various types of sensors. The microcomputer 346 obtains the vehicle information from the electronic control device, and controls driving of the motor 344 and the light source 347 in accordance with the obtained vehicle information. For example, the microcomputer 346 rotates the pointer 341 at a position which indicates the scale D311 showing the vehicle speed in accordance with the vehicle speed obtained as the vehicle information. In addition, when an abnormality signal illustrating an indication that an abnormality is generated in the vehicle is included in the obtained vehicle information, the microcomputer 346 turns on the light source 347.

In short, the vehicle display device of this embodiment described above has characteristics which will be described below. In addition, by each of the characteristics, operation effects which will be described below are achieved.

<Characteristic 1>

According to this embodiment, since the screen 330 has the uneven shape in the visual-recognition direction, visual recognition of the meter image D displayed on the screen 330 in a three-dimensional manner can be accelerated. In other words, the illusion that a virtual meter device which is expressed by the meter image D really exists that is given to the user can be accelerated. Specifically, the dial D320 is displayed in the convex portion 332 of the screen 330, and the scale plate D310 is displayed in the center portion 331 and the outer circumferential portion 333. For this reason, the illusion that the dial D320 is a three-dimensional component which protrudes to the near side more than the scale plate D310 that is given to the user can be accelerated.

In addition to this, further, in this embodiment, since the projector 320 is disposed on the front side of the screen 330, and the display light is projected from the front side of the screen 330, an optical path of the display light P1 is not positioned on the rear side of the screen 330. Accordingly, even when the structure is disposed on the rear side of the screen 330, the display light P1 is not shielded by the structure. For this reason, the structure, such as the motor 344, the light source 347, and the circuit board 345, on the rear side of the screen 330, can be disposed on the rear side of the screen 330.

<Characteristic 2>

In this embodiment, the driving device (motor 344) which serves as the structure is disposed on the rear side of the screen 330, and the pointer 341 which is driven to be rotated by the motor 344 is disposed on the front side of the screen 330.

According to this, the virtual scale plate D310 and the dial D320 express the meter image D by being combined with the pointer 341 which is a real object. Accordingly, the illusion that the scale plate D310 and the dial D320 are real objects that is given can be accelerated. In particular, if the display light of the scale plate D310 is set (for example, set to have high brightness or high luminance) so that a shadow of the pointer 341 by the display light P1 is likely to be visually recognized, the meter image D can be visually recognized with more reality. Therefore, only by changing the display light P1 which is emitted from the projector 320, the display mode of the meter image D can be easily changed.

<Characteristic 3>

In this embodiment, the illumination device (light source 347) which serves as the above-described structure is disposed on the rear side of the screen 330, and a predetermined part (warning display portion 331b) of the screen 330 is transmitted and illuminated by the light source 347. According to this, as the display light P1 by the projector 320 and light transmitted and illuminated by the light source 347 are combined, the meter image D is expressed. Therefore, diversification of expression can be improved.

<Characteristic 4>

The illumination device (light source 347) according to this embodiment performs transmission and illumination when abnormality is generated in the vehicle. According to this, even when the projector 320 is broken and the projector 320 cannot project the display light P1, a notice of the indication that the abnormality is generated in the vehicle to the viewer M by transmission and illumination by the light source 347 can be accelerated.

<Characteristic 5>

In this embodiment, the projection angle of the display light P1 and the uneven shape of the screen 330 are set so that a shadow of unevenness formed on the screen 330 is not generated. Specifically, the projection angle to the convex portion 332 and the shape of the convex portion 332 are set so that a shadow of the convex portion 332 is not generated on the screen 330. For this reason, while avoiding damage to appearance by the shadow, visual recognition of the meter image D in a three-dimensional manner by forming the unevenness to the screen 330 can be accelerated.

Seventh Embodiment

Figure 23:
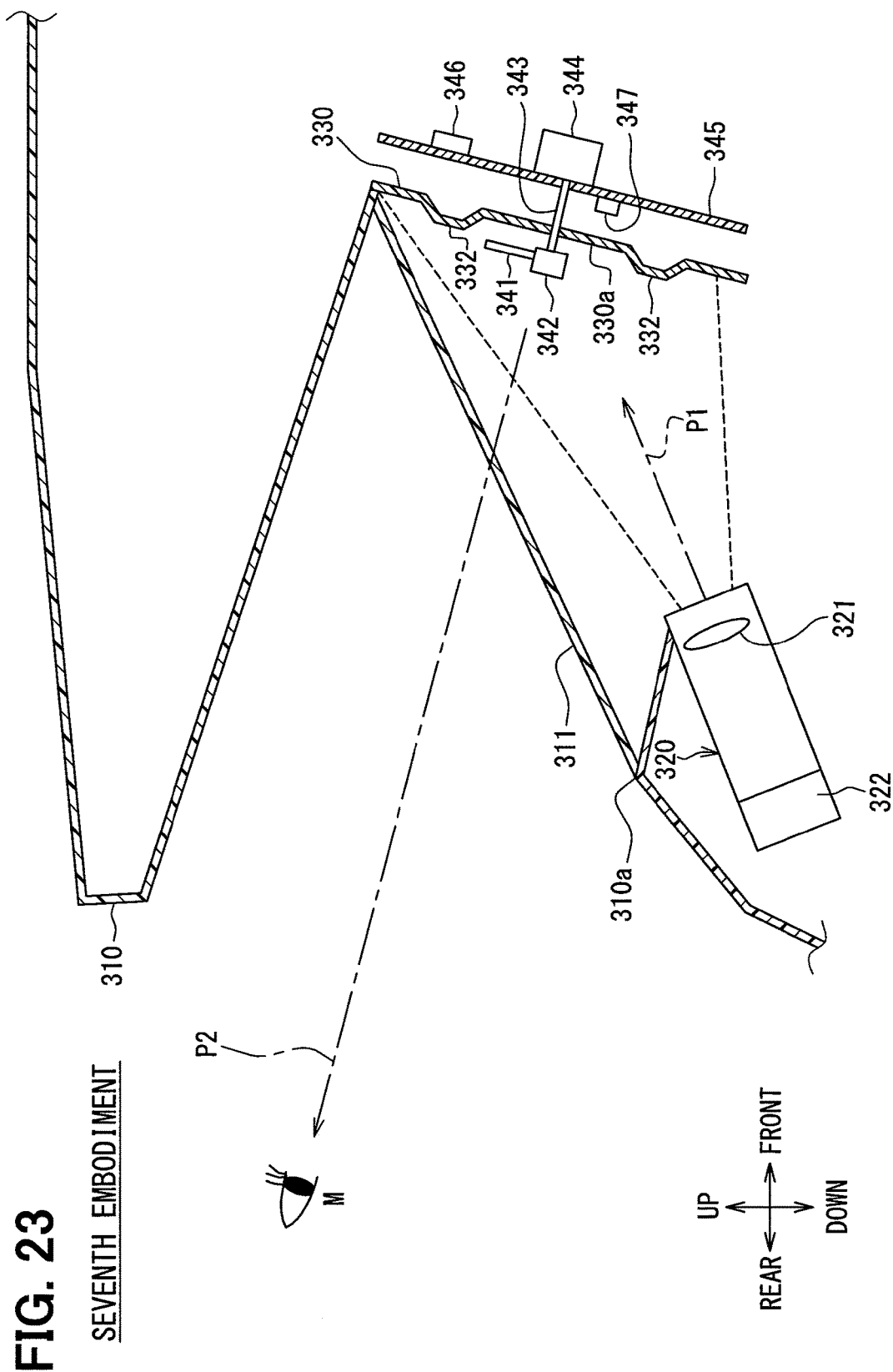
FIG. 23 is a cross-sectional view schematically illustrating the entire configuration of a vehicle display device in a seventh embodiment of the present disclosure.

In the above-described sixth embodiment, the projector 320 is disposed on an upper side of the opening portion 310a of the instrument panel 310, and projects the display light P1 from the upper side of the screen 330. In contrast to this, in this embodiment, as illustrated in FIG. 23, the projector 320 is disposed on a lower side of the opening portion 310a, and projects the display light P1 from the lower side of the screen 330.

Regarding the configuration except that the disposition of the projector 320, the vehicle display device according to this embodiment is similar to that of the above-described sixth embodiment. Therefore, even according to this embodiment, similar effects to those of the above-described sixth embodiment are achieved.

Eighth Embodiment

Figure 24:
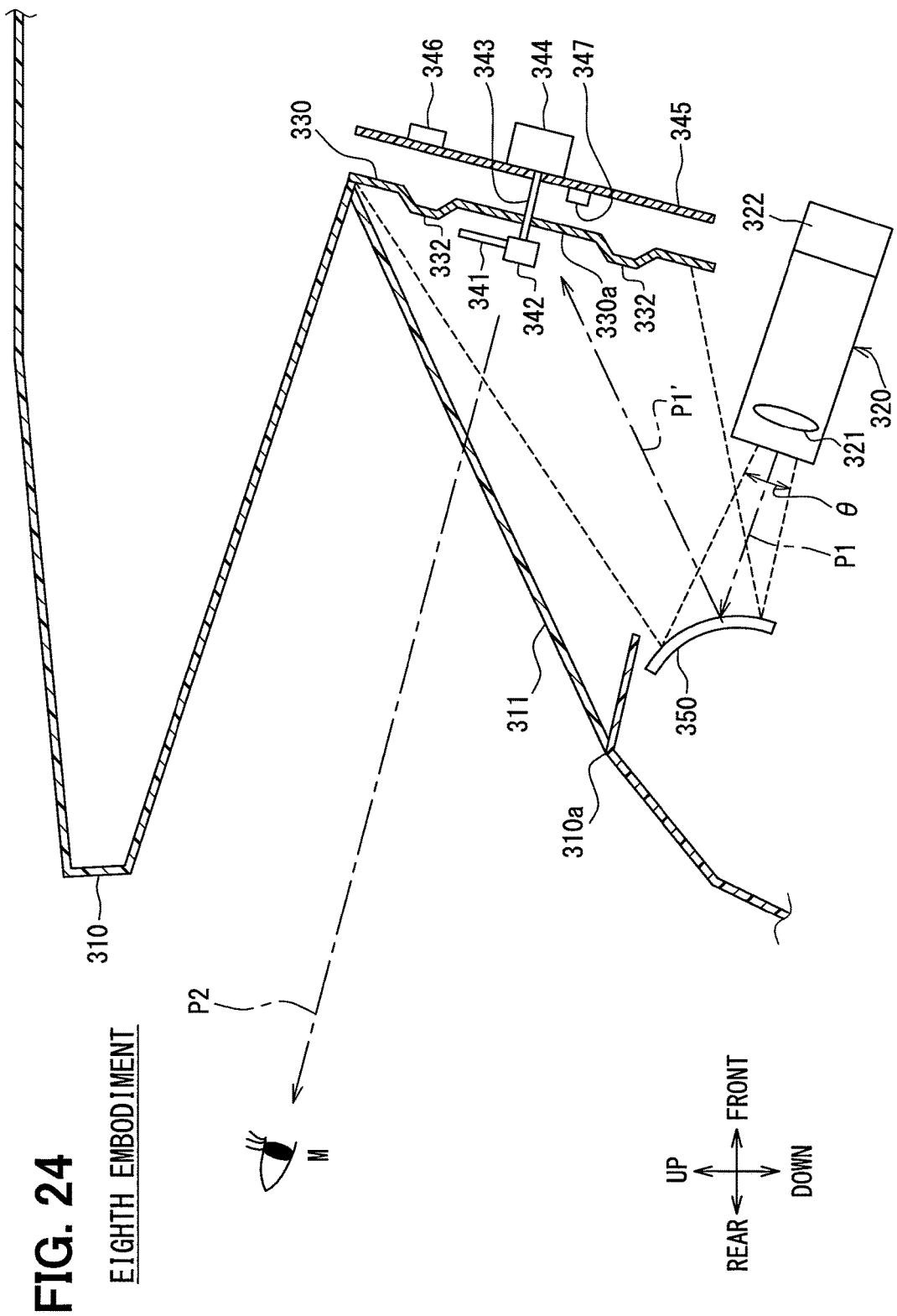
FIG. 24 is a cross-sectional view schematically illustrating the entire configuration of a vehicle display device in an eighth embodiment of the present disclosure.

In the above-described sixth and seventh embodiments, the display light P1 emitted from the projector 320 is directly projected to the screen 330. In contrast to this, in this embodiment, as illustrated in FIG. 24, a reflecting mirror 350 which reflects the display light P1 emitted from the projector 320 toward the screen 330 is provided. Display light P1' reflected by the reflecting mirror 350 is projected to the screen 330 similarly to the display light P1 according to the above-described seventh embodiment.

In addition, a magnifying mirror is employed in the reflecting mirror 350. In addition, in the above-described sixth and seventh embodiments, the entire projector 320 is disposed on the front side of the screen 330, but in this embodiment, a part of the projector 320 is disposed on the rear side of the screen 330. Regarding configuration except for the position of the projector 320 and the reflecting mirror 350, the vehicle display device according to this embodiment is similar to that of the above-described seventh embodiment.

Above, since the reflecting mirror 350 is provided in this embodiment, an optical path distance from the projector 320 to the screen 330 can lengthen. For this reason, since the emission angle θ of the display light P1 can be small, the image distorted by the optical distortion lens 321 is projected to the screen 330, and displaying the image which is not distorted can be realized with high accuracy.

Modification Example of Sixth to Eighth Embodiments

The present disclosure is not limited to the description of the above-described embodiments, and modifications may be carried out as follows. In addition, characteristic configurations of each embodiment may be respectively arbitrarily combined.

In each of the above-described embodiments, the projector 320 continues to emit the display light P1 without changing the light, and a still image is displayed. In contrast to this, the display light P1 may be changed, and a moving image may be displayed. In addition, even when any of the still image and the moving image is displayed, the meter images D having different designs may be displayed being switched. For example, the color of the scale plate D310 or the dial D320 may be gradually changed, or the colors may be switched and changed. In addition, the dial D320 may be turned off or may blink.

When the warning display portion 331b is displayed and when the warning display portion 331b is not displayed, the display mode of the scale plate D310 or the dial D320 may be changed. For example, when the warning display portion 331b is not displayed, the scale plate D310 or the dial D320 are displayed in blue. Meanwhile, when the warning display portion 331b is displayed, the scale plate D310 or the dial D320 are displayed in red, and blink.

In the above-described sixth embodiment, multiple scales D311 is displayed in the display region of the scale plate D310, but the display region of the dial D320 may be displayed.

In each of the above-described embodiments, the image displayed by the vehicle display device is the meter image D. In contrast to this, the image according to the present disclosure is not limited to the meter image D, and for example, may be an image on the map by the navigation device. In this case, for example, the position of the vehicle on the map corresponds to the vehicle information.

In the above-described sixth embodiment, a part at which the dial D320 is displayed on the screen 330 protrudes to the front side of the screen 330, but this part may be configured to be recessed to the rear side of the part. In other words, unevenness of the screen 330 may be reversed.

In each of the above-described embodiments, a direction which is perpendicular to a direction (refer to a reference numeral Ps in FIG. 21) in which a part (flat part) at which unevenness is not formed on the screen 330 widens is assumed to be the visual-recognition direction. In addition, as an example in which the screen 330 has an uneven shape in the visual-recognition direction, in each of the above-described embodiments, a shape having the convex portion 332 which is swollen to the viewer M side in the visual-recognition direction is described as an example. In contrast to this, a direction which becomes an acute angle or an obtuse angle with respect to the direction Ps in which the flat part widens may be the visual-recognition direction. In this case, in the direction which becomes an acute angle or an obtuse angle with respect to the direction Ps in which the flat part widens, a convex portion is swollen.

In the above-described sixth embodiment, excluding a predetermined part which is transmitted and illuminated by the light source 347, a light-shielding coating material is printed on the surface on the rear side of the screen 330. In contrast to this, such printing may be disused, and a design sheet which will be described hereinafter may be disposed on the surface on the rear side of the screen 330. The design sheet is formed of a resin-made sheet having translucency, and the light-shielding coating material is printed on a part except a part facing the predetermined part.

In each of the above-described embodiments, the real pointer 341 and the motor 344 are provided, but the pointer 341 and the motor 344 are disused, and the pointer by the display light P1 may be displayed on the screen 330.

In each of the above-described embodiments, the warning display portion 331b is transmitted and illuminated by the light source 347, but the light source 347 is disused, and the warning image may be displayed on the screen 330 by the display light P1.

In the example illustrated in FIG. 24, the reflecting mirror 350 is a magnifying mirror which magnifies and reflects the display light P1. In contrast to this, the reflecting mirror 350 which has a reflecting surface of a plane shape and which does not magnify the light may be employed.

The vehicle display device according to the sixth to eighth embodiments can be limited as follows.

(1) The vehicle display device including the projector (320) which emits the display light of the image showing the vehicle information, and the screen (330) which displays the image as the display light is projected, in which the screen is formed to have an uneven shape in the direction in which the image is visually recognized, and the display light is projected to the screen from the side which is visually recognized with respect to the screen.

According to the above-described (1), since the display light is projected from the side (front side) which is visually recognized with respect to the screen, the optical path of the display light can be set not to be positioned on the rear side of the screen. Accordingly, the disposition of the structure on the rear side of the screen not to shield the display light can be easily realized.

(2) The vehicle display device according to the above-described (1), including the pointer (341) which is disposed on the side which is visually recognized with respect to the screen, and the driving device (344) which is disposed on the side opposite to the side which is visually recognized with respect to the screen, and drives the pointer to be rotated.

(3) The vehicle display device according to the above-described (1) or (2), including the illumination device (347) which is disposed on the side opposite to the side which is visually recognized with respect to the screen, and transmits and illuminates the predetermined part of the screen.

(4) The vehicle display device according to the above-described (3), in which the illumination device performs transmission and illumination when an abnormality is generated in the vehicle.

(5) The vehicle display device according to any one of the above-described (1) to (4), including the reflecting mirror (350) which reflects the display light emitted from the projector toward the screen.

(6) The vehicle display device according to any one of the above-described (1) to (5), in which the projection angle of the display light and the uneven shape of the screen are set so that a shadow of the unevenness formed on the screen is not generated.

Ninth Embodiment

Figure 25:
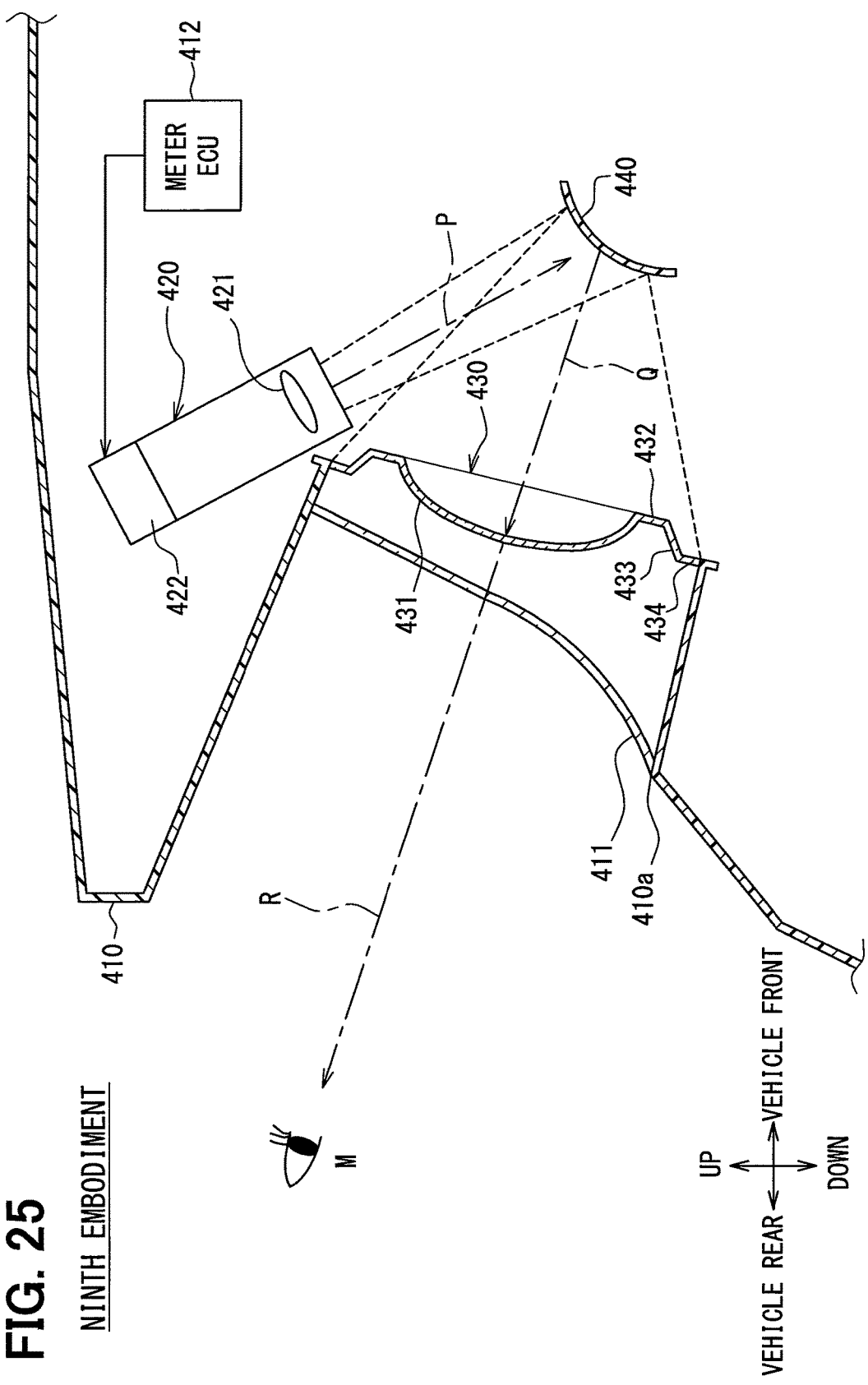
FIG. 25 is a cross-sectional view schematically illustrating the entire configuration of a vehicle display device in a ninth embodiment of the present disclosure.

Next, a vehicle display device according to a ninth embodiment will be described with reference to FIGS. 25 to 28. An object of the vehicle display device according to the ninth embodiment is to easily suppress distortion of a pointer image when the pointer-type meter image is displayed on the screen having the unevenness. An instrument panel 410 illustrated in FIG. 25 is disposed below the front windshield inside the vehicle. The vehicle display device which will be described in detail later is installed on a rear side of a translucent cover 411 which is attached to an opening portion 410a of the instrument panel 410. In addition, an arrow illustrating vertical and horizontal directions in FIG. 25 illustrates the vertical and horizontal directions of the vehicle in a state where the vehicle display device is installed on the instrument panel 410.

The vehicle display device is provided with a projector 420, a screen 430, and a reflecting mirror 440, which will be described hereinafter. The projector 420 emits the display light P of the image which shows the vehicle information. Specific examples of the "vehicle information" shown by the above-described image include a vehicle speed, an engine rotation speed, a shift range of an automatic transmission, an amount of remaining fuel, an engine coolant temperature, and various types of warning information.

An electronic control device (hereinafter, will be described as a meter ECU 412) is connected to be able to communicate with other electronic control devices. Other electronic control devices obtain the vehicle information calculated based on various types of sensors by the communication with the meter ECU 412. The meter ECU 412 controls an operation of the projector 420 based on the obtained vehicle information. For example, the meter ECU 412 sends the vehicle speed information obtained consecutively every predetermined time to the projector 420. The projector 420 emits the display light P of the image which displays the vehicle speed information sent from the meter ECU 412.

The projector 420 is provided with a magnifying lens 421, a display light generation device 422 (controller), and a light source which is not illustrated, which will be described hereinafter. The display light generation device 422 allows the light of the light source to transmit the liquid crystal panel, and generates the display light which shows a desirable image. Otherwise, the display light generation device 422 allows the light of the light source to transmit a color filter which rotates at high speed, and generates the display light which shows the desired image. Furthermore, the display light generation device 422 controls the luminance of the display light. In other words, by controlling the luminance of the display light, the display light generation device 422 controls luminance of the image displayed on the screen 430 as will be illustrated later. The light of the image generated by the display light generation device 422 is emitted from the projector 420 as the above-described display light P after being magnified by the magnifying lens 421.

The reflecting mirror 440 reflects the display light P emitted from the projector 420 toward the screen 430. In the example of FIG. 25, the reflecting surface of the reflecting mirror 440 has a convex shape, and magnifies and reflects the display light P. The display light Q reflected by the reflecting mirror 440 transmits to the near side from the side (far side) opposite to the viewer M on the screen 430. The display light R which transmits the screen 430 passes through the translucent cover 411, and is input towards the eyes of the user who is the viewer M. In other words, by projecting the display light Q to the screen 430, the image displayed on the screen 430 is visually recognized by the user.

Figure 26:
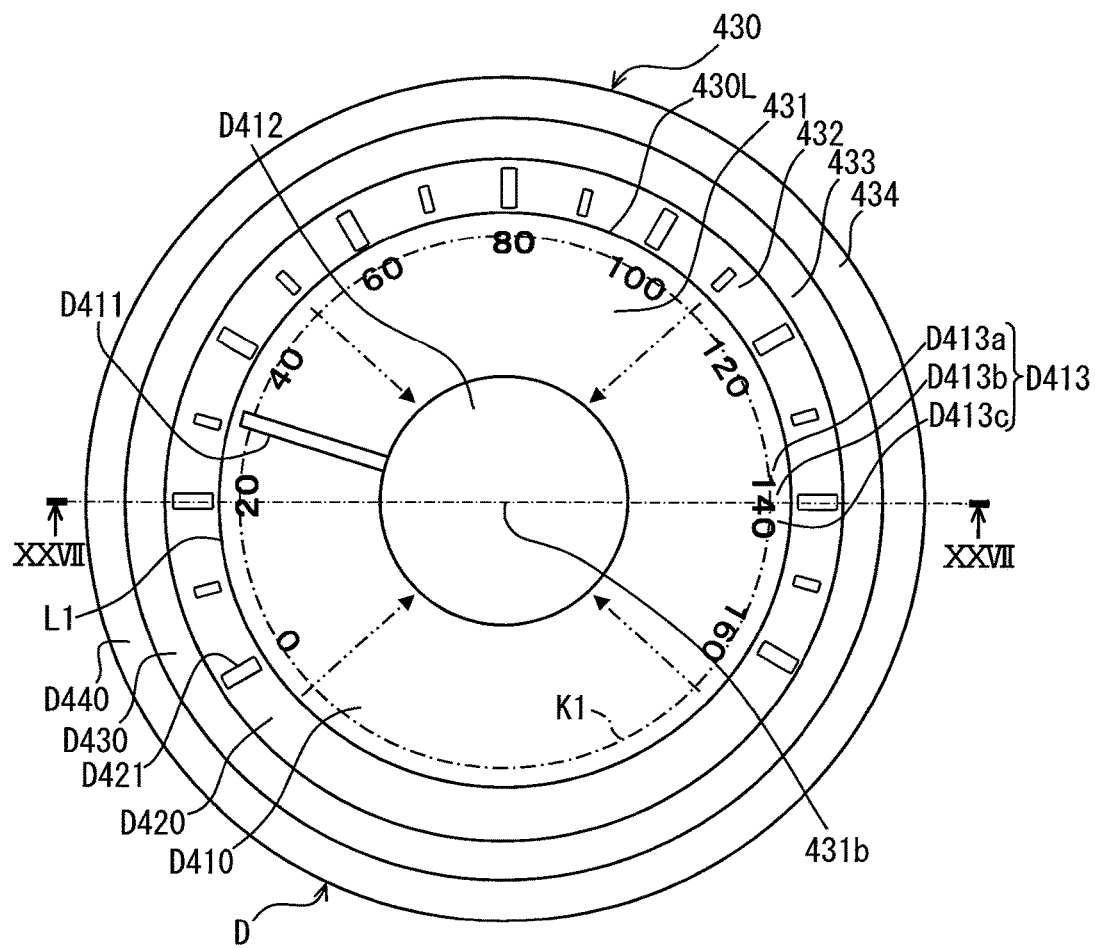
FIG. 26 is a front view illustrating one aspect of a meter image displayed on the screen of FIG. 25.

The screen 430 is a resin-made plate having translucency, and has a shape of a plate having a constant thickness on which a spherical surface portion 431 is formed. As illustrated in FIG. 26, the screen 430 has a round shape when viewed from the viewer M side, and the spherical surface portion 431 is positioned at the center of the round screen 430. The spherical surface portion 431 forms a spherical surface having a constant curvature. In addition to the spherical surface portion 431, the screen 430 has a shape having a bottom portion 432, an inclined portion 433, and an outer circumferential portion 434, which will be described hereinafter. In addition, when viewed from the viewer M side, the spherical surface portion 431 has a round shape, and the bottom portion 432, the inclined portion 433, and the outer circumferential portion 434 have an annular shape. An inner circumference of the bottom portion 432 is linked to an outer circumference of the spherical surface portion 431, an inner circumference of the inclined portion 433 is linked to an outer circumference of the bottom portion 432, and an inner circumference of the outer circumferential portion 434 is linked to an outer circumference of the inclined portion 433.

Figure 27:
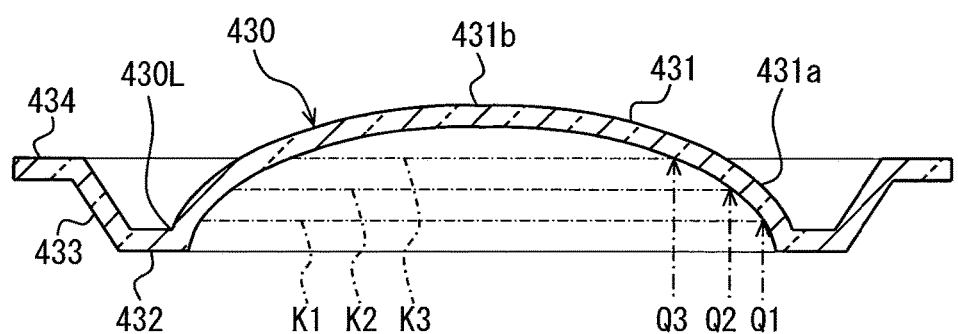
FIG. 27 is a cross-sectional view along line XXVII-XXVII of FIG. 26.

As illustrated in FIG. 27, the spherical surface portion 431 forms a shape which is swollen to the viewer M side, and a curved spherical surface which becomes a convex part toward the viewer M side. When viewed from the viewer M side, a top point 431*b* of the spherical surface is positioned at the center of the spherical surface portion 431. A virtual surface which is in contact with the top point 431*b* is perpendicular to the visual-recognition direction (vertical direction in FIG. 27). Therefore, as a part is more separated from the top point 431*b* in the spherical surface portion 431, the inclination angle with respect to the virtual surface becomes larger. In the description below, a part of the spherical surface portion 431 of which the inclination angle is equal to or greater than a predetermined angle (for example, 45 degrees) is called a steep inclined surface portion 431*a*.

The bottom portion 432 has a circular shape which extends in the radial direction from an outer circumferential end of the spherical surface portion 431, and forms a plate surface which is parallel to the virtual surface. The inclined portion 433 has a circular shape which extends in the radial direction from an outer circumferential end of the bottom portion 432, and forms a flat inclined surface which is gradually swollen to the viewer M side at a constant angle with respect to the virtual surface. The outer circumferential portion 434 has a circular shape which extends in the radial direction from an outer circumferential end of the inclined portion 433, and forms a plate surface which is parallel to the virtual surface. In addition, the top point 431*b* of the spherical surface portion 431 is positioned closer to the viewer M side than the outer circumferential portion 434, and the steep inclined surface portion 431*a* of the spherical surface portion 431 is positioned closer to the side opposite to the viewer M than the outer circumferential portion 434.

As illustrated in FIG. 26, the image displayed on the screen 430 is an image (meter image D) which shows a meter configured by combining multiple components. The above-described "multiple components" are a display plate D410, a scale plate D420, decoration rings D430 and D440, a pointer D411, and a boss D412, which will be described hereinafter. The display plate D410, the scale plate D420, the decoration rings D430 and D440, the pointer D411, and the boss D412 are not real components, but images (component images).

The display plate D410 is displayed in the spherical surface portion 431 together with multiple numbers D413. In addition, the pointer D411 and the boss D412 are also displayed in the spherical surface portion 431. The display plate D410 has a round shape along an outer shape of the spherical surface portion 431, and the boss D412 is displayed at the center of the display plate D410. The pointer D411 has a shape which extends in the radial direction of the display plate D410 from the boss D412, and is displayed by a moving image to rotate on the display plate D410 around the boss D412. The numbers D413 are still images showing a vehicle speed displayed in the steep inclined surface portion 431*a*. The pointer D411, the boss D412, and the numbers D413 are displayed in a color different from that of the display plate D410.

Figure 28:
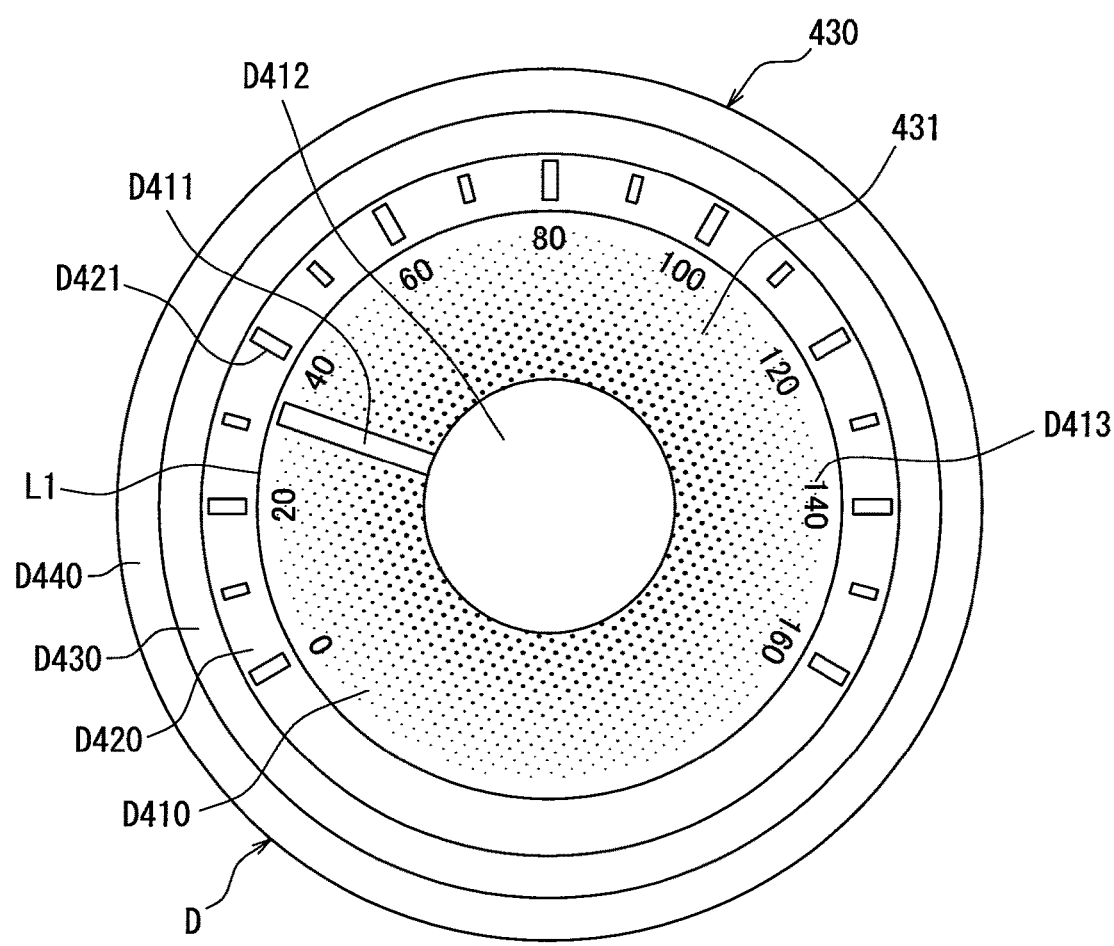
FIG. 28 is a front view illustrating a method of making gradation display of a display plate image in the ninth embodiment.

As illustrated in FIG. 28, the display light generation device 422 controls the display light so that the display plate D410 displays the display light in gradation so that the luminance gradually changes from the top point 431*b* to the outer circumferential end. Specifically, as illustrated with an arrow in a two-dot chain line in FIG. 26, the luminance is changed radially from the top point 431*b*, and as approaching the outer circumferential end, the higher luminance is displayed.

In other words, the display light generation device 433 controls the display light so that the luminance gradually increases as the display plate D410 is separated from a predetermined point of the spherical surface portion 431, and displays the display plate D41 in gradation. In addition, the above-described predetermined point is positioned at the center of rotation of the pointer D411 (that is, the top point 431*b*), and is set to be one location. One-dot chain lines K1, K2, and K3 in FIGS. 26 and 27 are virtual lines which extend in the circumferential direction around the top point 431*b* on a front surface of the spherical surface portion 431. The virtual lines K1, K2, and K3 have a round shape around the top point 431*b*, and it can be said that a swelling height of the spherical surface portion 431 is the same virtual contour line. In addition, the display plate D410 is displayed in gradation so that the same virtual lines K1, K2, and K3 have the same luminance.

In addition, while the display plate D410 is displayed in gradation, the pointer D411 and the boss D412 are not displayed in gradation, but with the same luminance. Accordingly, the illusion that the pointer D411 and the boss D412 are components separated from the display plate D410 that is given can be accelerated.

While the display plate D410 is a background image which shows the background of the pointer D411, the number D413 is an ideographic image having a certain meaning. For example, the number given the reference numeral D413 is a three-digit number, and it can be said that the number is an ideographic image which is configured by combining multiple element images D413*a*, D413*b*, and D413*c* (refer to FIG. 26). In other words, the three-digit number given the reference numeral D413 shows "140", but is configured by aligning the element image D413*a* showing "1", the element image D413*b* showing "4", and the element image D413*c* showing "0" in order. In addition, a length (that is, a horizontal dimension of the number D413) in a direction in which the multiple element images D413a, D413b, and D413c are aligned is longer than a vertical dimension of the number D413.

The multiple element images D413a, D413b, and D413c are disposed to be aligned in a direction which intersects with a direction of lowering the steep inclined surface portion 431a. The lowering direction is a direction which extends in the radial direction along the front surface of the spherical surface portion 431 from the top point 431b of the spherical surface portion 431. The multiple element images D413a, D413b, and D413c are disposed to be aligned on the virtual line K1. Therefore, it can be said that the direction in which the multiple element images D413a, D413b, and D413c are aligned is parallel to the circumferential direction of rotation of the pointer D411.

Returning to the description of FIG. 26, the scale plate D420 is displayed in the bottom portion 432 together with a scale D421. The scale plate D420 has a circular shape along the inner circumference and the outer circumference of the bottom portion 432. The scale D421 is displayed at a position which corresponds to each of the multiple numbers D413. The scale plate D420 is a scale background image which shows the background of the scale D421. The scale plate D420 has a color different from that of the scale D421. The above-described number D413 and the scale D421 are not real printed objects, but images. In addition, the pointer D411 which is rotated and displayed rotates and indicates the scale D421. Accordingly, the meter image D shows the vehicle speed which is the vehicle information.

The decoration rings D430 and D440 are displayed in the inclined portion 433 and the outer circumferential portion 434. The decoration ring D430 displayed in the inclined portion 433 is displayed in gradation so that the luminance thereof gradually changes from the inner circumferential end to the outer circumferential end. The decoration ring D440 displayed in the outer circumferential portion 434 is displayed with the same luminance as that of the outer circumferential end of the decoration ring D430.

An outline image L1 which shows an outline of the display plate D410 is displayed at a part which is positioned on an outer edge of the spherical surface portion 431 on the screen 430, that is, a boundary part 430L between the spherical surface portion 431 and the bottom portion 432. The outline image L1 is set to have a color different from that of the spherical surface portion 431 and the bottom portion 432. In addition, the outline image L1 is an image of a line which is set to have a width to an extent to recognize the presence of the outline image L1 by the viewer.

In short, the vehicle display device of this embodiment described above has characteristics which will be described below. In addition, by each of the characteristics, operation effects which will be described below are achieved.
<Characteristic 1>

The spherical surface portion 431 swollen to the near side (that is, the viewer side) in the visual-recognition direction is formed on the screen 430, and the pointer image D411 is displayed in the spherical surface portion 431. For this reason, a degree of distortion of the light corresponding to the pointer image D411 in the display light projected to the screen 430 can be suppressed not to change in accordance with the rotation position. Therefore, the shape and the length of the pointer image D411 can be easily suppressed not to change in accordance with the rotation position.

Here, in contrast to this embodiment, when the pointer image D411 is displayed to straddle the bent part on the screen 430, that is, a boundary part between the spherical surface portion 431 and the bottom portion 432, a boundary part between the bottom portion 432 and the inclined portion 433, and a boundary part between the inclined portion 433 and the outer circumferential portion 434, the following problem is generated. In other words, when the screen 430 is viewed from a front surface, the pointer image D411 is seen in a shape which extends straightly in the radial direction, but when peeking the screen 430 slantingly, the pointer image D411 is seen to be bent at the bent part.

In consideration of the point, in this embodiment, a display range of the pointer image D411 is restricted to the inside of the spherical surface portion 431. For this reason, when the screen 430 is seen slantingly, there is a case where the pointer image D411 is seen to be curved, but there is not a case where the pointer image D411 is seen to be bent. In this manner, the manner of appearing of the pointer image D411 can be suppressed not to be different in accordance with the orientation of visual recognition.
<Characteristic 2>

The background image (that is, the display plate D410) which is displayed in the spherical surface portion 431, and shows the background of the pointer image D411 is included in the meter image D. The background image is displayed in gradation so that the luminance gradually changes as being separated from the predetermined point (that is, the top point 431b) of the spherical surface portion 431.

According to this, the spherical surface portion 431 is lighted by the light from the virtual light source, and the illusion that a shadow to the spherical surface portion 431 is made that is given can be accelerated. For this reason, it is emphasized that the spherical surface portion 431 is swollen to the near side or the far side, and the spherical surface portion 431 can be accelerated to be seen to be inflated in a three-dimensional manner. Accordingly, the three-dimensional effect of the virtual meter which is expressed by the meter image D can be expressed with reality, and the illusion that the meter really exists that is given to the user can be accelerated.
<Characteristic 3>

Figure 29:
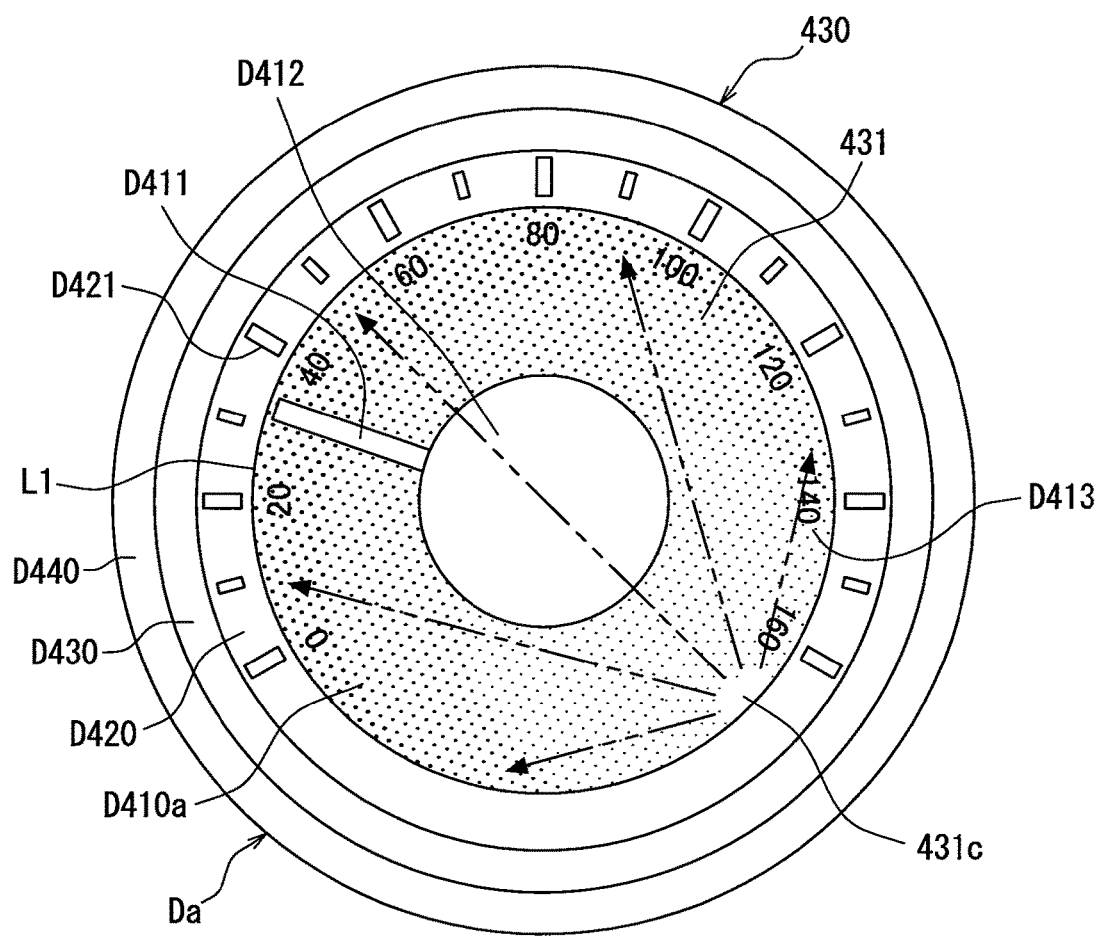
FIG. 29 is a front view illustrating a method of making gradation display of a display plate image in a tenth embodiment of this disclosure.
Figure 30:
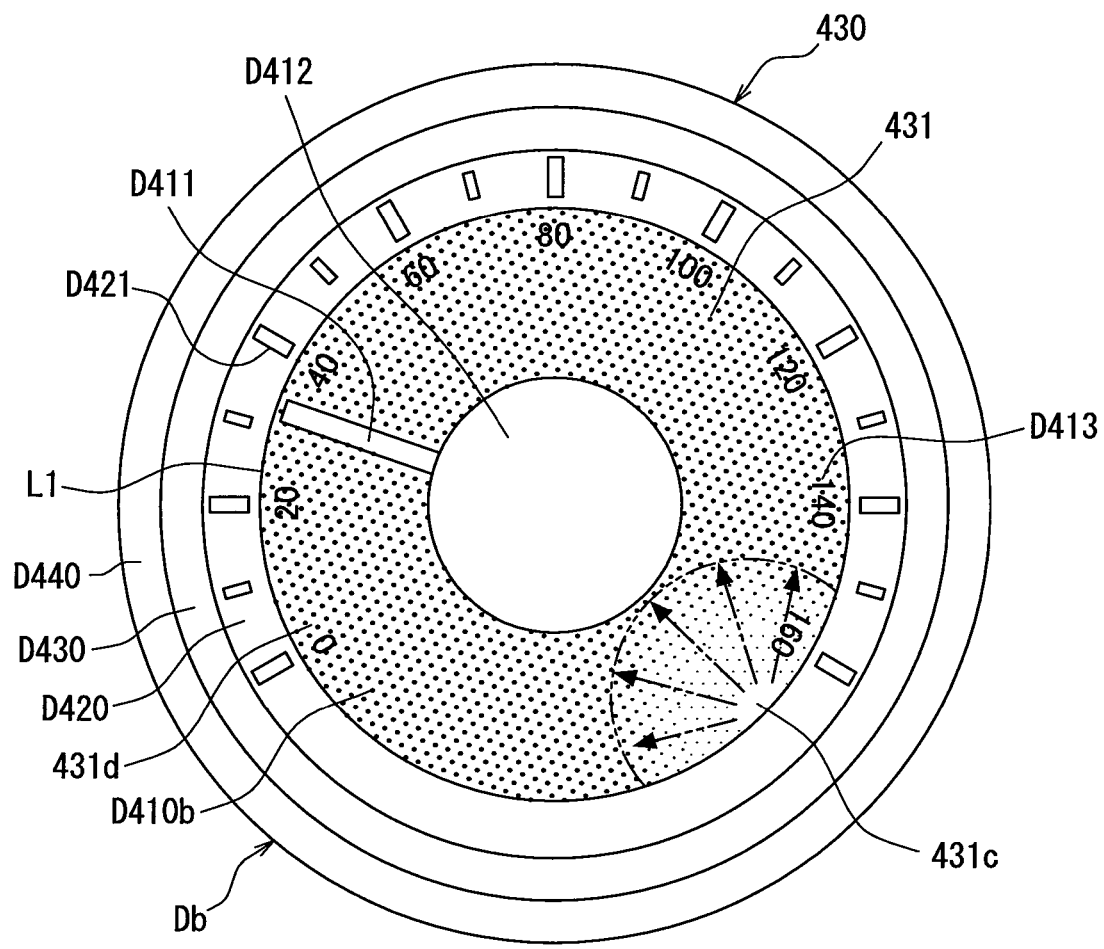
FIG. 30 is a front view illustrating a method of making gradation display of a display plate image in an eleventh embodiment of this disclosure.

The above-described predetermined point according to the gradation display is positioned at the center of the rotation of the pointer image D411. According to this, compared to a case where the predetermined points 431c and 431d are positioned at a position which is shifted from the center of the rotation as illustrated in FIGS. 29 and 30 which will be described later, the above-described effects that the spherical surface portion 431 is seen to be inflated in a three-dimensional manner on the near side or the far side.
<Characteristic 4>

At a part which is positioned on an outer edge of the spherical surface portion 431 on the screen 430, the outline image L1 which shows the outline of the spherical surface portion 431 is displayed. According to this, on the screen 430, a part which is positioned on the outer edge of the spherical surface portion 431 is remarkably visually recognized. For this reason, the illusion that a meter component (that is, the display plate D410) which is expressed by the background image really exists that is given can be accelerated.
<Characteristic 5>

The curvature of the spherical surface portion 431 is formed in a constant shape. For this reason, even when the rotation position of the pointer D411 changes, the shape and the length of the pointer D411 does not change. Accordingly, without correcting the display light, visual recognition of the shape and the length of the pointer D411 that do not change can be accelerated.
<Characteristic 6>

The ideographic images (that is, the images of the numbers D413) which is configured by combining the multiple element images D413a, D413b, and D413c that show numbers, letters or patterns are included in the meter image D. In addition, the ideographic images are displayed in the steep inclined surface portion 431a of the spherical surface portion 431, and the multiple element images D413a, D413b, and D413c are disposed (specifically, disposed to be aligned on the virtual line K1) being aligned in the direction which intersects with the direction of lowering the steep inclined surface portion 431a. Hereinafter, a technical significance will be described by the configuration.

The display light P emitted from the projector 420 is magnified by the magnifying lens 421, and further, the display light P is magnified by the reflecting mirror 440. Accordingly, the display light Q projected on the screen 430 advances while being magnified. For this reason, as the optical path length from the projector 420 to the screen 430 increases, the level of magnification of the display light Q increases, and the size of the image displayed on the screen 430 increases. For this reason, in contrast to this embodiment, when the multiple element images D413a, D413b, and D413c are disposed to be aligned in the direction (that is, the radial direction) of lowering the steep inclined surface portion 431a, the optical path lengths of each of the element images become different from each other as illustrated with reference numerals Q1, Q2, and Q3 in FIG. 27.

Specifically, when each of element images D413a, D413b, and D413c is disposed on three different virtual lines K1, K2, and K3 (refer to FIG. 27), as approaching the upper side of the steep inclined surface portion 431a, the optical path lengths Q1, Q2, and Q3 become longer. In addition, as the optical path length becomes longer, the element images are magnified and displayed. As a result, the ideographic image (that is, the image of the number D413) is displayed being distorted.

In consideration of this point, in this embodiment, the multiple element images D413a, D413b, and D413c are disposed to be aligned in the circumferential direction of the steep inclined surface portion 431a. In other words, the multiple element images D413a, D413b, and D413c are disposed on the same contour line (virtual line K1). For this reason, since the optical path lengths of the multiple element images D413a, D413b, and D413c can be suppressed not to be different from each other, generation of distortion to the numbers D413 can be suppressed. Accordingly, while forming the spherical surface portion 431 on the screen 430, and visually recognizing the image of the display plate D410 in a three-dimensional manner, readability of the numbers D413 caused by forming the spherical surface portion 431 can be suppressed.

<Characteristic 7>

Furthermore, in this embodiment, the direction in which the multiple element images D413a, D413b, and D413c are aligned is parallel to the rotating direction of the pointer image D411. For this reason, as a result of aligning the multiple element images D413a, D413b, and D413c in the direction which intersects the direction of lowering the steep inclined surface portion 431a, even when the orientation of the ideographic image is inclined when viewed from the viewer M, awkwardness imparted to the viewer M can be mitigated. For example, the number D413 illustrated in FIG. 26 is rotated and inclined by 90 degrees when viewed from the viewer M, but since the rotating direction of the pointer D411 and the orientation of the number D413 match each other, awkwardness imparted to the viewer M can be mitigated, and deterioration of readability of the numbers D413 (ideographic image) can be suppressed.

Tenth Embodiment

When the display plate D410 according to the above-described ninth embodiment is displayed in gradation based on the predetermined point, the predetermined point is set to be the center (that is, the top point 431b) of the rotation of the pointer image D411. In contrast to this, as illustrated in FIG. 29, a display plate D410a of a meter image Da according to this embodiment is positioned being shifted from the center of the rotation of the pointer image D411. In the example of FIG. 29, the predetermined point 431c is positioned at a lower right part on the display plate 410b. In addition, as illustrated with an arrow in a two-dot chain line in FIG. 29, the gradation display is performed so that the luminance gradually deteriorates as being separated from the predetermined point 431c. In addition, the entire display plate D410b is displayed in gradation.

According to this embodiment, the spherical surface portion 431 is lighted by the light from the virtual light source, and the illusion that a shadow to the spherical surface portion 431 is made that is given can be accelerated. For this reason, it is emphasized that the spherical surface portion 431 is swollen to the near side or the far side, and the spherical surface portion 431 can be accelerated to be seen to be inflated in a three-dimensional manner. Accordingly, the three-dimensional effect of the virtual meter which is expressed by the meter image Da can be expressed with reality, and the illusion that the meter really exists that is given to the user can be accelerated.

Eleventh Embodiment

Figure 31:
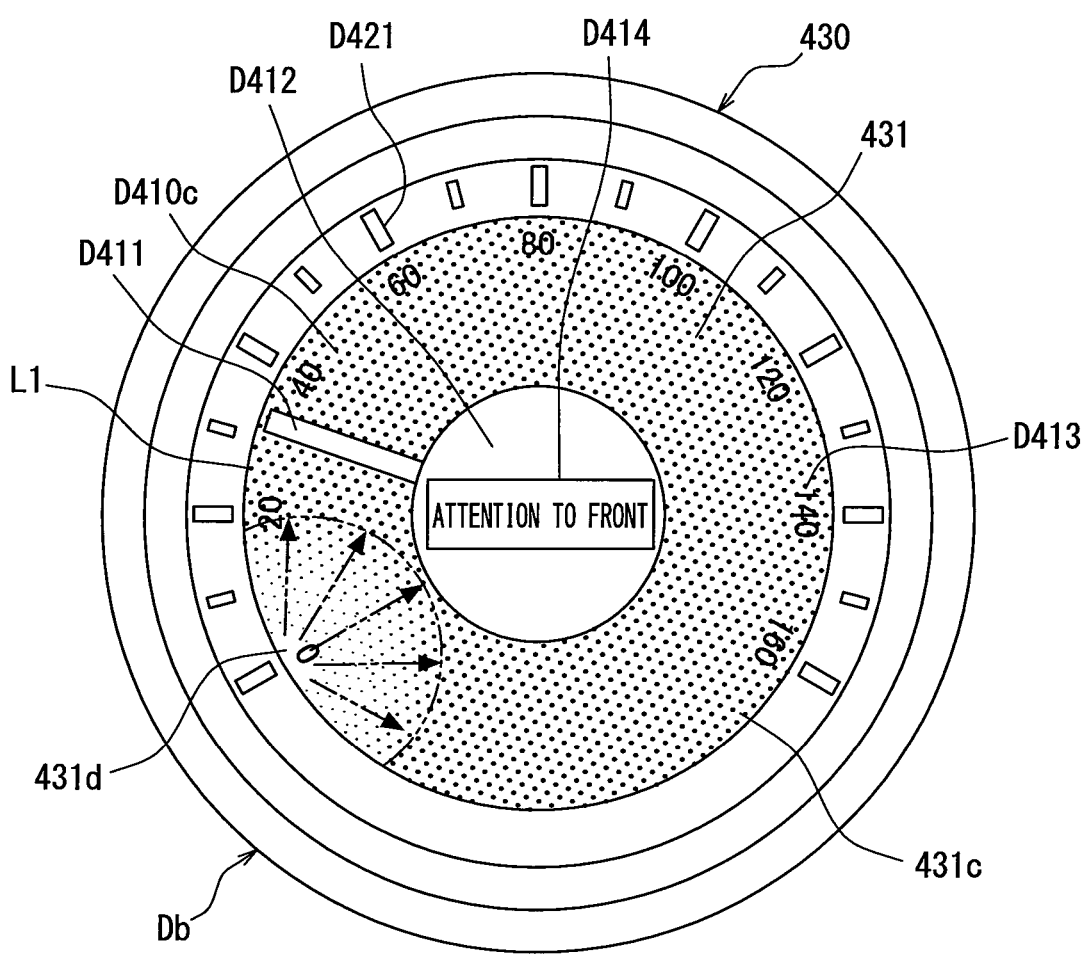
FIG. 31 is a front view illustrating a state where the gradation display of the display plate image changes in the eleventh embodiment of this disclosure.

The gradation display of the image of the display plate D410b according to this embodiment changes so that the predetermined points 431c and 431d move as illustrated in FIGS. 30 and 31. Specifically, the predetermined points 431c and 431d rotate around the center of the rotation of the pointer image D411.

Furthermore, an attention display image D414 (refer to FIG. 31) which calls vehicle driver's attention is included in a meter image Db according to this embodiment, and when the attention display image D414 is displayed, the above-described change is generated. The attention display image D414 is displayed at the center part of the spherical surface portion 431.

For example, when a system which senses that another vehicle or an obstacle, such as a pedestrian, is present in front of the vehicle is mounted in the vehicle, the system determines whether to call the driver's attention by an indication which requires attention to the front based on the sensed result. When it is determined to call attention, the system sends an attention calling command signal to the meter ECU 412. When the attention calling command signal is received, the meter ECU 412 sends a display command signal to the projector 420 to display the attention display image D414. When the display command signal is received, the projector 420 generates and emits the display light of the attention display image D414 by the display light generation device 422, and changes the gradation display of the display plate D410b so that the predetermined points 431c and 431d rotate.

In addition, in the above-described tenth embodiment, the entire display plate D410b is displayed in gradation. In contrast to this, in this embodiment, as illustrated with two-dot chain lines in FIGS. 30 and 31, regarding the predetermined range around the predetermined points 431c and 431d, the display plate D410b is partially displayed in gradation.

Above, according to this embodiment, the gradation display of the background image (that is, the display plate D410b) changes so that the predetermined points 431c and 431d which are starting points of gradation move. For this reason, the illusion that the position of the virtual light source described in the tenth embodiment moves that is given can be accelerated. For this reason, expression of the meter with reality, and the illusion that the meter really exists that is given, can be accelerated.

Furthermore, the attention display image D414 which calls the vehicle driver's attention is included in the meter image Db according to this embodiment, and when the attention display image D414 is displayed, the above-described change is generated in the gradation display of the background image (that is, the display plate D410b). Here, when the gradation display of the background image is changed so that the predetermined points 431c and 431d move, the attention of the user is attracted to the display change. For this reason, according to this embodiment in which the above-described display change is generated when the attention display image D414 which calls the vehicle driver's attention is displayed, calling the vehicle driver's attention can be accelerated.

Modification Example of Ninth to Eleventh Embodiments

The present disclosure is not limited to the description of the above-described embodiments, and modifications may be carried out as follows. In addition, characteristic configurations of each embodiment may be respectively arbitrarily combined.

In the embodiment illustrated in FIG. 27, the spherical surface portion 431 of the screen 430 which displays the pointer D411 has a shape having a constant curvature. In contrast to this, a spherical surface portion which has a shape having a non-constant curvature is employed, and the pointer D411 may be displayed in the spherical surface portion.

In the embodiment illustrated in FIG. 27, the spherical surface portion 431 has a shape swollen to the near side, but may have a shape swollen to the far side.

In the embodiment illustrated in FIGS. 28 to 31, the spherical surface portion 431 is displayed in gradation so that the luminance gradually decreases as being separated from the predetermined point 431c, but reversely, may be displayed in gradation so that the luminance gradually increases.

In the embodiment illustrated in FIGS. 28 to 31, the predetermined points 431b, 431c, and 431d which are starting points of the gradation display are set to be one location, but the gradation display set in multiple locations may be employed.

In the embodiment illustrated in FIGS. 28 to 31, the background images D410, D410a, and D410b of the pointer D411 are displayed in gradation, but the gradation display may be disused, display with the same luminance may be employed, and the luminance may be changed step by step.

In the embodiment illustrated in FIGS. 28 to 31, the spherical surface portion 431 has a round shape when viewed in a front view of the screen 430. In contrast to this, the spherical surface portion 431 may have a shape (for example, a semicircular shape) which is made by cutting a part of the round shape from the outer circumferential side.

In the embodiment illustrated in FIGS. 28 to 31, the pointer D411 and the boss D412 are displayed with the same luminance, but may be displayed in gradation, and may be displayed as the luminance is changed step by step.

In the embodiment illustrated in FIGS. 28 to 31, compared to a case where the scale D421 is displayed in the steep inclined surface portion 431a of the spherical surface portion 431, as the scale D421 is displayed in the flat bottom portion 432, visibility of the scale D421 is improved. In contrast to this, the scale D421 may be displayed in the spherical surface portion 431. In addition, in the embodiment illustrated in FIGS. 28 to 31, the number D413 is displayed in the spherical surface portion 431, but the number D413 may be displayed at a part (for example, the bottom portion 432) other than the spherical surface portion 431.

The element images D413a, D413b, and D413c according to this embodiment are disposed to be aligned in the direction which is orthogonal to the direction of lowering the steep inclined surface portion 431a. However, the alignment direction of the element images according to the present disclosure is not limited to the direction which is orthogonal to the direction of lowering the steep inclined surface portion 431a, and the element images may be aligned in the direction which intersects the direction of lowering the steep inclined surface portion 431a. However, a case where the element images are aligned in the orthogonal direction, is appropriate since the distortion can be suppressed at the maximum.

In the example illustrated in FIG. 26, the ideographic image D413 is a number, and numbers in each digit which configure the number are element images D413a, D413b, and D413c. In contrast to this, the ideographic images may be letters, and each character which configures the letters may be the element image. For example, each character of alphabets which configures the letter "CHARGE" is an element image, and each of the alphabets may be positioned being aligned along the one-dot chain line K1 (that is, the contour line) in FIG. 25. Otherwise, a pattern in which the ideographic image is configured of the multiple element images, for example, a pattern which shows the weather, a pattern which shows an air supply state by the air conditioning apparatus, or a pattern which shows an abnormal state of the vehicle, may be employed. In addition, the ideographic images may be configured by combining the numbers, the letters, and the patterns.

In the embodiment illustrated in FIG. 25, the vehicle display device is configured so that the display light Q is incident on the screen 430 from the side opposite to the viewer M, and the display light Q transmits the screen 430 and is input towards the eyes of the viewer M. In contrast to this, a configuration in which the display light is incident on the screen 430 from the viewer M side, and the display light is reflected by the screen 430 and is input towards the eyes of the viewer M, may be employed.

The vehicle display device according to the above-described ninth to eleventh embodiments can be limited as follows.

(1) The vehicle display device including the projector (420) which emits the display light (P) of the meter images (D, Da, Db) that show the vehicle information, and the screen (430) which displays the meter image as the display light is projected, in which the screen includes the spherical surface portion (431) which forms the spherical surface swollen to the near side or the far side in the direction in which the meter images are visually recognized, the pointer image (D411) which shows the rotating pointer, and the scale image (D421) which shows the scale indicated by the pointer image are included in the meter image, and the pointer image is displayed in the spherical surface portion.

According to the above-described (1), the screen has a spherical surface portion swollen in the visual-recognition direction, and the pointer image is displayed in the spherical surface portion. For this reason, a degree of distortion of the light corresponding to the pointer image in the display light projected to the screen can be accelerated to change in accordance with the rotation position of the pointer image. Accordingly, the pointer image can be easily suppressed not to be displayed in a distorted shape according to the rotation.
(2) The vehicle display device according to the above-described (1) including the controller (422) which controls the luminance of the display light, in which the background images (D410, D410a, D410b, D410c) which are displayed in the spherical portion and show the background of the pointer image are included in the meter image, and the controller controls the display light so that the gradation display which gradually increases or decreases the luminance as the background image is separated from the predetermined points (431b, 431c, 431d) of the spherical surface portion is performed.
(3) The vehicle display device according to the above-described (2), in which the predetermined point (431b) is positioned at the center of the rotation of the pointer image.
(4) The vehicle display device according to above-described (2) or (3) in which the gradation display of the background image changes so that the predetermined point moves.
(5) The vehicle display device according to above-described (4), in which the attention display image (D414) which calls the vehicle driver's attention is included in the image displayed on the screen, and when the attention display image is displayed, the change in the gradation display of the background image is generated.
(6) The vehicle display device according to any one of the above-described (1) to (5), in which the outline image (L1) which shows the outline of the spherical surface portion is displayed at the part positioned in the outer edge of the spherical surface portion on the screen.

Twelfth Embodiment

Figure 32:
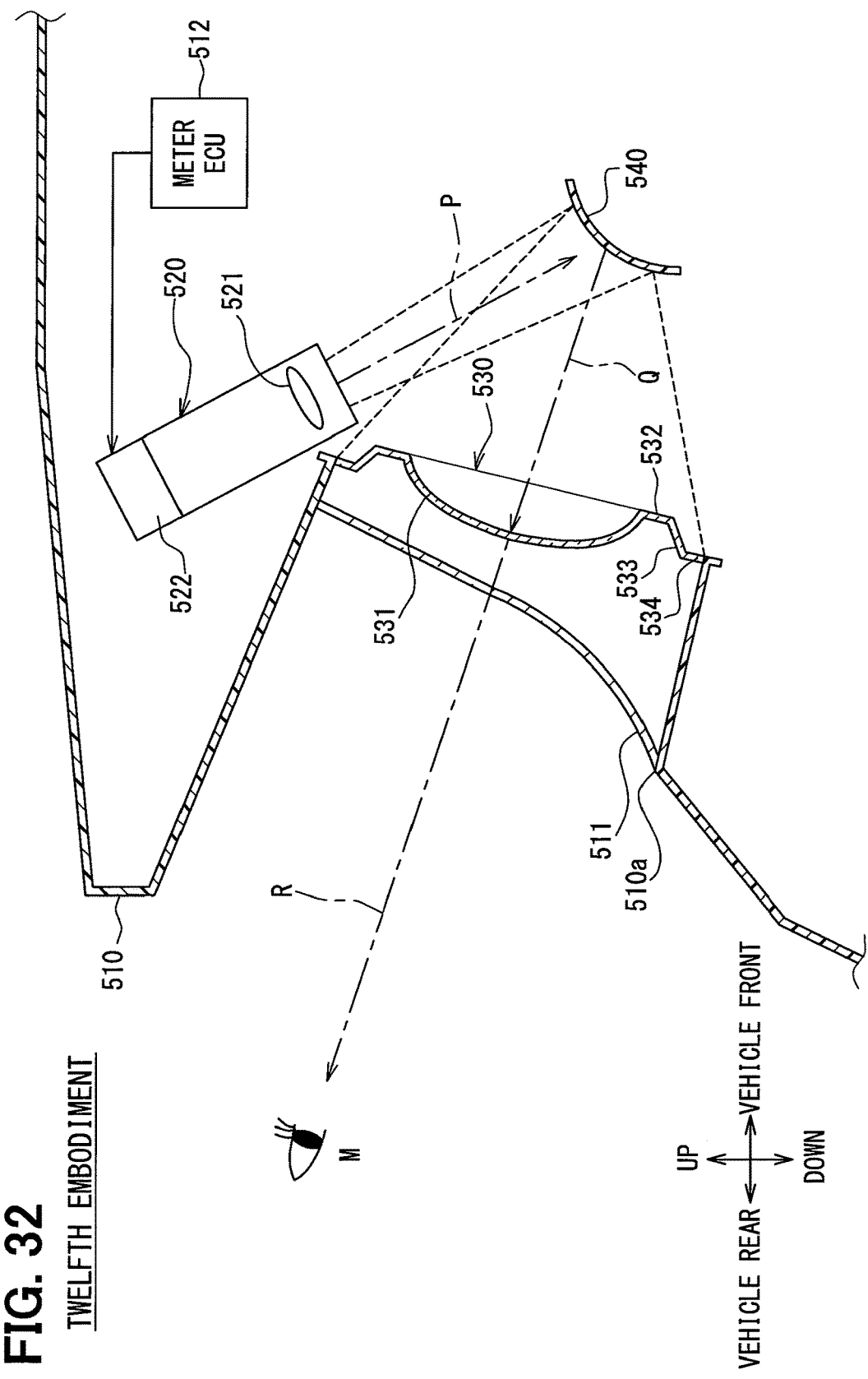
FIG. 32 is a cross-sectional view schematically illustrating the entire configuration of a vehicle display device according to a twelfth embodiment of the present disclosure.

Next, a vehicle display device according to a twelfth embodiment will be described with reference to FIGS. 32 to 36. In addition, an object of the vehicle display device of the twelfth embodiment is to express the three-dimensional effect of the virtual object which is expressed by the image with reality, and to make visual recognition of the virtual object in a three-dimensional manner possible. An instrument panel 510 illustrated in FIG. 32 is disposed below the front windshield inside the vehicle. The vehicle display device which will be described in detail later is installed on the rear side of a translucent cover 511 which is attached to an opening portion 510a of the instrument panel 510. In addition, an arrow illustrating vertical and horizontal directions in FIG. 32 illustrates the vertical and horizontal directions of the vehicle in a state where the vehicle display device is installed on the instrument panel 510.

The vehicle display device is provided with a projector 520, a screen 530, and a reflecting mirror 540, which will be described hereinafter. The projector 520 emits the display light P of the image which shows the vehicle information. Specific examples of the "vehicle information" shown by the above-described image include a vehicle speed, an engine rotation speed, a shift range of an automatic transmission, an amount of remaining fuel, an engine coolant temperature, and various types of warning information.

An electronic control device (hereinafter, will be described as a meter ECU 512) is connected to be able to communicate with other electronic control devices. Other electronic control devices obtain the vehicle information calculated based on various types of sensors by the communication with the meter ECU 512. The meter ECU 512 controls an operation of the projector 520 based on the obtained vehicle information. The contents of the control will be described in detail later.

The projector 520 is provided with a magnifying lens 521, a display light generation device 522, and a light source which is not illustrated, which will be described hereinafter. The display light generation device 522 allows the light of the light source to transmit the liquid crystal panel, and generates the display light which shows a desirable image. Otherwise, the display light generation device 522 allows the light of the light source to transmit a color filter which rotates at high speed, and generates the display light which shows the desired image. After being magnified by the magnifying lens 521, the light of the image generated by the display light generation device 522 is emitted from the projector 520 as the above-described display light P.

The reflecting mirror 540 reflects the display light P emitted from the projector 520 toward the screen 530. In the example of FIG. 32, the reflecting surface of the reflecting mirror 540 has a convex shape, and magnifies and reflects the display light P. The display light Q reflected by the reflecting mirror 540 transmits to the near side from the side (far side) opposite to the viewer M on the screen 530. The display light R which transmits the screen 530 passes through the translucent cover 511, and is input towards the eyes of the user who is the viewer M. In other words, by projecting the display light Q to the screen 530, the image displayed on the screen 530 is visually recognized by the user.

Figure 33:
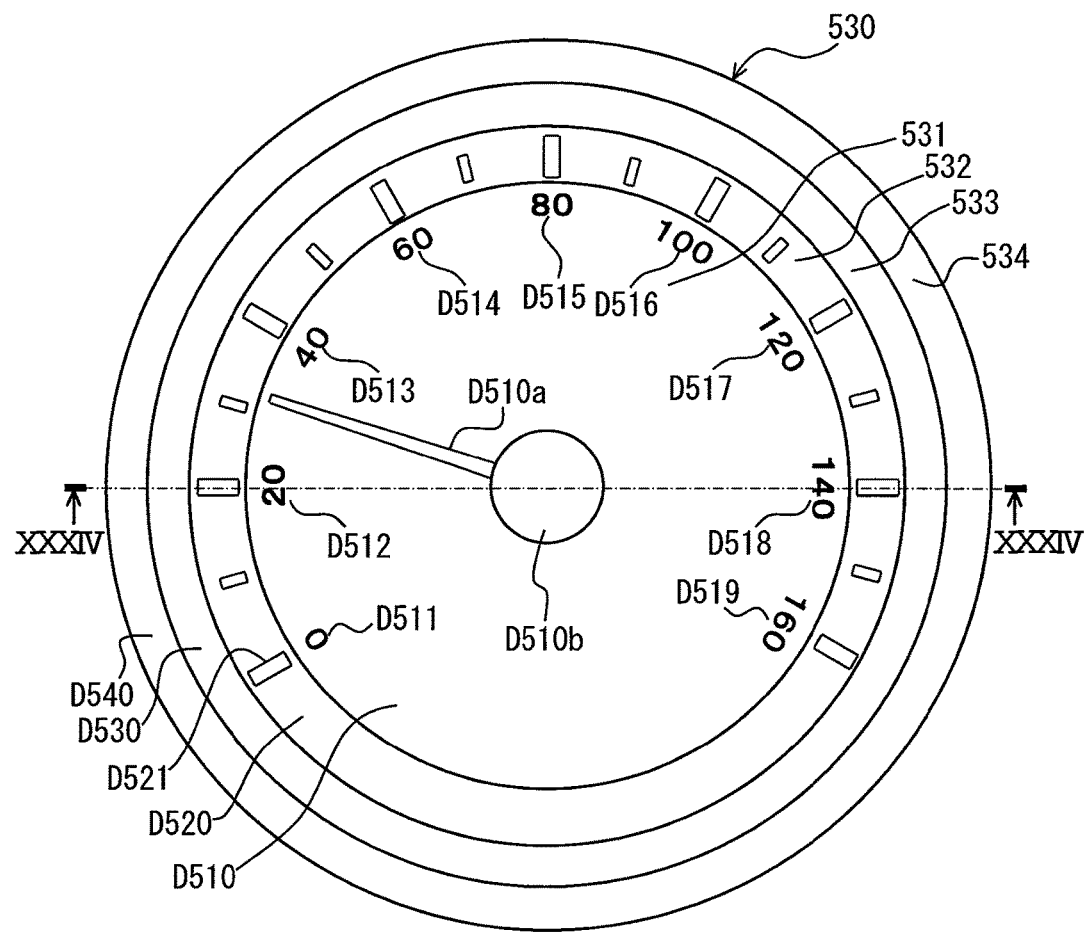
FIG. 33 is front view illustrating one aspect of a meter image displayed on the screen illustrated in FIG. 32.

The screen 530 is a resin-made plate having translucency, and has a shape of a plate having a constant thickness on which a convex portion 531 is formed. As illustrated in FIG. 33, the screen 530 has a round shape when viewed from the viewer M side, and the convex portion 531 is positioned at the center of the circular screen 530. In addition to the convex portion 531, the screen 530 has a shape having a bottom portion 532, an inclined portion 533, and an outer circumferential portion 534, which will be described later. In addition, when viewed from the viewer M side, the convex portion 531 has a round shape, and the bottom portion 532, the inclined portion 533, and the outer circumferential portion 534 have an annular shape. An inner circumference of the bottom portion 532 is linked to an outer circumference of the convex portion 531, an inner circumference of the inclined portion 533 is linked to an outer circumference of the bottom portion 532, and an inner circumference of the outer circumferential portion 534 is linked to an outer circumference of the inclined portion 533.

Figure 34:
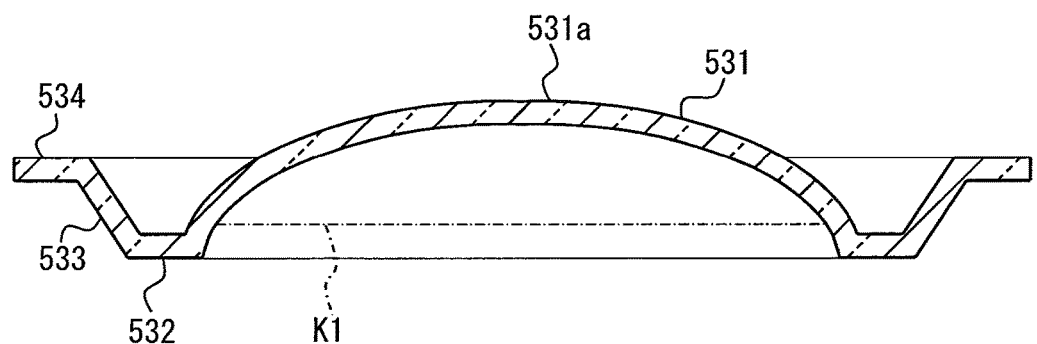
FIG. 34 is a cross-sectional view along line XXXIV-XXXIV of FIG. 33.

As illustrated in FIG. 34, the convex portion 531 has a shape which is swollen to the viewer M side, and a curved shape which becomes a convex part toward the viewer M side, and forms a spherical surface in which a round center portion of the convex portion 531 is a top point 531a. A virtual surface which is in contact with the top point 531a is perpendicular to the visual-recognition direction (vertical direction in FIG. 34). Therefore, as a part is more separated from the top point 531a in the convex portion 531, the inclination angle with respect to the virtual surface becomes larger.

The bottom portion 532 has a circular shape which extends in the radial direction from an outer circumferential end of the convex portion 531, and forms a plate surface which is parallel to the virtual surface. The inclined portion 533 has a circular shape which extends in the radial direction from an outer circumferential end of the bottom portion 532, and forms a flat inclined surface which is gradually swollen to the viewer M side at a constant angle with respect to the virtual surface. The outer circumferential portion 534 has a circular shape which extends in the radial direction from an outer circumferential end of the inclined portion 533, and forms a plate surface which is parallel to the virtual surface. In addition, the top point 531a of the convex portion 531 is positioned closer to the viewer M side than the outer circumferential portion 534, and the inclined portion 533 of the convex portion 531 is positioned closer to the side opposite to the viewer M than the outer circumferential portion 534.

It can be said that the convex portion 531 is swollen to the near side in the visual-recognition direction with respect to the bottom portion 532, and the bottom portion 532 and the inclined portion 533 are swollen to the far side in the visual-recognition direction with respect to the outer circumferential portion 534. Therefore, the convex portion 531, the bottom portion 532, and the inclined portion 533 are called "swollen portions".

As illustrated in FIG. 33, the image displayed on the screen 530 is an image which shows the meter device configured by combining multiple components. The above-described "multiple components" are a display plate D510, a scale plate D520, decoration rings D530 and D540, a pointer D510a, and a boss D510b, which will be described hereinafter. The display plate D510, the scale plate D520, the decoration rings D530 and D540, the pointer D510a, and the boss D510b are not real components, but images (component images).

The display plate D510 is displayed in the convex portion 531 together with numbers D511, D512, D513, D514, D515, D516, D517, D518, and D519. In addition, the pointer D510a and the boss D510b are also displayed in the convex portion 531. The display plate D510 has a shape along an outer shape of the convex portion 531, and the round boss D510b is displayed at the center of the display plate D510. The pointer D510a has a shape which extends in the radial direction of the display plate D510 from the boss D510b, and is displayed by a moving image to rotate on the display plate D510 around the boss D510b. The numbers D511 to D519 are still images showing a vehicle speed. The display plate D510 is a background image which shows the background of the pointer D510a, the boss D510b and the numbers D511 to D519.

The numbers D511 to D519, the pointer D510a, and the boss D510b are displayed in a color different from that of the display plate D510. The display plate D510 is displayed in gradation so that the luminance gradually changes from the top point 531a to the outer circumferential end. Specifically, as approaching the outer circumferential end, the lower luminance is displayed. Accordingly, the three-dimensional shape of the convex portion 531 is emphasized and visually recognized, and the illusion that the display plate D510 really exists that is given to the user can be accelerated.

The scale plate D520 is displayed in the bottom portion 532 together with a scale D521. The scale plate D520 has a circular shape along the inner circumference and the outer circumference of the bottom portion 532. The scale D521 is displayed at a position which corresponds to the numbers D511 to D519. The scale plate D520 is a background image which shows the background of the scale D521. The scale plate D520 has a color different from that of the scale D521, and is displayed with the same luminance as that of the outer circumferential end of the display plate D510. The above-described numbers D511 to D519 and the scale D521 are not real printed objects, but images. In addition, the pointer D510a which is rotated and displayed rotates and indicates the scale D521. Accordingly, the image displayed on the screen 530 shows the vehicle speed which is the vehicle information.

The decoration rings D530 and D540 are displayed in the inclined portion 533 and the outer circumferential portion 534. The decoration ring D530 displayed in the inclined portion 533 is displayed in gradation so that the luminance gradually changes from the inner circumferential end to the outer circumferential end. The decoration ring D540 displayed in the outer circumferential portion 534 is displayed with the same luminance as that of the outer circumferential end of the decoration ring D530.

The meter ECU 512 controls an operation of the projector 520 to start emitting the display light P, by using the operation by the user in a state where the vehicle can travel as a trigger, in a case where an ignition switch is operated to be ON, or the like. However, when various types of the electronic control device are in the middle of executing processing the system check or the like, and the vehicle information, such as an engine coolant temperature or an amount of remaining fuel, cannot be obtained, a message image D550 which shows an indication that the system is in preparation is displayed together with a background image D551.

Figure 35:
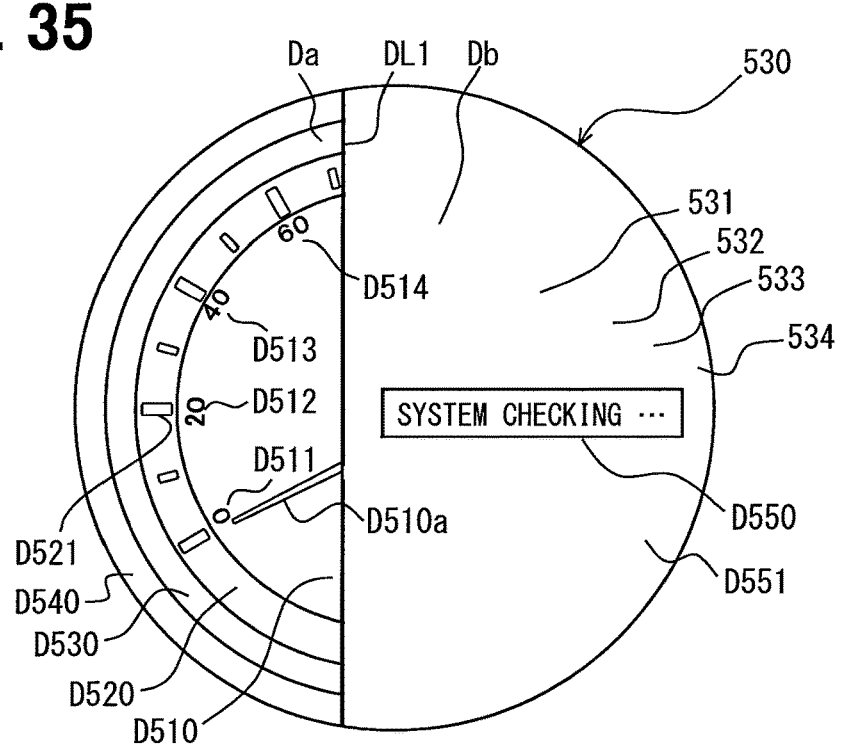
FIG. 35 is a view illustrating a state of image switching when the screen is viewed from the front surface in the twelfth embodiment.

In addition, as the above-described system preparation advances, a line image DL1 appears in an end portion (that is, the outer circumferential portion 534) of the screen 530. After this, while gradually moving the display position of the line image DL1, the image (hereinafter, referred to as the second image Da) which shows the meter device illustrated in FIG. 33 is gradually displayed. For example, as illustrated in FIG. 35, a part of the image (hereinafter referred to as the first image Db) configured of the message image D550 and the background image D551, a part of the second image Da, and the line image DL1 which shows a boundary line between the images Da and Db, are displayed at the same time. In addition, as the system preparation advances, the line image DL1 is moved. Accordingly, the display region of the first image Db is reduced, and the display region of the second image Da expands. At the moment when the system preparation is completed, the display of the first image Db and the line image DL1 is off, and the entire second image Da, that is, the meter device in a display state illustrated in FIG. 33 is displayed.

In short, at the moment when the display is started, the second image Da and the line image DL1 are not displayed, and the first image Db is displayed. The display state is referred to as the "first display mode". After this, in the system preparation period, the first image Db, the second image Da, and the line image DL1 are displayed (refer to FIG. 35). After this, after the system preparation is completed, the first image Db and the line image DL1 are not displayed, and the second image Da is displayed.

In the display mode illustrated in FIG. 35, the message image D550 is displayed in a color different from the background image D551 across all of the convex portion 531, the bottom portion 532, the inclined portion 533, and the outer circumferential portion 534. The background image D551 is displayed in a constant color across all of the convex portion 531, the bottom portion 532, the inclined portion 533, and the outer circumferential portion 534, and is not displayed in gradation similarly to the display plate D510. For this reason, the swollen portion is actually formed on the screen 530, but the background image D551 is visually recognized in a shape of a flat surface which widens perpendicularly to the visual-recognition direction.

The line image DL1 has a shape which extends linearly in a front view of the screen 530 to straddle at least one of a boundary between the convex portion 531 and the bottom portion 532, a boundary between the bottom portion 532 and the inclined portion 533, and a boundary between the inclined portion 533 and the outer circumferential portion 534. In the display mode illustrated in FIG. 35, in a front view of the screen 530, the line image DL1 is a straight line which extends to straddle the entire screen 530, and is disposed across the entire convex portion 531, both ends of the bottom portion 532, both ends of the inclined portion 533, and both ends of the outer circumferential portion 534. The line image DL1 is displayed in a color different from that of the background image D551 and the display plate D510.

Figure 36:
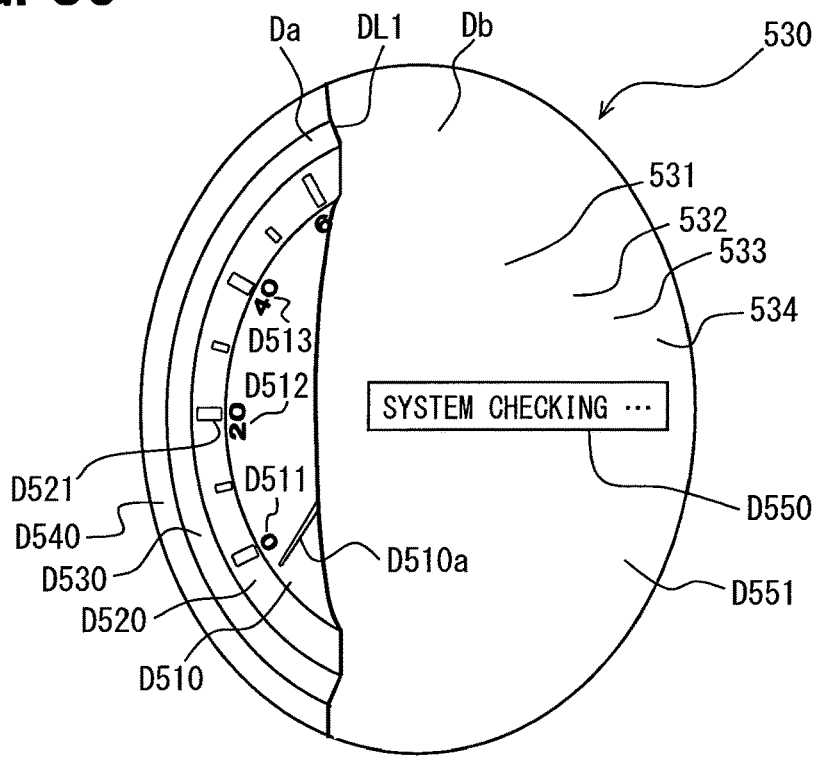
FIG. 36 is a view illustrating a manner of appearing when the image of FIG. 35 is peeked from a right side of the screen.

When the viewer M views the screen 530 in a front view, as described above, the line image DL1 is seen in a straight line. However, when the viewer M peeks the screen 530 from the second image Da side (that is, left side in FIG. 35) or the first image Db side (that is, right side in FIG. 35) with respect to the line image DL1, the line image DL1 is seen in a bent shape. Specifically, the line image DL1 is seen in a bent shape along the convex portion 531, the bottom portion 532, and the inclined portion 533 (that is, swollen portions). For example, when the screen 530 is peeked from the right side, the line image DL1 is seen in a bent shape as illustrated in FIG. 36.

In addition, as the system preparation advances, since the line image DL1 is moved, a position of the line image DL1 which straddles each boundary of the convex portion 531, the bottom portion 532, the inclined portion 533, and the outer circumferential portion 534 changes. Accordingly, the bent shape of the line image DL1 changes as the system preparation advances. In addition, in the first image Db and the second image Da, a line which extends along the boundary, that is, a boundary line between the component images, or a line which accommodates the convex portion 531, the bottom portion 532, the inclined portion 533, and the outer circumferential portion 534 therein exist, but a line which straddles the boundaries is not included.

In short, the vehicle display device of this embodiment described above has characteristics which will be described below. In addition, by each of the characteristics, operation effects which will be described below are achieved.
<Characteristic 1>

According to this embodiment, the screen 530 includes the swollen portion which is swollen in the visual-recognition direction, that is, the convex portion 531, the bottom portion 532, and the inclined portion 533. For this reason, visual recognition of the image which shows the meter device displayed on the screen 530 in a three-dimensional manner can be accelerated. In other words, the illusion that the image of the meter device really exists that is given to the user can be accelerated. For example, since the display plate D510 is displayed in the convex portion 531, the illusion that the display plate D510 is a three-dimensional component which protrudes to the near side that is given to the user can be accelerated.

In addition to this, further in this embodiment, the line image DL1 which extends linearly to straddle the swollen portion is included in the image displayed on the screen 530. For this reason, the line image DL1 is visually recognized in an uneven shape along the swollen portion. However, by the position of the eyes of the viewer M, the line image DL1 is visually recognized in a different shape. For example, as the eyes of the viewer M is shifted from the directly front position of the screen 530, the depth of the unevenness of the line image DL1 is visually recognized to be deep. For this reason, the illusion that the image of the multiple components which configure the meter device is a real object that is given can be accelerated.
<Characteristic 2>

According to this embodiment, the display position of the line image DL1 moves so that the position which straddles the swollen portion changes. For this reason, since the manner of appearing of the uneven shape of the line image DL1 along the swollen portion changes as the display position of the line image DL1 moves, visual recognition of the image in a three-dimensional manner can be further accelerated. In addition, even when the viewer does not perform the operation of peeking the swollen portion slantingly, with respect to the viewer, the line image DL1 moves to the position which is seen in the uneven shape. For this reason, reliability that the image is visually recognized in a three-dimensional manner can be improved.

Thirteenth Embodiment

Figure 37:
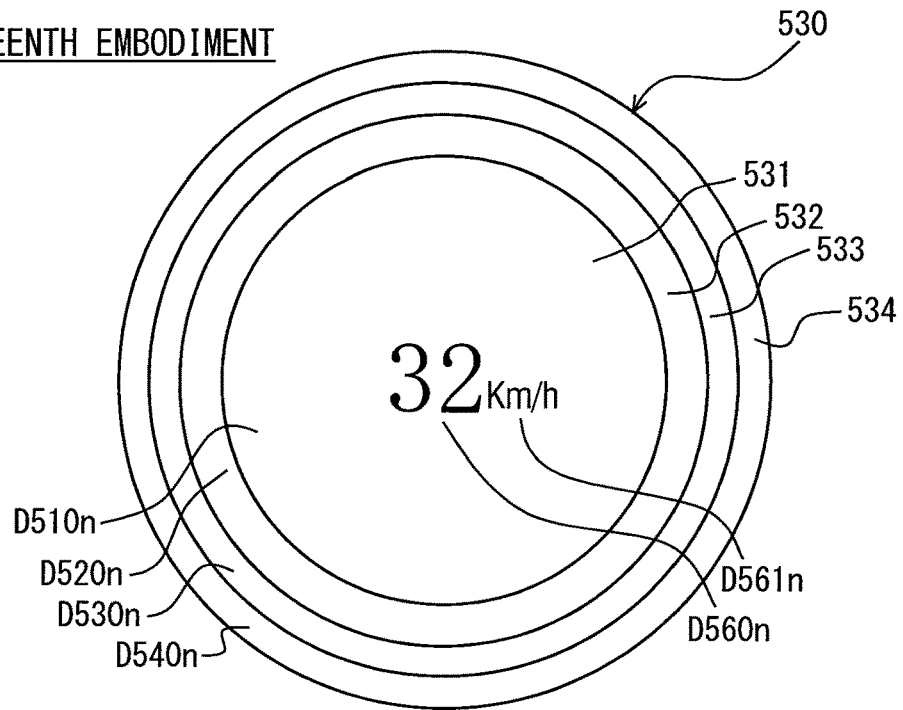
FIG. 37 is a front view illustrating one aspect of a meter image displayed on the screen in a thirteenth embodiment of the present disclosure.

In this embodiment, it is configured that a digital display illustrated in FIG. 37 and an analogue display illustrated in FIG. 33 can be switched from and to each other in accordance with preference of the user. For example, when the user operates the display switching, the meter ECU 512 controls the operation of the projector 520 so that the digital display and the analogue display are switched from and to each other in accordance with the operation.

In the digital display illustrated in FIG. 37, a display plate D510n is displayed in the convex portion 531 together with a number D560n and a letter D61n. The display plate D510n has a round shape along the outer shape of the convex portion 531. The number D560n which shows the vehicle speed is displayed at the center of the display plate D510n. The display plate D510n is a background image which shows the background of the number D560n and the letter D561n. The number D560n and the letter D561n are displayed in a color different from that of the display plate D510n. The display plate D510n is displayed in gradation so that the luminance gradually changes from the top point 531a to the outer circumferential end. Specifically, as approaching the outer circumferential end, the lower luminance is displayed. Accordingly, the three-dimensional shape of the convex portion 531 is emphasized and visually recognized, and the illusion that the display plate D510n really exists that is given to the user can be accelerated.

The digital display illustrated in FIG. 37 corresponds to a first image Dc which is configured of the display plate D510n, the number D560n, and the letter D561n, and the display mode is referred to as the "first display mode". In addition, the analogue display illustrated in FIG. 33 corresponds to the second image Da according to the image of the meter device, and the display mode is referred to as the "second display mode".

Figure 38:
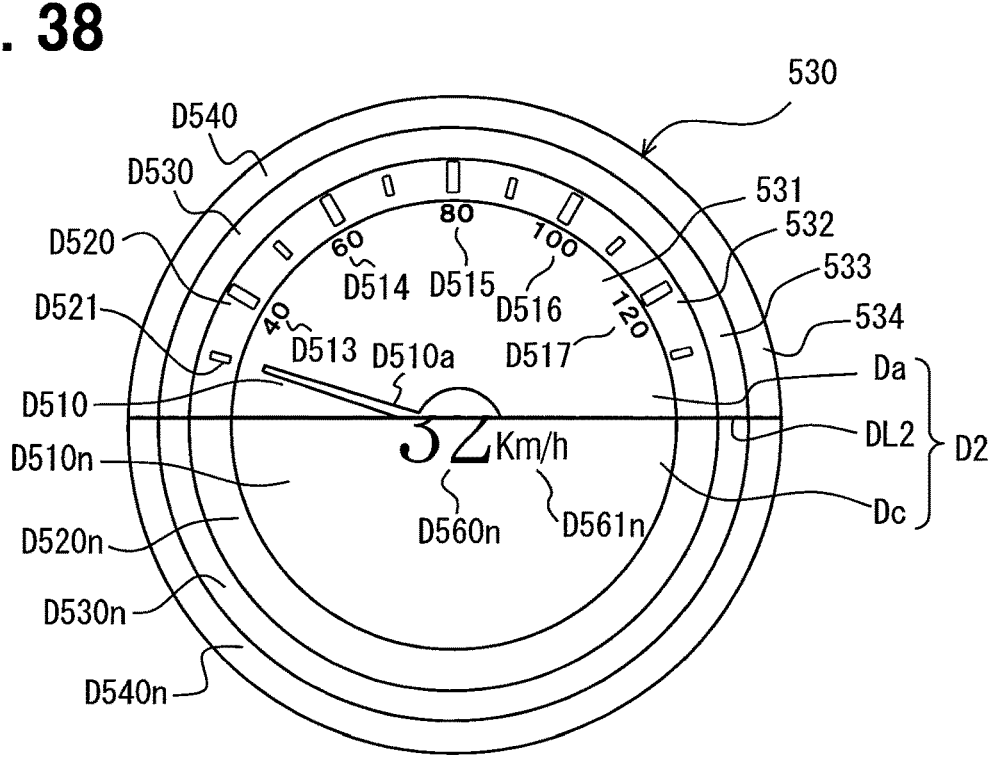
FIG. 38 is a view illustrating a state of image switching when the screen is viewed from the front surface in the thirteenth embodiment of the present disclosure.

In addition, when an operation of switching a state of the first display mode (that is, the digital mode) to the second display mode (that is, the analogue mode) is performed, first, a line image DL2 appears in the end portion (that is, the outer circumferential portion 534) of the screen 530. After this, while the display position of the line image DL2 is gradually moved, as illustrated in FIG. 38, a part of the first image Dc, a part of the second image Da, and the line image DL2 which shows a boundary line between the images Da and Dc are displayed at the same time. In addition, as time passes, the line image DL2 gradually moves. Accordingly, the display region of the first image Dc is reduced, and the display region of the second image Da expands. After this, at the moment when a predetermined time elapses from the moment when the switching operation is performed, the display of the first image Dc and the line image DL2 is off, and the entire second image Da, that is, the meter device of FIG. 33 is displayed. In addition, while the line image DL1 moves in the horizontal direction in the example of FIG. 35, the line image DL2 moves in the vertical direction in the example of FIG. 38.

Reversely, when the operation of switching a state of the second display mode to the first display mode is performed, first, in addition to the second image Da, the first image Dc and the line image DL2 are displayed. In addition, as time passes, the line image DL2 gradually moves, and the display region of the second image Da is reduced, and the display region of the first image Dc expands. After this, at the moment when the predetermined time elapses from the moment when the switching operation is performed, the display of the second image Da and the line image DL2 is off, and the mode is switched to the first display mode in which the entire first image Dc is displayed.

The line image DL2 has a shape which extends in a straight line in a front view of the screen 530 to straddle at least one of the boundaries between the convex portion 531 and the bottom portion 532, the boundary between the bottom portion 532 and the inclined portion 533, and the boundary between the inclined portion 533 and the outer circumferential portion 534. In the display mode illustrated in FIG. 38, in a front view of the screen 530, the line image DL2 is a straight line which extends to straddle the entire screen 530, and is disposed across the entire convex portion 531, both ends of the bottom portion 532, both ends of the inclined portion 533, and both ends of the outer circumferential portion 534. The line image DL2 is displayed in a color different from that of each of the display plates D510 and D510n.

Figure 39:
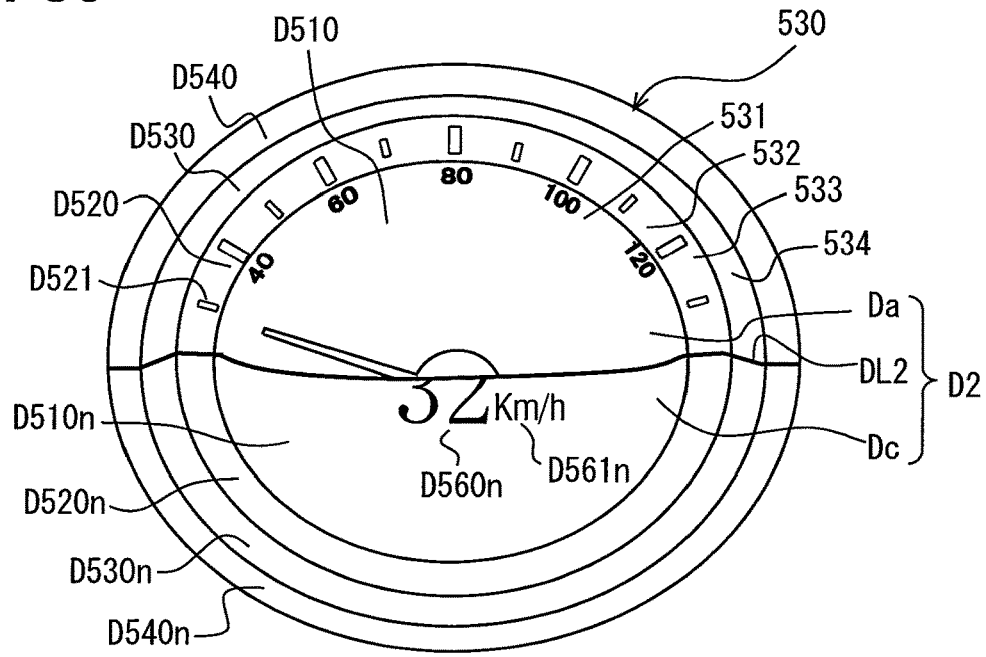
FIG. 39 is a view illustrating a manner of appearing when the image of FIG. 38 is peeked from an upper side of the screen.

When the viewer M views the screen 530 in a front view, as described above, the line image DL2 is seen in a straight line. However, when the viewer M peeks the screen 530 from the second image Da side (that is, upper side in FIG. 38) or the first image Dc side (that is, lower side in FIG. 38) with respect to the line image DL2, the line image DL2 is seen in a bent shape. Specifically, the line image DL1 is seen in a bent shape along the convex portion 531, the bottom portion 532, and the inclined portion 533 (that is, swollen portions). For example, when the screen 530 is peeked from the upper side, the line image DL2 is seen in a bent shape as illustrated in FIG. 39.

In addition, since the line image DL2 is gradually moved, the position of the line image DL2 to straddle the boundary of each of the convex portion 531, the bottom portion 532, the inclined portion 533, and the outer circumferential portion 534 changes. Accordingly, the bent shape of the line image DL2 changes as time passes. In addition, in the second image Da and the first image Dc, a line which extends along the boundary, that is, a boundary line between the component images, or a line which accommodates the convex portion 531, the bottom portion 532, the inclined portion 533, and the outer circumferential portion 534 therein exist, but a line which straddles the boundaries is not included.

Among the lines included in the second image Da, a line which is continuously linked to the line included in the first image Dc exists. Specifically, a boundary line between the display plate D510, the scale plate D520, and the decoration rings D530 and D540 according to the second image Da is continuously linked to the boundary line between the display plate D510n, a scale plate D520n, and decoration rings D530n and D540n according to the first image Dc. More specifically, the above-described boundary line according to the second image Da and the above-described boundary line according to the first image Dc have a linked round shape.

According to this, the visual recognition of the virtual object which is expressed by the second image Da, that is, the meter device illustrated in FIG. 33, and the virtual object which is expressed by the first image Dc, that is, the meter device illustrated in FIG. 33, that are the objects having the same shape and different colors can be accelerated. For this reason, the design (for example, color, figure, and font) other than the shape can gradually change in the virtual object having the same shape.

Furthermore, according to this embodiment, when the first display mode which displays the first image Dc is switched to the second display mode which displays the second image Da, the display is performed as illustrated in FIG. 38. In other words, while displaying a part of the first image Dc and a part of the second image Da so that the line image DL2 becomes the boundary line between the first image Dc and the second image Da at the same time, the display position of the line image DL2 is moved in a predetermined direction, that is, the vertical direction of FIG. 38.

For this reason, for example, when the first display mode is switched to the second display mode, without switching the first image Dc to the second image Da instantly, the switching can be gradually performed in accordance with the movement of the line image DL2.

Fourteenth Embodiment

Figure 40:
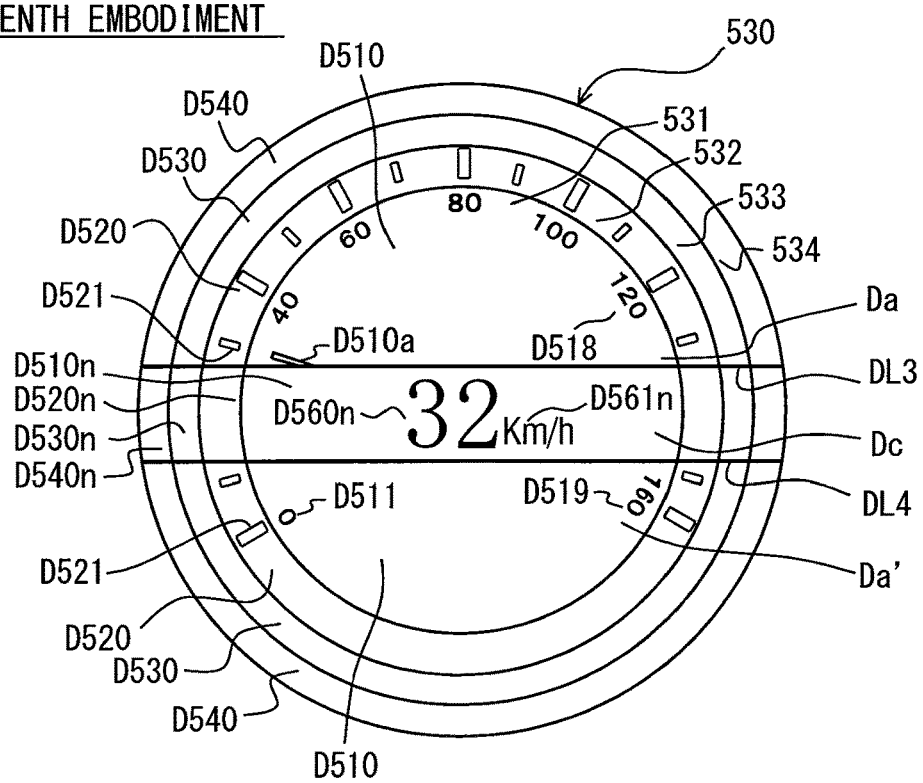
FIG. 40 is a view illustrating a state of image switching when the screen is viewed from a front surface in a fourteenth embodiment of the present disclosure.

In each of the above-described embodiments, in the display which is in the middle of switching between the first display mode and the second display mode, the number of displayed line images DL1 and DL2 is one. In contrast to this, in this embodiment, as illustrated in FIG. 40, in the display which is in the middle of switching between the first display mode and the second display mode, multiple line images DL3 and DL4 are displayed.

Specifically, two line images DL3 and DL4 which are parallel to each other are displayed when switching the display mode. On the screen 530, one of the first image Dc and the second image Da is displayed in an area (hereinafter, referred to as an inner area) which is nipped by the line images DL3 and DL4, and the other one is displayed in an area (hereinafter, referred to as an outer area) at a part except the inner area. In the example of FIG. 40, the second images Da and Da' are displayed in the outer area, and the second images Da and Da' are divided into two images Da and Da' by the line images DL3 and DL4, and the first image Dc. The line images DL3 and DL4 move to be apart from each other after appearing at the center of the screen 530.

For example, when the switching operation of the display mode is performed, the first image Dc appears in the inner area. After this, while the display region of the second image Da expands, the line images DL3 and DL4 move to reduce the display region of the first image Dc.

Above, according to this embodiment, the multiple line images DL3 and DL4 are included in the image displayed on the screen 530. For this reason, since an effect that the line images DL3 and DL4 are visually recognized in an uneven shape along the swell is achieved by the multiple line images DL3 and DL4, an effect that the image is visually recognized in a three-dimensional manner is accelerated.

Modification Example of Twelfth to Fourteenth Embodiments

The present disclosure is not limited to the description of the above-described embodiments, and modifications may be carried out as follows. In addition, characteristic configurations of each embodiment may be respectively arbitrarily combined.

In the above-described fourteenth embodiment, the line images DL3 and DL4 appear at the center of the screen 530, and after this, move to be apart from each other. In other words, after displaying the image of the display mode after switching in the inner area, the line images DL3 and DL4 move and the inner area expands. In contrast to this, the line images DL3 and DL4 appear at the end portion of the screen 530, and after this, may move to be close to each other. In other words, after displaying the image of the display mode after switching in the outer area, the line images DL3 and DL4 move and the outer area expands.

In each of the above-described embodiments, after the line images DL1, DL2, DL3, and DL4 appear, the line images DL1, DL2, DL3, and DL4 are displayed to move. In contrast to this, the moving display of the line images is disused, and a stop display may be employed. According to this, since the line image is visually recognized in the uneven shape along the swollen portion, an effect that the three-dimensional effect of the virtual object expressed by the image is expressed with reality is achieved.

In this embodiment illustrated in FIG. 32, the vehicle display device is configured so that the display light Q is incident on the screen 530 from the side opposite to the viewer M, and the display light Q transmits the screen 530 and is input toward the eyes of the viewer M. In contrast to this, the display light may be incident on the screen 530 from the viewer M side, and the display light may be reflected by the screen 530 and input toward the eyes of the viewer M.

The vehicle display device according to the twelfth to fourteenth embodiments can be limited as follows.

(1) The vehicle display device including the projector (520) which emits the display light (P) of the image that shows the vehicle information, and the screen (530) which displays the image as the display light is projected, in which the screen includes the swollen portions (531, 532, 533) which have a shape swollen to the near side or the far side in the direction in which the image is visually recognized, and the line images (DL1, DL2, DL3, DL4) which extend linearly to straddle the swollen portions are included in the image displayed on the screen.

According to the above-described (1), since the line images extend linearly to straddle the swollen portions, when the screen is viewed in a front view, and when the screen is peeked slantingly, the manner of appearing of the line images changes. For example, even in a case where the line image is visually recognized in a straight line when the screen is viewed in a front view, and the line image is visually recognized in an uneven shape along the swollen portion when the screen is peeked slantingly. For this reason, since the uneven shape of the swollen portion is likely to be recognized, visual recognition of the image displayed on the screen in a three-dimensional manner can be accelerated.

(2) The vehicle display device according to the above-described (1), in which the display position of the line image moves so that the position to straddle the swollen portion changes.

(3) The vehicle display device according to the above-described (2), in which, when the first display mode which displays the first image (Da) showing the vehicle information to the second display mode which displays the second images (Da, Db, Dc) showing the vehicle information, while displaying a part of the first image and a part of the second image are displayed at the same time so that the line image becomes the boundary line of the first image and the second image, the display position of the line image is moved in the predetermined direction.

(4) The vehicle display device according to the above-described (3), in which the line included in the first image and the line included in the second image are continuously linked to each other.

(5) The vehicle display device according to any one of the above-described (1) to (4), in which the multiple line images (DL3, DL4) are included in the image displayed on the screen.

Fifteenth Embodiment

Next, a vehicle display device according to the fifteenth embodiment will be described with reference to FIGS. 41 to 44.

Meanwhile, in JP 2007-326419 A, a display device including a projector which emits display light of an image showing vehicle information, such as a vehicle speed, and a screen to which the emitted display light is projected, and which displays the image, is disclosed. In addition, a swollen portion having a shape swollen to a near side or a far side in a direction in which the image is visually recognized is formed on the screen, and accordingly, the image is visually recognized in a three-dimensional manner.

A pointer image which shows a pointer, a background image which shows the background of the pointer image, and ideographic images which show numbers, letters, or patterns, are included in the image which shows the vehicle information. In addition, distortion is generated to the image displayed in the swollen portion of the screen, but the distortion is different from distortion generated in the background image, and there is a concern that readability remarkably deteriorates only by slight distortion in a case of the ideographic images.

Here, it is assumed that the reason why the distortion is generated to the ideographic images displayed in the swollen portion formed on the screen are as follows. In other words, since the display light advances while expanding, as the optical path length from the projector to the screen becomes longer, a degree of magnification of the display light increases, and the image displayed on the screen increases. For this reason, when the optical path length varies in accordance with the part in the ideographic images, a part where the optical path length in the ideographic image is long is displayed to be large, and a part where the optical path length is short is displayed to be small. As a result, the distortion is generated to the ideographic images.

Figure 45:
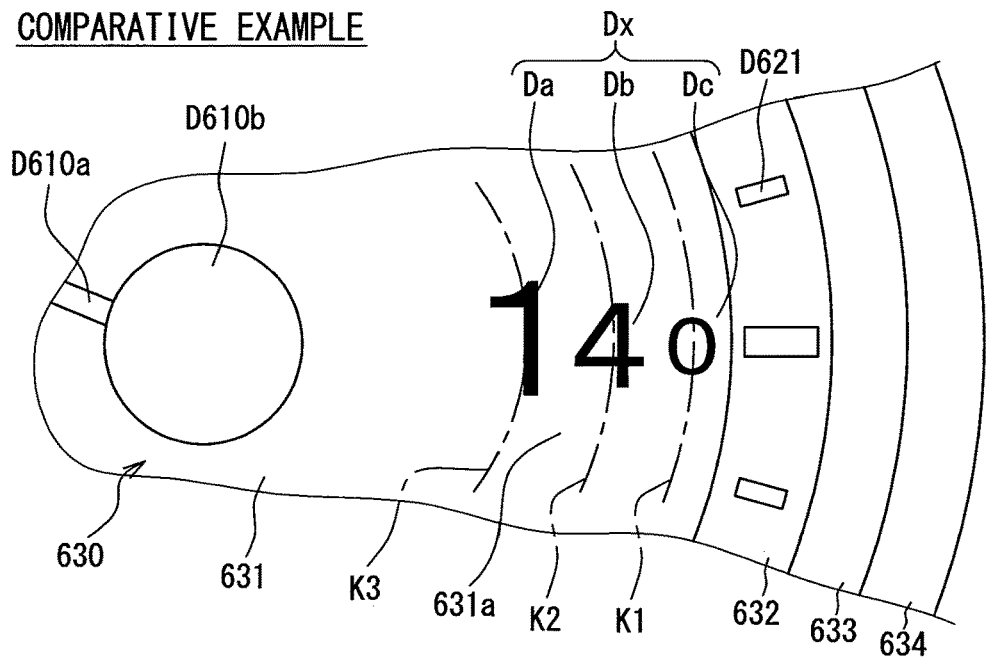
FIG. 45 is a display device according to a comparative example.

For example, as illustrated in a comparative example in FIG. 45, regarding a case where each of three element images Da, Db, and Dc are "1", "4", and "0", and an image (ideographic image Dx) of number "140" is configured by combining the element images, the above-described distortion will be described. In the example of FIG. 45, the ideographic image Dx is displayed on an inclined surface 631a of a screen 630, the optical path length of the element image "1" is longer than that of the element image "4", and the optical path length of the element image "0" is shorter than that of the element image "4". Then, "1" is displayed to be larger than "4", and "0" is displayed to be smaller than "4". As a result, "140" is displayed being distorted as illustrated in FIG. 45.

Here, an object of the vehicle display device according to the fifteenth embodiment is to suppress deterioration of readability of the ideographic images caused by forming the swollen portion while forming the swollen portion on the screen and visually recognizing the image in a three-dimensional manner.

Figure 41:
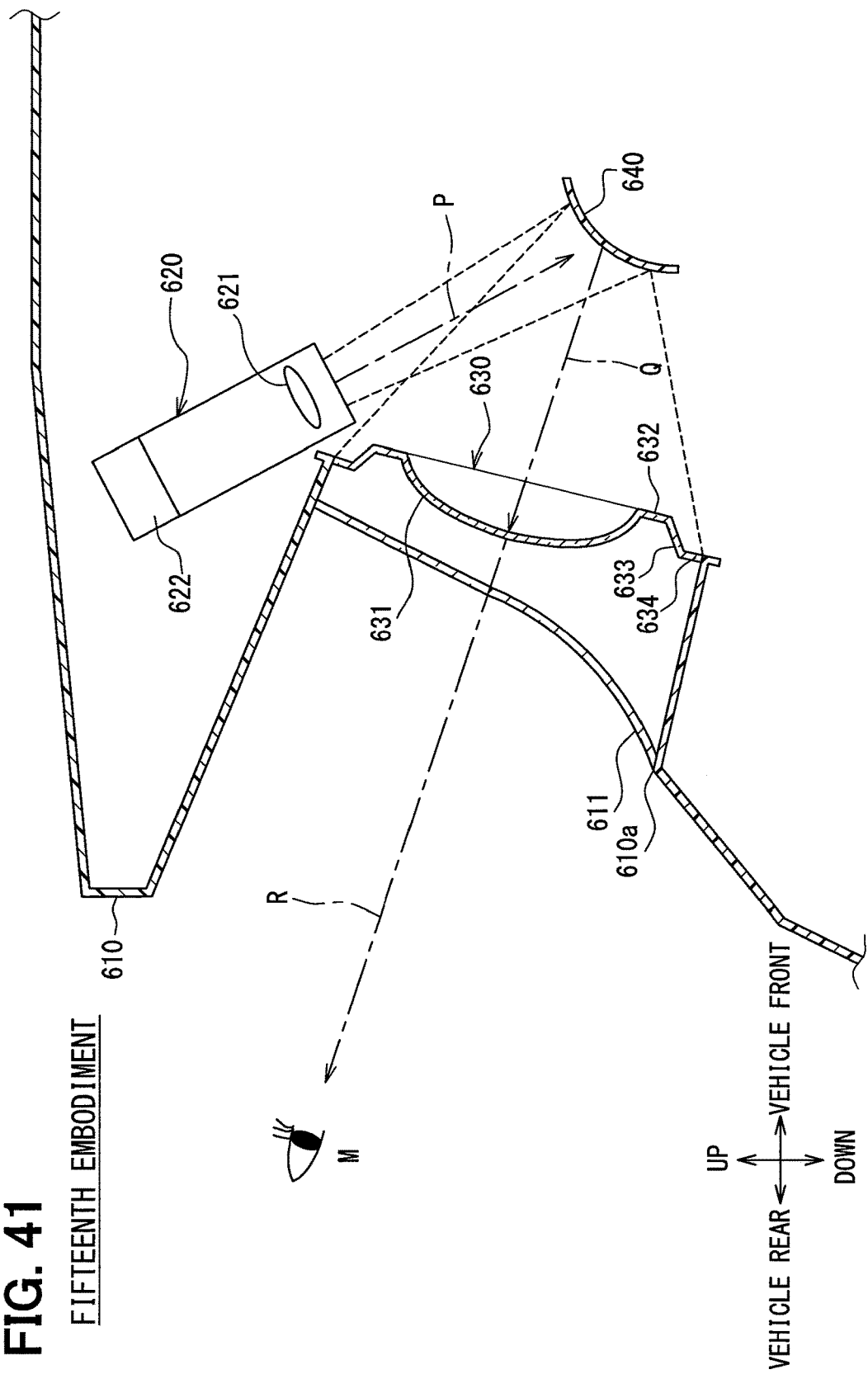
FIG. 41 is a cross-sectional view schematically illustrating the entire configuration of a vehicle display device according to a fifteenth embodiment of the present disclosure.

An instrument panel 610 illustrated in FIG. 41 is disposed below the front windshield inside the vehicle. The vehicle display device which will be described in detail later is installed on the rear side of a translucent cover 611 which is attached to an opening portion 610a of the instrument panel 610. In addition, an arrow illustrating vertical and horizontal directions in FIG. 41 illustrates the vertical and horizontal directions of the vehicle in a state where the vehicle display device is installed on the instrument panel 610.

The vehicle display device is provided with a projector 620, a screen 630, and a reflecting mirror 640, which will be described hereinafter. The projector 620 emits the display light P of the image which shows the vehicle information. Specific examples of the "vehicle information" shown by the above-described image include a vehicle speed, an engine rotation speed, a shift range of an automatic transmission, an amount of remaining fuel, an engine coolant temperature, and various types of warning information.

The projector 620 is provided with a magnifying lens 621, a display light generation device 622, and a light source which is not illustrated, which will be described hereinafter. The display light generation device 622 allows the light of the light source transmit the liquid crystal panel, and generates the display light which shows a desirable image. Otherwise, the display light generation device 122 allows the light of the light source to transmit a color filter which rotates at high speed, and generates the display light which shows the desired image. After being magnified by the magnifying lens 621, the light of the image generated by the display light generation device 622 is emitted from the projector 620 as the above-described display light P.

The reflecting mirror 640 reflects the display light P emitted from the projector 620 toward the screen 630. In the example of FIG. 41, the reflecting surface of the reflecting mirror 640 has a convex shape, and magnifies and reflects the display light P. The display light Q reflected by the reflecting mirror 640 transmits to the near side from the side (far side) opposite to the viewer M on the screen 630. The display light R which transmits the screen 630 passes through the translucent cover 611, and is input toward the eyes of the user who is the viewer M. In other words, by projecting the display light Q to the screen 630, the image displayed on the screen 630 is visually recognized by the user.

Figure 42:
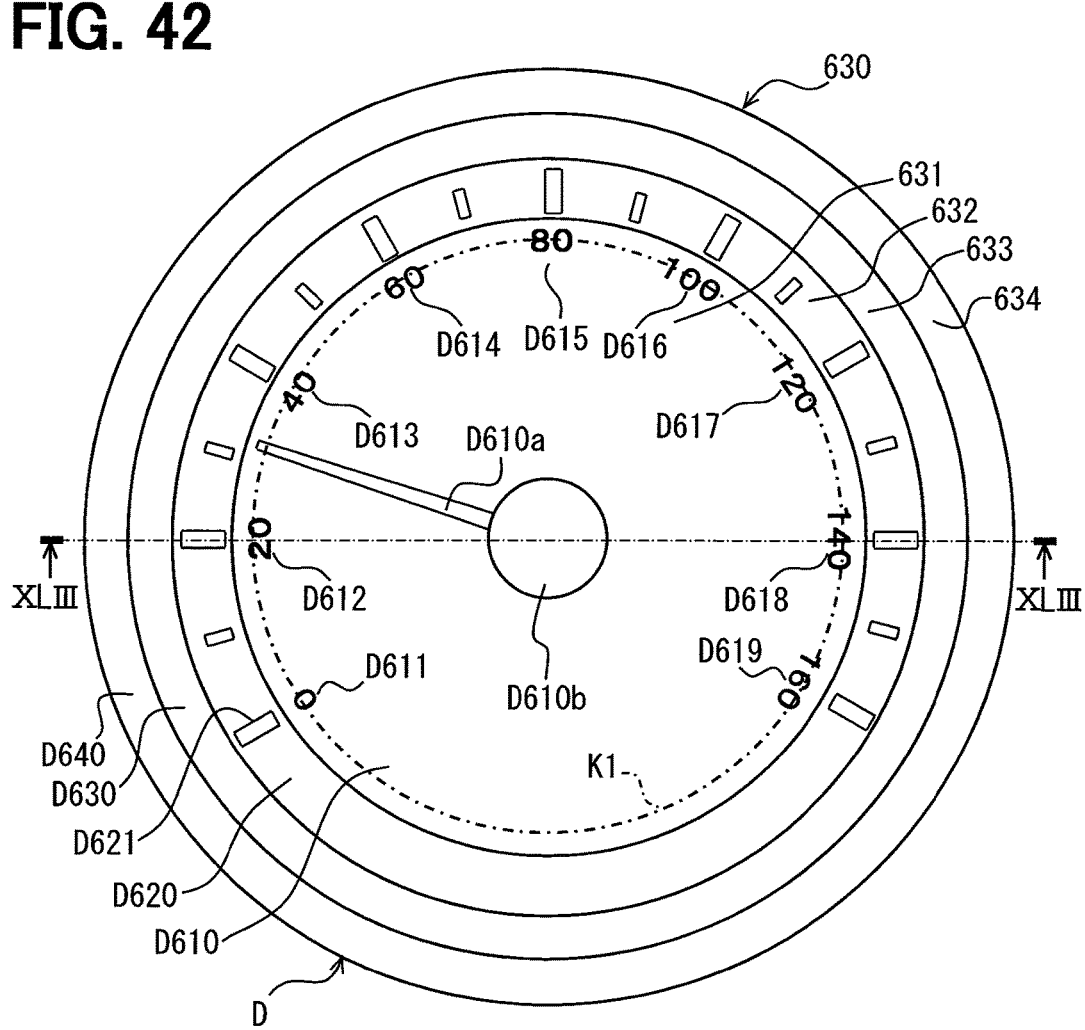
FIG. 42 is a front view illustrating one aspect of the meter image displayed on the screen illustrated in FIG. 41.

The screen 630 is a resin-made plate having translucency, and has a shape of a plate having a constant thickness on which a swollen portion 631 is formed. As illustrated in FIG. 42, the screen 630 has a round shape when viewed from the viewer M side, and the swollen portion 631 is positioned at the center of the circular screen 630. In addition to the swollen portion 631, the screen 630 has a shape having a bottom portion 632, an inclined portion 633, and an outer circumferential portion 634, which will be described hereinafter. In addition, when viewed from the viewer M side, the swollen portion 631 has a round shape, and the bottom portion 632, the inclined portion 633, and the outer circumferential portion 634 have an annular shape. An inner circumference of the bottom portion 632 is linked to an outer circumference of the swollen portion 631, an inner circumference of the inclined portion 633 is linked to an outer circumference of the bottom portion 632, and an inner circumference of the inclined portion 634 is linked to an outer circumference of the outer circumferential portion 633.

Figure 43:
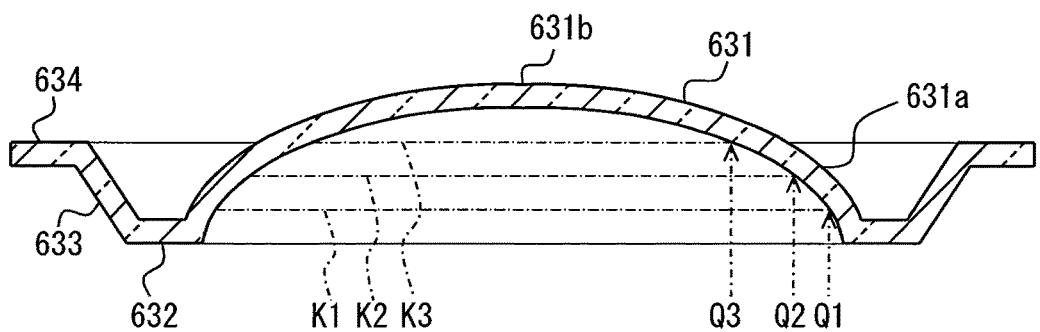
FIG. 43 is a cross-sectional view along line XLIII-XLIII of FIG. 42.

As illustrated in FIG. 43, the swollen portion 631 has a shape which is swollen to the viewer M side, and a curved shape which becomes a convex part toward the viewer M side, and forms a spherical surface which has a top point 631b of the swollen portion 631 as a top point. A virtual surface which is in contact with the top point 631b is perpendicular to the visual-recognition direction (vertical direction in FIG. 43). Therefore, as a part is more separated from the top point 631b in the swollen portion 631, the inclination angle with respect to the virtual surface becomes larger. A part of the swollen portion 631 where the inclination angle is equal to or greater than a predetermined angle (for example, 45 degrees) is referred to as the inclined surface.

The bottom portion 632 has a circular shape which extends in the radial direction from an outer circumferential end of the swollen portion 631, and forms a plate surface which is parallel to the virtual surface. The inclined portion 633 has a circular shape which extends in the radial direction from an outer circumferential end of the bottom portion 632, and forms a flat inclined surface which is gradually swollen to the viewer M side at a constant angle with respect to the virtual surface. The outer circumferential portion 634 has a circular shape which extends in the radial direction from an outer circumferential end of the inclined portion 633, and forms a plate surface which is parallel to the virtual surface. In addition, the top point 631b of the swollen portion 631 is positioned closer to the viewer M side than the outer circumferential portion 634, and the inclined surface 631a of the swollen portion 631 is positioned closer to the side opposite to the viewer M than the outer circumferential portion 634.

As illustrated in FIG. 42, the image displayed on the screen 630 is an image (meter image D) which shows the meter device configured by combining multiple components. The above-described "multiple components" are a display plate D610, a scale plate D620, decoration rings D630 and D640, a pointer D610a, and a boss D610b, which will be described hereinafter. The display plate D610, the scale plate D620, the decoration rings D630 and D640, the pointer D610a, and the boss D610b are not real components, but images (component images).

The display plate D610 is displayed in the swollen portion 631 together with numbers D611, D612, D613, D614, D615, D616, D617, D618, and D619. In addition, the pointer D610a and the boss D610b are also displayed in the swollen portion 631. The display plate D610 has a round shape along an outer shape of the swollen portion 631, and the round boss D610b is displayed at the center of the display plate D610. The pointer D610a has a shape which extends in the radial direction of the display plate D610 from the boss D610b, and is displayed by a moving image to rotate on the display plate D610 around the boss D610b. The numbers D611 to D619 are still images showing a vehicle speed displayed in the inclined surface 631a.

The numbers D611 to D619, the pointer D610a, and the boss D610b are displayed in a color different from that of the display plate D610. The display plate D610 is displayed in gradation so that the luminance gradually changes from the top point 631b to the outer circumferential end. Specifically, as approaching the outer circumferential end, the lower luminance is displayed. Accordingly, the three-dimensional shape of the swollen portion 631 is emphasized and visually recognized, and the illusion that the display plate D610 really exists that is given to the user can be accelerated.

Figure 44:
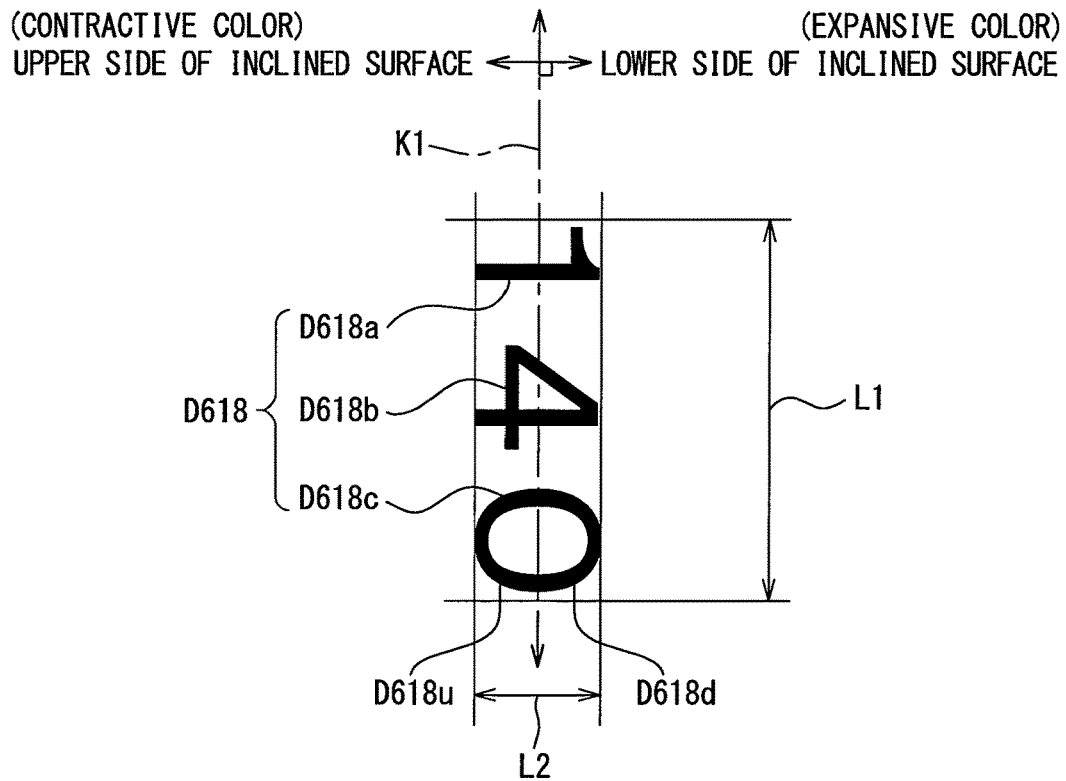
FIG. 44 is an enlarged view of an ideographic image illustrated in FIG. 42.

While the display plate D610 is a background image which shows the background of the pointer D610a, the numbers D611 to D619 are ideographic images having a certain meaning. The number D611 is a one-digit number, the numbers D612 to D615 are two-digit number, and the numbers D616 to D619 are three-digit number. In addition, it can be said that the numbers D612 to D619 which are two- or more digits are ideographic images which are configured by combining multiple element images D618a, D618b, and D618c (refer to FIG. 44). For example, the three-digit number D618 illustrated in FIG. 44 shows "140", but the element image D618a which shows "1", the element image D618b which shows "4", and the element image D618c which shows "0" are configured to be aligned in order.

Multiple element images D618a, D618b, and D618c are disposed to be aligned in the direction which intersects the direction of lowering the inclined surface 631a. The lowering direction is a direction which extends in the radial direction from the top point 631b of the swollen portion 631, and hereinafter, is called the radial direction of the swollen portion 631. The one-dot chain line K1 in FIG. 42 is a virtual line which extends perpendicularly to the radial direction at a part where the numbers D611 to D619 are displayed on the inclined surface 631a. The virtual line K1 has a round shape around the top point 631b, and it can be said that a swelling height of the swollen portion 631 is the same virtual contour line.

In short, the multiple element images D618a, D618b, and D618c are disposed to be aligned on the virtual line K1 which is a concentric circle with respect to the swollen portion 631. Therefore, it can be said that the direction in which the multiple element images D618a, D618b, and D618c are aligned is parallel to the circumferential direction of the rotation of the pointer 610a. In addition, a horizontal dimension L1 which is the length in the direction in which the multiple element images D618a, D618b, and D618c among the numbers D612 to D619 which are two- or more digits are aligned is longer than a vertical dimension L2 which is the length of the perpendicular direction.

The numbers D611 to D619 are displayed in a color different from that of the display plate D610 which is the background image as described above, but in the radial direction of the swollen portion 631, that is, the direction of lowering the inclined surface, the brightness or the color in the element images D618a, D618b, and D618c varies. For example, in the element image D618c which shows "0", an upper portion D618u which is positioned at a part on the center side in the radial direction, that is, on an upper side of the inclined surface, and a lower portion D618d which is positioned at a part on the upper side of the inclined surface are displayed in different brightness or color. Specifically, the lower portion D618d of the element images D618c is displayed in a color or brightness having a higher degree of expansion, or in a color or brightness having a lower degree of contraction compared to the upper portion D618u. In addition, the element image D618c is displayed in gradation toward the upper side from the lower side of the inclined surface so that the degree of expansion gradually decreases, or the degree of contraction gradually increases.

Here, an expansive color and a contractive color will be described hereinafter. A warm color, such as red, orange, or yellow, is seen to be larger than a real size. A cold color, such as blue or blue-green, is seen to be smaller than a real size. The size receives the influence not only from the hue, but also from the brightness, and the color having high brightness, such as pink, among the red-based colors, is seen to be much larger as the expansive color. Reversely, in a case of the contractive color, a color having low brightness among the cold colors, for example, a color having low brightness, such as dark blue, among the blue-based colors, is seen to be much smaller as the contractive color. In addition, a black color which does not have brightness is also a contractive color.

Returning to the description of FIG. 42, the scale plate D620 is displayed in the bottom portion 632 together with a scale D621. The scale plate D620 has a circular shape along the inner circumference and the outer circumference of the bottom portion 632. The scale D621 is displayed at a position which corresponds to the numbers D611 to D619. The scale plate D620 is a background image which shows the background of the scale D621. The scale plate D620 has a color different from that of the scale D621, and is displayed with the same luminance as that of the outer circumferential end of the display plate D610. The above-described numbers D611 to D619 and the scale D621 are not real printed objects, but images. In addition, the pointer D610a which is rotated and displayed rotates and indicates the scale D621. Accordingly, the meter image D shows the vehicle speed which is the vehicle information.

The decoration rings D630 and D640 are displayed in the inclined portion 633 and the outer circumferential portion 634. The decoration ring D630 displayed in the inclined portion 633 is displayed in gradation so that the luminance gradually changes from the inner circumferential end to the outer circumferential end. The decoration ring D640 displayed in the outer circumferential portion 634 is displayed with the same luminance as that of the outer circumferential end of the decoration ring D630.

Next, a technical significance that the element images D618a, D618b, and D618c are disposed to be aligned on the virtual line K1 as described above will be described.

The display light P emitted from the projector 620 is magnified by the magnifying lens 621, and further, the display light P is magnified by the reflecting mirror 640. Accordingly, the display light Q which is projected to the screen 630 advances while being magnified. For this reason, as the optical path length from the projector 620 to the screen 630 increases, a degree of magnification of the display light Q increases, and the size of the image displayed on the screen 630 increases. For this reason, as illustrated in FIG. 45, in contrast to this embodiment, when three element images Da, Db, and Dc are disposed to be aligned in the lowering direction (that is, the radial direction) of the inclined surface 631a, the optical path lengths of each of the element images Da, Db, and Dc become different from each other as illustrated with Q1, Q2, and Q3 in FIG. 43.

Specifically, when each of element images Da, Db, and Dc is disposed on three different virtual lines K1, K2, and K3 (refer to FIGS. 43 and 45), as approaching the upper side of the inclined surface 631a, the optical path lengths Q1, Q2, and Q3 become longer. Accordingly, the element image Da which shows "1" is displayed being more expanded than the element image Dc which shows "0". As a result, the ideographic image Dx which shows "140" as illustrated in FIG. 45 is displayed being distorted.

In consideration of this point, according to this embodiment, the multiple element images D618a, D618b, and D618c are disposed to be aligned in the circumferential direction of the inclined surface 631a. In other words, the multiple element images D618a, D618b, and D618c are disposed on the same contour line (virtual line K1). For this reason, since the optical path lengths of the multiple element images D618a, D618b, and D618c can be suppressed not to be different from each other, generation of distortion to the numbers D612 to D619 can be suppressed. Accordingly, while forming the swollen portion 631 on the screen 630, and visually recognizing the image of the display plate D610 in a three-dimensional manner, deterioration of readability of the numbers D612 to D619 caused by forming the swollen portion 631 can be suppressed.

Furthermore, in this embodiment, the pointer image D610a which shows the pointer that rotates in accordance with the vehicle information, and the scale image D621 which is indicated by the pointer image and shows the scale, are included in the meter image D displayed on the screen 630. In addition, the direction in which the multiple element images D618a, D618b, and D618c are aligned is parallel to the rotating direction of the pointer D610a.

For this reason, as a result of aligning the multiple element images D618a, D618b, and D618c in the direction which intersects the direction of lowering the inclined surface 631a, even when the orientation of the ideographic image is inclined when viewed from the viewer M, awkwardness imparted to the viewer M can be mitigated. For example, the number D618 illustrated in FIG. 42 is rotated and inclined by 90 degrees when viewed from the viewer M, but since the rotating direction of the pointer D610a and the orientation of the number D618 match each other, awkwardness imparted to the viewer M can be mitigated, and deterioration of readability of the number D618 (ideographic image) can be suppressed.

Furthermore, in this embodiment, the length in the direction in which the multiple element images are aligned in the ideographic image (for example, the horizontal dimension L1 of the numbers D612 to D619) is longer than the length (for example, the vertical dimension L2 of the numbers D612 to D619) in the direction which is perpendicular to the direction in which the multiple element images are aligned. For this reason, when the element images D618a, D618b, and D618c are aligned in the direction of lowering the inclined surface 631a as illustrated in the example of FIG. 45, a difference in the optical path lengths Q1, Q2, and Q3 in each of element images D618a, D618b, and D618c increases, and the distortion of the ideographic image Dx becomes remarkable. Accordingly, according to this embodiment in which the element images D618a, D618b, and D618c are aligned along the virtual line K1 when the horizontal dimension L1 is longer than the vertical dimension L2 in this manner, an effect of suppressing the distortion of the ideographic image is effectively achieved.

Furthermore, in this embodiment, the display color or the brightness in the element image varies in the direction of lowering the inclined surface 631a. For example, the upper portion D618u which is positioned at a part on the upper side of the inclined surface in the element image D618c, and the lower portion D618d which is positioned at the part on the upper side of the inclined surface, are displayed in different colors or brightness.

Even in one element image, since the optical path length varies at parts on the upper side of the inclined surface and on the lower side of the inclined surface in the direction of lowering the inclined surface 631a, the displayed size slightly varies. For example, strictly speaking, the optical path length of the upper portion D618u of the element image D618c is longer than that of the lower portion D618d. In consideration of this point, in this embodiment, the display color or the brightness in the element image D618c varies in the direction of lowering the inclined surface 631a. For this reason, by using the contractive color for the part (for example, the upper portion D618u) which is displayed to be large due to the swell, and by using the expansive color for the part (for example, the lower portion D618d) which is displayed to be small due to the swell, the distortion of the image generated in the element image D618c is not remarkable.

Modification Example of Fifteenth Embodiment

The present disclosure is not limited to the description of the above-described embodiments, and modifications may be carried out as follows. In addition, characteristic configurations of each embodiment may be respectively arbitrarily combined.

According to the above-described embodiments, the element images D618a, D618b, and D618c are disposed to be aligned in the direction which is orthogonal to the direction of lowering the inclined surface 631a. However, the direction in which the element images are aligned according to the present disclosure is not limited to the direction which is orthogonal to the direction of lowering the inclined surface 631a, and the element images may be aligned in the direction which intersects the direction of lowering the inclined surface 631a. However, a case where the element images are aligned in the orthogonal direction, is appropriate since the distortion can be suppressed at the maximum.

In the example illustrated in FIGS. 42 and 43, the swollen portion 631 has a shape of a spherical surface, and the ideographic images D612 to D619 are displayed on the spherical surface. In contrast to this, similarly to the outer circumferential surface or the inner circumferential surface of the cylindrical shape, the ideographic images D612 to D619 may be displayed on the curved surface which is curved in one direction. In this case, the element images D618a, D618b, and D618c are disposed to be aligned in the direction which intersects the direction of lowering the inclined surface of the curved surface. For example, when the element images D618a, D618b, and D618c are aligned in parallel to an axial direction of the cylinder, the optical path lengths of the multiple element images can be the same as each other, and an effect of suppressing the distortion can be improved.

The swollen portion 631 illustrated in FIGS. 42 and 43 has a shape swollen to the near side in the visual-recognition direction, but may have a shape swollen to the far side in the visual-recognition direction.

In the example illustrated in FIG. 42, the ideographic images D612 to d619 are numbers, and each digit which configures the numbers are element images D618a, D618b, and D618c. In contrast to this, the ideographic images may be letters, and each character which configures the letters may be the element image. For example, each character of alphabets which configures the letter "CHARGE" is an element image, and each of the alphabets may be positioned being aligned along the one-dot chain line K1 (that is, the contour line) in FIG. 41. Otherwise, a pattern in which the ideographic image is configured of the multiple element images, for example, a pattern which shows the weather, a pattern which shows an air supply state by the air conditioning apparatus, or a pattern which shows an abnormal state of the vehicle, may be employed. In addition, the ideographic images may be configured by combining the numbers, the letters, and the patterns.

In this embodiment illustrated in FIG. 41, the vehicle display device is configured so that the display light Q is incident on the screen 630 from the side opposite to the viewer M, and the display light Q transmits the screen 630 and is input toward the eyes of the viewer M. In contrast to this, a configuration in which the display light is incident on the screen 630 from the viewer M side, and the display light is reflected by the screen 630 and is input toward the eyes of the viewer M, may be employed.

The vehicle display device according to the fifteenth embodiment can be limited as follows.

(1) The vehicle display device including the projector (620) which emits the display light (P) of the image (D) that shows the vehicle information, and the screen (630) which displays the image as the display light is projected, in which the screen includes the screen includes the swollen portion (631) having the inclined surface (631*a*), the ideographic images (D612 to D619) which are displayed on the inclined surface and are configured by combining the multiple element images (D618*a*, D618*b*, D618*c*) which show the numbers, the letters, or the patterns are included in the image displayed on the screen, and the multiple element images are disposed to be aligned in the direction which intersects with the direction of lowering the inclined surface.

According to the above-described (1), the multiple element images are disposed to be aligned in the direction which intersects with the direction of lowering the inclined surface of the screen. For this reason, since the optical path lengths of the multiple element images can be suppressed not to vary, the generation of the distortion to the ideographic image can be suppressed. Accordingly, deterioration of readability of the ideographic images caused by forming the swollen portion can be suppressed while forming the swollen portion on the screen and visually recognizing the image.

(2) The vehicle display device according to the above-described (1), in which the pointer image (D610*a*) which shows the pointer that rotates in accordance with the vehicle information, and the scale image (D621) which is indicated by the pointer image and shows the scale, are included in the image displayed on the screen, and the direction in which the multiple element images are aligned is parallel to the rotating direction of the pointer image.

(3) The vehicle display device according to the above-described (1) or (2), in which the length (L1) in the direction in which the multiple element images are aligned in the ideographic image is longer than the length (L2) in the direction which is perpendicular to the direction in which the multiple element images are aligned.

(4) The vehicle display device according to any one of the above-described (1) to (3), in which the display color or the brightness in the element image varies in the direction of lowering the inclined surface.

What is claimed is:

1. A vehicle display device, comprising:
a projector that emits display light of an image indicating vehicle information; a controller that controls luminance of the display light; and a screen that displays the image when the display light is projected onto the screen,
wherein the screen has a convex portion that protrudes to a near side in a visual-recognition direction in which the image is visually recognized, and a concave portion that is recessed toward a far side in the visual-recognition direction,
the controller controls the display light such that the display light projected to a first part that is defined as one of the convex portion and the concave portion has higher luminance than that of the display light projected to a second part that is defined as another of the convex portion and the concave portion, and
the screen is plate shaped with a substantially constant thickness.

2. The vehicle display device according to claim 1, wherein
a display mode of the image displayed at the first part is set to be changeable.

3. The vehicle display device according to claim 1, wherein
a plurality of first parts are arranged, and
a display mode of the image for a respective one of the plurality of first parts is set to be changeable according to a change in a physical quantity of a vehicle condition.

4. The vehicle display device according to claim 1, wherein
the screen includes a linking portion that links the convex portion and the concave portion, and
the controller controls luminance of the display light projected to the linking portion to change within a range between the luminance of the display light projected to the first part and the luminance of the display light projected to the second part.

5. A vehicle display device, comprising:
a projector that emits display light of an image indicating vehicle information;
a controller that controls luminance of the display light; and
a screen that displays the image when the display light is projected onto the screen,
wherein the screen has a convex portion that protrudes to a near side in a visual-recognition direction in which the image is visually recognized, and a concave portion that is recessed toward a far side in the visual-recognition direction,
the controller controls the display light such that the display light projected to a first part that is defined as one of the convex portion and the concave portion has higher luminance than that of the display light projected to a second part that is defined as
another of the convex portion and the concave portion,
a plurality of first parts are arranged,
a display mode of the image includes a first mode where the image for a respective one of the plurality of first parts is changed according to a change in a physical quantity of a vehicle condition, and a second mode where the images for all the plurality of first parts are changed, and
the first mode and the second mode are switched from and to each other.

6. The vehicle display device according to claim 5, wherein
the screen includes a linking portion that links the convex portion and the concave portion, and
the controller controls luminance of the display light projected to the linking portion to change within a range between the luminance of the display light projected to the first part and the luminance of the display light projected to the second part.

7. A vehicle display device, comprising:
a projector that emits display light of an image indicating vehicle information;
a controller that controls luminance of the display light; and
a screen that has a front surface on which the image is visually recognized and a rear surface opposite to the front surface, the screen displaying the image when the display light is projected onto the screen, wherein
the screen has a convex portion that protrudes toward the front surface and a concave portion that is positioned relatively close to the rear surface as compared to the convex portion,
the convex portion having an inclined surface that widens toward the concave portion from a top of the convex portion, and
the controller controls the luminance of the display light passing through the inclined surface to be lower than the luminance of the display light passing through the top.

8. The vehicle display device according to claim 7, wherein
the controller controls the luminance of the display light passing through the inclined surface to be lowest among the display light projected to the screen.

9. The vehicle display device according to claim 7, wherein
the controller controls the luminance of the display light passing through the top to be highest among the display light projected to the screen.

10. The vehicle display device according to claim 7, wherein
the convex portion is a ring-shaped convex portion, and the concave portion is surrounded by the ring-shaped convex portion.

11. A vehicle display device, comprising:
a projector that emits display light of an image indicating vehicle information;
a controller that controls luminance of the display light; and
a screen that displays the image when the display light is projected onto the screen, wherein
the screen has a convex portion that protrudes to a near side in a visual-recognition direction in which the image is visually recognized, and a concave portion that is recessed toward a far side in the visual-recognition direction,
the concave portion is located in a central region of the screen, and the convex portion is located on an outer circumferential side of the concave portion so as to surround the central region,
the image is displayed in the central region, the image including a scale image and a pointer image that indicates the scale image, and
the controller is configured to control the display light such that, among the display light, a portion of display light projected onto the central region has a lower luminance than a portion of display light projected onto the convex portion.

12. A vehicle display device, comprising:
a projector that emits display light of an image indicating vehicle information;
a controller that controls luminance of the display light; and a screen that displays the image when the display light is projected onto the screen, wherein
the screen has a convex portion that protrudes to a near side in a visual-recognition direction in which the image is visually recognized, and a concave portion that is recessed toward a far side in the visual-recognition direction,
the convex portion and the concave portion are seamlessly formed in the screen in an integral manner, and
the controller controls the display light such that the display light projected to a first part that is defined as one of the convex portion and the concave portion has higher luminance than that of the display light projected to a second part that is defined as another of the convex portion and the concave portion.

* * * * *